US009992513B2

United States Patent
Takahashi et al.

(10) Patent No.: US 9,992,513 B2
(45) Date of Patent: Jun. 5, 2018

(54) IMAGE PROCESSING EFFICIENT TRANSMISSION OR RECEPTION OF ENCODED INFORMATION

(71) Applicant: SONY CORPORATION, Tokyo (JP)

(72) Inventors: Yoshitomo Takahashi, Kanagawa (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 262 days.

(21) Appl. No.: 14/650,640

(22) PCT Filed: Dec. 9, 2013

(86) PCT No.: PCT/JP2013/082937
§ 371 (c)(1),
(2) Date: Jun. 9, 2015

(87) PCT Pub. No.: WO2014/097913
PCT Pub. Date: Jun. 26, 2014

(65) Prior Publication Data
US 2015/0312591 A1 Oct. 29, 2015

(30) Foreign Application Priority Data

Dec. 21, 2012 (JP) ................................. 2012-279848

(51) Int. Cl.
*H04N 19/597* (2014.01)
*H04N 19/573* (2014.01)
(Continued)

(52) U.S. Cl.
CPC ......... *H04N 19/597* (2014.11); *H04N 19/521* (2014.11); *H04N 19/573* (2014.11); *H04N 19/58* (2014.11); *H04N 19/70* (2014.11)

(58) Field of Classification Search
CPC ......... H04N 7/26; H04N 13/48; H04N 19/591
See application file for complete search history.

(56) References Cited

U.S. PATENT DOCUMENTS

2013/0155184 A1* 6/2013 Chen .................. H04N 13/0048
348/43

FOREIGN PATENT DOCUMENTS

CN          101356822 A    1/2009
JP          2000-023198 A  1/2000
(Continued)

OTHER PUBLICATIONS

Benjamin Bross et al., "High Efficiency Video Coding (HEVC) Text Specification Draft 8", Joint Collaborative Team on Video Coding (JCT-VC) of ITU-T SG16 WP3 and ISO/IEC JTC1/SC29/WG11, Jul. 11-20, 2012, pp. 19, Document: JCTVC-J1003_d7, 10th Meeting: Stockholm, SE.

(Continued)

*Primary Examiner* — Sathyanaraya V Perungavoor
*Assistant Examiner* — Patricia I Young
(74) *Attorney, Agent, or Firm* — Chip Law Group

(57) ABSTRACT

The present disclosure relates to an image processing apparatus and a method that enable efficient change of reference relationship of views in multi-view coding. In the present technology, as for inter-view reference images, a used_by__curr flag is also set to an image having a possibility of being referred, in a slice header or syntax of an SPS. Only an image with the used_by_curr flag of 1 is added to a temporal list used in generating a reference list. Therefore, the temporal list (RefPicListTemp0[rldx]) of L0 is generated in an order of a short-term (before) reference image of an index 0, a short-term (after) reference image of an index 1, and inter-view reference images of indexes 2 and 3. The present disclosure can be applied to an image processing apparatus, for example.

18 Claims, 33 Drawing Sheets

(51) Int. Cl.
*H04N 19/58* (2014.01)
*H04N 19/513* (2014.01)
*H04N 19/70* (2014.01)

(56) References Cited

FOREIGN PATENT DOCUMENTS

| JP | 2009-532934 A | 9/2009 |
| WO | 2012/169403 A1 | 12/2012 |
| WO | 2013/115023 A | 8/2013 |
| WO | 2013/115023 A1 | 8/2013 |

OTHER PUBLICATIONS

Ye-Kui Wang, " Solutions Considered for NAL Unit Header and Video Parameter Set for HEVC Extentions", Joint Collaborative Team on Video Coding (JCT-VC) of ITU-T SG16 WP3 and ISO/IEC JTC1/SC29/WG11, Jul. 11-20, 2012, pp. 6, Document: JCTVC-J1007, 10th Meeting: Stockholm, SE.

Gerhard Tech et al., "MV-HEVC Draft Text 2", Joint Collaborative Team on 3D Video Coding Extention Development of ITU-T SG16 WP3 and ISO/IEC JTC1/SC29/WG11, Oct. 13-19, 2012, pp. 22, Document: JCT3V-B1004_d0, 2nd Meeting: Shanghai, CN.

Byeongdoo Choi, " View Dependency Change SEI Message for MV-HEVC ", Joint Collaborative Team on 3D Video Coding Extention Development of ITU-T SG16 WP3 and ISO/IEC JTC1/SC29/WG11, Oct. 13-19, 2012, pp. 2, Document: JCT3V-B0063, 2nd Meeting: Shanghai, CN.

Office Action for CN Patent Application No. 2013800653393, dated Aug. 30, 2016, 9 pages of Office Action and 111 pages of English Translation.

Tech, et al., "MV-HEVC Working Draft 1", Joint Collaborative Team on 3D Video Coding Extension Development of ITU-T SG 16 WP 3 and ISO/IEC JTC IISC 29IWG 11 1st Meeting: Stockholm, SE, Jul. 16-20, 2012, 20 pages.

Office Action for JP Patent Application No. 2014-553079, dated Jul. 13, 2017, 07 pages of Office Action and 06 pages of English Translation.

Tech, et al., "MV-HEVC Working Draft 1", Joint Collaborative Team on 3D Video Coding Extension Development of ITU-T SG 16 WP 3 and ISO/IEC JTC 1/SC 29/WG 11, JCT3V-A1004_d0, 1st Meeting: Stockholm, SE, Jul. 16-20, 2012, 20 pages.

Nakagami, et al., "AHG7: On Initialization Process for Reference Picture Lists of MV-HEVC and 3DHTM", Joint Collaborative Team on 3D Video Coding Extension Development of ITU-T SG 16 WP 3 and ISO/IEC JTC 1/SC 29/WG 11, JCT3V-00079, 3rd Meeting: Geneva, CH, Jan. 17-23, 2013, 06 pages.

Nakagami, et al., ARG9: On Initialization Process of Reference Picture Lists for HEVC Extensions, Joint Collaborative Team on Video Coding (JCT-VC) of ITU-T SG 16 WP 3 and ISO/IEC JTC 1/SC 29/WG 11, JCTVC-M0081r1, 13th Meeting: Incheon, KR, Apr. 18-26, 2013, 11 pages.

Gerhard Tech, et al., "MV-HEVC Test Model 1", Joint Collaborative Team on 3D Video Coding Extension Development of ITU-T SG 16 WP 3 and ISO/IEC JTC 1/SC 29/WG 11, JCT3V-A1005_d0, 1st Meeting: Stockholm, SE, Jul. 16-20, 2012, 83 pages.

* cited by examiner

FIG. 9

| | | Descriptor |
|---|---|---|
| 1 | vps_extension( ) { | |
| 2 | while(!byte_aligned( )) | |
| 3 | vps_extension_byte_alignment_reserved_one_bit | u(1) |
| 4 | num_additional_layer_operation_points | u(8) |
| 5 | num_additional_profile_level_sets | u(8) |
| 6 | for(i=0;i<=vps_max_layers_minus1;i++) { | |
| 7 | //mapping_of_layer_ID_to_scalability_dimension_IDs | |
| 8 | num_types_zero_4bits[i] | u(4) |
| 9 | type_zero_bits[i] | u(4) |
| 10 | view_id[i] | u(8) |
| 11 | if(i>0) | |
| 12 | num_direct_ref_layers[i] | u(6) |
| 13 | for(j=0;j<num_direct_ref_layers[i].j++) | |
| 14 | ref_layer_id[i][j] | u(6) |
| 15 | } | |
| 16 | for(i=0;i<=num_additional_profile_level_sets;i++) | |
| 17 | profile_tier_level(1,vps_max_sub_layers_minus1) | |
| 18 | for(i=0;i<=num_additional_layer_operation_points;i++) { | |
| 19 | op_point(i) | |
| 20 | if(num_additional_profile_level_sets>0) | |
| 21 | profile_level_idx[i] | u(8) |
| 22 | } | |
| 23 | } | |

FIG. 10

| | | |
|---|---|---|
| 1 | ... | |
| 2 | sps_extension_flag | u(1) |
| 3 | if(sps_extension_flag) { | |
| 4 | ref_layer_modified_sps_flag | u(1) |
| 5 | if(ref_layer_modified_sps_flag) { | |
| 6 | for(i=0;i<num_direct_ref_layers[i];i++) { | |
| 7 | used_by_curr_pic_layer_sps_flag[i] | u(1) |
| 8 | } | |
| 9 | } | |
| 10 | } | |
| 11 | sps_extension2_flag | u(1) |
| 12 | if(sps_extension2_flag) | |
| 13 | while(more_rbsp_data()) | |
| 14 | sps_extension_data_flag | u(1) |
| 15 | rbsp_trailing_bits() | |
| 16 | } | |
| 17 | | |

FIG. 11

| | | |
|---|---|---|
| 1 | ... | |
| 2 | slice_header_extension_flag | u(1) |
| 3 | if(slice_header_extension_flag) { | |
| 4 | ref_layer_modified_flag | u(1) |
| 5 | if(ref_layer_modified_flag) { | |
| 6 | for(i=0;i<num_direct_ref_layers[i];i++) { | |
| 7 | used_by_curr_pic_layer_flag[i] | u(1) |
| 8 | } | |
| 9 | } | |
| 10 | } | |
| 11 | slice_header_extension2_flag | u(1) |
| 12 | if(slice_header_extension2_flag) | |
| 13 | while(more_rbsp_data()) | |
| 14 | slice_header_extension_data_flag | u(1) |
| 15 | rbsp_trailing_bits() | |
| 16 | } | |
| 17 | | |

FIG. 13

```
The following applies:
  for( i = 0; i < NumIvCurr; i++ )
    RefPicSetIvCurr[i] = "inter-view reference picture with layer identifier equal to LayerIdInterView[i]"

- rIdx = 0
  while( rIdx < NumRpsCurrTempList0 ) {
    for( i = 0; i < NumPocStCurrBefore && rIdx < NumRpsCurrTempList0; rIdx++, i++ )
      RefPicListTemp0[rIdx] = RefPicSetStCurrBefore[i]
    for( i = 0; i < NumPocStCurrAfter && rIdx < NumRpsCurrTempList0; rIdx++, i++ )      (F-6)
      RefPicListTemp0[rIdx] = RefPicSetStCurrAfter[i]
    for( i = 0; i < NumPocLtCurr && rIdx < NumRpsCurrTempList0; rIdx++, i++ )
      RefPicListTemp0[rIdx] = RefPicSetLtCurr[i]
    for( i = 0; i < NumIvCurr && rIdx < NumRpsCurrTempList0; rIdx++, i++ )
      RefPicListTemp0[rIdx] = RefPicSetIvCurr[i]
  }

- rIdx = 0
  while( rIdx < NumRpsCurrTempList1 ) {
    for( i = 0; i < NumPocStCurrAfter && rIdx < NumRpsCurrTempList1; rIdx++, i++ )
      RefPicListTemp1[rIdx] = RefPicSetStCurrAfter[i]
    for( i = 0; i < NumPocStCurrBefore && rIdx < NumRpsCurrTempList1; rIdx++, i++ )     (F-8)
      RefPicListTemp1[rIdx] = RefPicSetStCurrBefore[i]
    for( i = 0; i < NumPocLtCurr && rIdx < NumRpsCurrTempList1; rIdx++, i++ )
      RefPicListTemp1[rIdx] = RefPicSetLtCurr[i]
    for( i = 0; i < NumIvCurr && rIdx < NumRpsCurrTempList1; rIdx++, i++ )
      RefPicListTemp1[rIdx] = RefPicSetIvCurr[NumIvCurr-i]
  }
```

IMAGE PROCESSING EFFICIENT TRANSMISSION OR RECEPTION OF ENCODED INFORMATION

TECHNICAL FIELD

The present disclosure relates to an image processing apparatus and a method, and especially relates to an image processing apparatus and a method that enable efficient change of reference relationship of views in scalable coding or multi-view coding.

BACKGROUND ART

In recent years, devices that digitally treat image information, and perform compression coding of an image, by employing an encoding system that compresses the image by orthogonal transform such as discrete cosine transform, and motion compensation, using redundancy specific to the image information, with a view to highly efficient transmission and accumulation of information, have been becoming popular. Examples of the encoding system include moving picture experts group (MPEG), H.264, and MPEG-4 Part 10 (advanced video coding, hereinafter, described as AVC).

Currently, aiming at further improvement of encoding efficiency from H.264/AVC, standardization of the encoding system called high efficiency video coding (HEVC) has been pushed forward by the joint collaboration team—video coding (JCTVC) that is a joint standardization organization of ITU-T and ISO/IEC. Further, as its extension, standardization of encoding about multi-view image has been carried out in parallel, and Non-Patent Document 1 has been issued as a draft about the encoding of multi-view image.

By the way, a reference list, which is a list in which candidates of reference images for decoding a B picture are listed in a priority order, is generated from a head of reference images listed in a temporal list in a priority order.

In Non-Patent Document 1, whether a long-term reference image and a short-term reference image are added to the temporal list can be switched by a slice parameter set (SPS) or a slice header.

In contrast, reference relationship of inter-layers (views) is defined in a video parameter set (VPS). A layer, reference of which is specified by the VPS, is always added to the temporal list. That is, the reference image of the inter-layer can be controlled only with the VPS transmitted only once with a sequence.

Therefore, in Non-Patent Document 2, supplemental enhancement information (SEI) for changing the reference relationship of views has been proposed.

CITATION LIST

Non-Patent Document

Non-Patent Document 1: Gerhard Tech, Krzysztof Wegner, Ying Chen, Miska Hannuksela, "MV-HEVC Draft Text2", JCT3V-B1004, 2012.11.07

Non-Patent Document 2: Byeonghoon Choi, Jeonghoon Park, "View dependency change SEI message SEI for MV-HEVC", JCT3V-B0063, 2012.10.08

SUMMARY OF THE INVENTION

Problems to be Solved by the Invention

However, what is proposed in Non-Patent Document 2 is the SEI, and the SEI cannot influence on the generation of a default reference list. Therefore, to change the reference relationship of a specific view, it is necessary to describe the reference relationship of all views.

The present disclosure has been made in view of the foregoing, and can efficiently change the reference relationship of views in scalable coding or multi-view coding.

Solution to Problems

An image processing apparatus according to one aspect of the present disclosure includes: a decoding unit configured to decode a bit stream to generate an image; and a prediction unit configured to predict the image generated by the decoding unit, by reference to a list of reference images generated based on layer reference image information that controls reference images for each layer, the reference images being referable in a layer direction and referred in predicting the image that is the bit stream subjected to decoding processing.

The layer reference image information is transmitted at fixed intervals or in picture units.

The layer reference image information is set to a sequence parameter set or a slice header of the bit stream.

The image processing apparatus may further include: a reference list generating unit configured to generate the list of reference images, based on the layer reference image information.

When inserting the reference images referable in a layer direction into the list of reference images, with respect to an L1 direction, the reference list generating unit may reverse an order of the reference images referable in the layer direction to a case of an L0 direction, and insert the reference images.

The reference list generating unit may add a reference image in which the layer reference image information indicates 1, of the reference images referable in a layer direction, to generate the list of reference images.

The reference list generating unit may add a reference image in which the layer reference image information indicates 1, of the reference images referable in a layer direction, and combine reference images in an order of a reference image positioned temporally before the image, a reference image positioned temporally after the image, a long-term reference image, and the reference images referable in the layer direction, to generate the list of reference images, with respect to an L0 direction.

The reference list generating unit may add a reference image in which the layer reference image information indicates 1, of the reference images referable in a layer direction, and combine reference images in an order of a reference image positioned temporally after the image, a reference image positioned temporally before the image, a long-term reference image, and the reference images referable in the layer direction, to generate the list of reference images, with respect to an L1 direction.

The layer is a view.

An image processing method according to one aspect of the present disclosure includes: by an image processing apparatus, decoding a bit stream to generate an image; and predicting the generated image, by reference to a list of reference images generated based on layer reference image information that controls reference images for each layer, the reference images being referable in a layer direction and referred in predicting the image that is the bit stream subjected to decoding processing.

An image processing apparatus according to another aspect of the present disclosure includes: a setting unit configured to set layer reference image information that controls reference images referable in a layer direction and referred in predicting an image; a prediction unit configured to generate a predicted image, by reference to a list of reference images generated based on the layer reference image information set by the setting unit; an encoding unit configured to encode the image using the predicted image generated by the prediction unit to generate a bit stream; and a transmitting unit configured to transmit the bit stream generated by the encoding unit, and the layer reference image information set by the setting unit.

The transmitting unit may transmit the layer reference image information set by the setting unit, at fixed intervals or in picture units.

The setting unit may set the layer reference image information to a sequence parameter set or a slice header of the bit stream.

The image processing apparatus may further include: a reference list generating unit configured to generate the list of reference images, based on the layer reference image information set by the setting unit.

When inserting the reference images referable in a layer direction into the list of reference images, with respect to an L1 direction, the reference list generating unit may reverse an order of the reference images referable in the layer direction to a case of an L0 direction, and insert the reference images.

The reference list generating unit may add a reference image in which the layer reference image information indicates 1, of the reference images referable in a layer direction, to generate the list of reference images.

The reference list generating unit may add a reference image in which the layer reference image information indicates 1, of the reference images referable in a layer direction, and combine reference images in an order of a reference image positioned temporally before the image, a reference image positioned temporally after the image, a long-term reference image, and the reference images referable in the layer direction, to generate the list of reference images, with respect to an L0 direction.

The reference list generating unit may add a reference image in which the layer reference image information indicates 1, of the reference images referable in a layer direction, and combine reference images in an order of a reference image positioned temporally after the image, a reference image positioned temporally before the image, a long-term reference image, and the reference images referable in the layer direction, to generate the list of reference images, with respect to an L1 direction.

The layer is a view.

An image processing method according to another aspect of the present disclosure includes: by an image processing apparatus, setting layer reference image information that controls reference images referable in a layer direction and referred in predicting an image; generating a predicted image, by reference to a list of reference images generated based on the set layer reference image information; encoding the image using the generated predicted image to generate a bit stream; and transmitting the generated bit stream, and the set layer reference image information.

According to one aspect of the present disclosure, a bit stream is decoded and an image is generated. Then, the generated image is predicted by reference to a list of reference images generated based on a layer reference image information that controls addition of reference images for each layer, the reference images being referable in a layer direction and referred in predicting the image that is the bit stream subjected to decoding processing.

According to another aspect of the present disclosure, layer reference image information that controls a reference image referable in a layer direction and referred in predicting an image is set, and a predicted image is generated by reference to a list of reference images generated based on the set layer reference image information. Then, encoding is performed using the generated predicted image and a bit stream is generated, and the generated bit stream and the set layer reference image information are transmitted.

Note that the above-described image processing apparatus may be an independent apparatus, or may be an internal block that configures an image encoding device or an image decoding device.

Effects of the Invention

According to one aspect of the present disclosure, an image can be decoded. Especially, the reference relationship of views can be efficiently changed in scalable coding or multi-view coding.

According to another aspect of the present disclosure, an image can be encoded. Especially, the reference relationship of views can be efficiently changed in scalable coding or multi-view coding.

BRIEF DESCRIPTION OF DRAWINGS

FIG. 9 is a diagram illustrating an example of syntax of a VPS.

FIG. 10 is a diagram illustrating an example of syntax of SPS extension in the present technology.

FIG. 11 is a diagram illustrating an example of syntax of slice header extension in the present technology.

FIG. 13 is a diagram illustrating a method of changing the arrangement order among inter-view images in the present technology.

MODE FOR CARRYING OUT THE INVENTION

Figure 1:
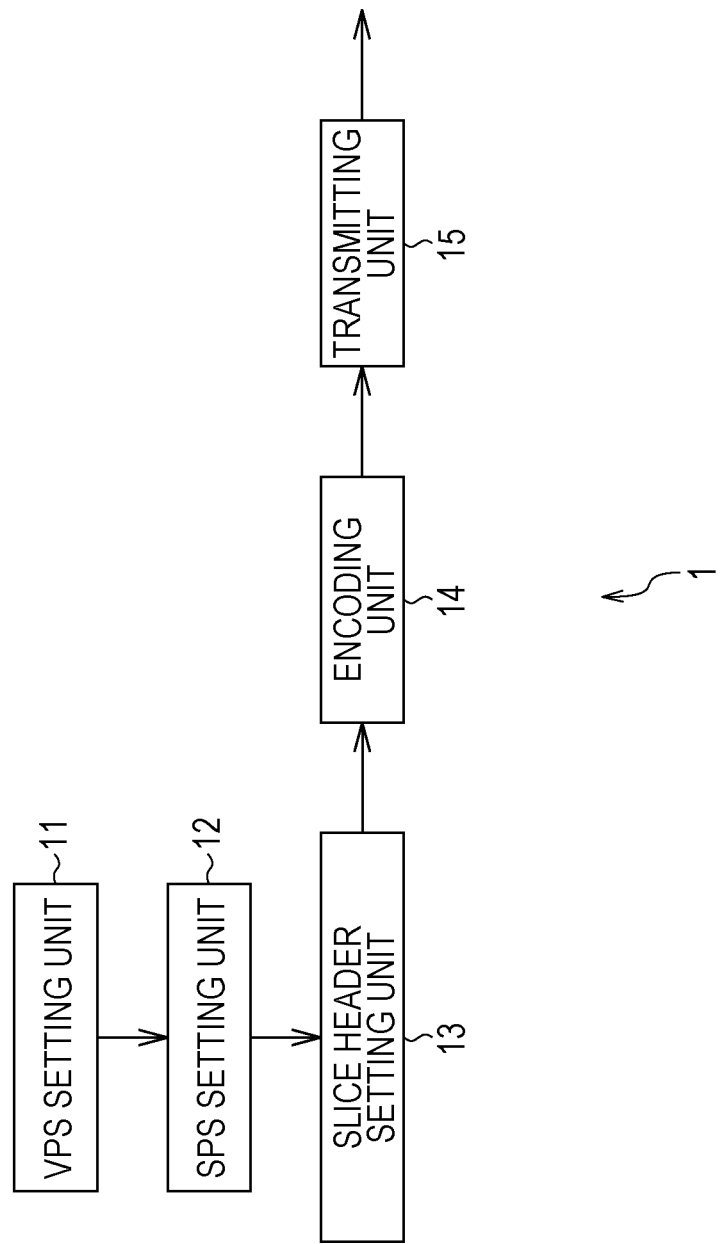
FIG. 1 is a block diagram illustrating a principal configuration example of an image encoding device.

Hereinafter, embodiments for implementing the present disclosure (hereinafter, referred to as embodiments) will be described. Note that the description will be given in the order below.
1. First Embodiment (an image encoding device)
2. Second Embodiment (an image decoding device)
3. Third Embodiment (an encoding unit and a decoding unit of an AVC system)
4. Fourth Embodiment (a computer)
5. Application Examples
6. Fifth Embodiment (set/unit/module/processor)

First Embodiment

[Description of Scalable Coding]

Conventional image encoding systems such as MPEG2 and AVC have a scalability function. Scalable coding is a system that makes (hierarchizes) an image into a plurality of layers, and encodes the image in each layer.

In the hierarchization of image, one image is divided into a plurality of images (layers) based on a predetermined parameter. Basically, each layer is configured from difference data so that redundancy is decreased. For example, when one image is hierarchized into two layers such as a base layer and an enhancement layer, a lower quality image than the original image can be obtained only with the data of the base layer. The original data (that is, a high quality image) can be obtained by compositing the base layer data and enhancement layer data.

By such hierarchization of image, images with various qualities can be easily obtained according to a situation. For example, for a terminal with a low processing capacity such as a mobile phone device, image compression information of only the base layer is transmitted, and a moving image with low temporal and spatial resolution, or with poor image quality is reproduced. For a terminal with a high processing capacity such as a television or a personal computer, image compression information of the enhancement layer is transmitted in addition to the base layer, and a moving image with high temporal and spatial resolution, or with high image quality is reproduced. In this way, the image compression information according to the capacity of a terminal or a network can be transmitted from a server without performing transcoding processing.

As a parameter having such scalability characteristics, there is spatial resolution (spatial scalability), for example. In the case of the spatial scalability, the resolution differs in each layer. That is, each picture is hierarchized into two layers of the base layer with lower resolution than the original image, and the enhancement layer with which the original image (original spatial resolution) can be obtained by being combined with the image of the base layer. Of course, the number of layers is an example, and each picture can be hierarchized into an arbitrary number of layers.

Further, as the parameter having such scalability characteristics, other than the above, there is temporal resolution (temporal scalability). In the case of the temporal scalability, a frame rate differs in each layer. That is, each picture is hierarchized into layers with different frame rates. A moving image with a higher frame rate can be obtained by adding a layer with a high frame rate to a layer with a low frame rate, and the original moving image (the original frame rate) can be obtained by adding all of the layers. The number of layers is an example, and a picture can be hierarchized into an arbitrary number of layers.

Further, as the parameter having such scalability characteristics, other than the above, there is a signal to noise ratio (SNR) (SNR scalability). In the case of the SNR scalability, the SN ratio differs in each layer. That is, each picture is hierarchized into two layers of a base layer with a lower SNR than the original image, and an enhancement layer with which the original image (original SNR) can be obtained by being composited with the image of the base layer. That is, in base layer image compression information, information related to a low PSNR image is transmitted. A high PSNR image can be reconstructed by adding enhancement layer image compression information to the base layer image compression information. Of course, the number of layers is an example, and a picture can be hierarchized into an arbitrary number of layers.

The parameter having the scalability characteristics may be a parameter other than the above examples. For example, there is bit-depth scalability, in which the base layer is made of an 8-bit image, and the enhancement layer is added thereto to obtain a 10-bit image.

Further, there is a chroma scalability, in which the base layer is made of a component image in a 4:2:0 format, and the enhancement layer is added thereto to obtain a component image in the 4:2:2 format.

Further, as the parameter having the scalability characteristics, there is multi-view. In this case, a picture is hierarchized into layers with mutually different views.

The layer described in the present embodiments include spatial, temporal, SNR, bit-depth, color, view, and the like of scalability encoding.

Note that terms of the layer used in the present specification include the above-described layer of scalable (hierarchization) encoding, and each view when considering multi-view of multiple viewpoints.

Hereinafter, description will be given using views as an example. However, the preset technology can be similarly applied to other layers by replacing the views with other layers.

Configuration Example of Image Encoding Device

FIG. 1 illustrates a configuration of an embodiment of an image encoding device as an image processing apparatus to which the present disclosure is applied.

An image encoding device 1 of FIG. 1 includes a VPS setting unit 11, an SPS setting unit 12, a slice header setting unit 13, an encoding unit 14, and a transmitting unit 15, and encodes an image such as a captured image in an HEVC system.

To be specific, setting information related to encoding by a user or the like in a preceding step (not illustrated) is input to the VPS setting unit 11 of the image encoding device 1. The VPS setting unit 11 sets a video parameter set (VPS), based on the setting information by the user in a preceding step (not illustrated), and supplies the set VPS to the SPS setting unit 12 together with the setting information.

The SPS setting unit 12 sets a sequence parameter set (SPS), based on the setting information from the VPS setting unit 11, and supplies the set SPS to the slice header setting unit 13 together with the VPS and the setting information.

The slice header setting unit 13 sets a slice header, based on the setting information from the SPS setting unit 12, and supplies the set slice header to the encoding unit 14 together with the VPS and the SPS. Note that the VPS, the SPS, the slice header, and the like may be encoded in the setting units as needed.

A multi-view image of the captured image or the like of frame unit is input to the encoding unit 14 as an input signal. The encoding unit 14 encodes the input signal in the HEVC system, by reference to header information of the VPS, the SPS, the slice header, and the like from the slice header setting unit 13. Then, the encoding unit 14 generates an encoded stream from encoded data obtained as a result of the encoding, the VPS, the SPS, the slice header, and the like, and supplies the generated encoded stream to the transmitting unit 15.

The transmitting unit 15 transmits the encoded stream supplied from the encoding unit 14 to an image decoding device 151 of FIG. 18 described below.

Note that, in practice, a picture parameter set (PPS), video usability information (VUI) that indicates characteristics (usability) of an image corresponding to the encoded data for each sequence, supplemental enhancement information (SEI), and the like are set. However, these pieces of information are omitted in the example of FIG. 1.

[Configuration Example of Encoding Unit]

Figure 2:
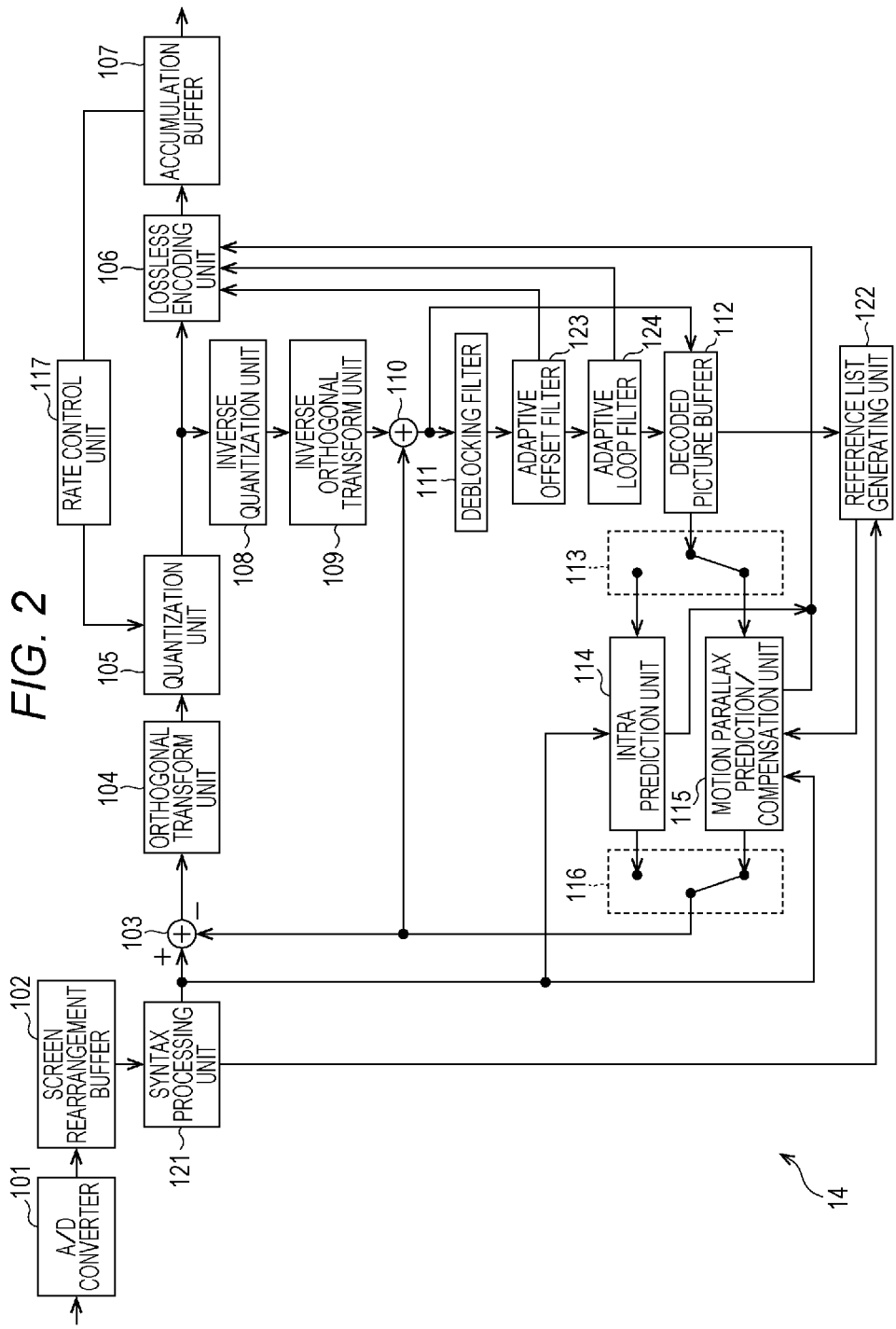
FIG. 2 is a block diagram illustrating a configuration example of an encoding unit.

FIG. 2 is a block diagram illustrating a configuration example of the encoding unit 14 of FIG. 1. The encoding unit 14 encodes the input signal in the HEVC system by reference to each header information from the slice header setting unit 13 as needed. That is, in the encoding unit 14, the processing is performed in coding unit (CU).

In the example of FIG. 2, the encoding unit 14 includes an analog/digital (A/D) converter 101, a screen rearrangement buffer 102, a calculation unit 103, an orthogonal transform unit 104, a quantization unit 105, a lossless encoding unit 106, and an accumulation buffer 107. Further, the encoding unit 14 includes an inverse quantization unit 108, an inverse orthogonal transform unit 109, a calculation unit 110, a deblocking filter 111, a decoded picture buffer 112, a selecting unit 113, an intra prediction unit 114, a motion parallax prediction/compensation unit 115, a selecting unit 116, and a rate control unit 117.

The encoding unit 14 further includes a syntax processing unit 121, a reference list generating unit 122, an adaptive offset filter 123, and an adaptive loop filter 124.

The A/D converter 101 performs A/D conversion of input image data, outputs the converted data to the screen rearrangement buffer 102, and stores the data therein.

The screen rearrangement buffer 102 rearranges stored images of frames in an order of display, into an order of frames for encoding, according to a group of picture (GOP) structure. The screen rearrangement buffer 102 supplies the image with rearranged frames to the syntax processing unit 121.

The syntax processing unit 121 sequentially confirms the data of the image read from the screen rearrangement buffer 102, and inserts the header information supplied from the preceding step (not illustrated) to the data of the image. The header information includes, for example, the VPS, the SPS, the slice header, and the like described with reference to FIG. 1.

The syntax processing unit 121 supplies the image to which the header information and the like are inserted to the calculation unit 103, the intra prediction unit 114, and the motion parallax prediction/compensation unit 115. Further, the syntax processing unit 121 supplies the header information of the VPS, the SPS, the slice header, and the like to the reference list generating unit 122.

The calculation unit 103 subtracts a predicted image supplied from the intra prediction unit 114 or the motion parallax prediction/compensation unit 115 through the selecting unit 116, from the image supplied from the syntax processing unit 121, and outputs difference information of the subtraction to the orthogonal transform unit 104.

For example, in a case of an image to be subjected to intra encoding, the calculation unit 103 subtracts the predicted image supplied from the intra prediction unit 114, from the image supplied from the syntax processing unit 121. Further, for example, in a case of an image to be subjected to inter encoding, the calculation unit 103 subtracts the predicted image supplied from the motion parallax prediction/compensation unit 115, from the image supplied from the syntax processing unit 121.

The orthogonal transform unit 104 applies orthogonal transform such as discrete cosine transform, or Karhunen Loéve transform, to the difference information supplied from the calculation unit 103, and supplies a transform coefficient of the orthogonal transform to the quantization unit 105.

The quantization unit 105 quantizes the transform coefficient output from the orthogonal transform unit 104. The quantization unit 105 supplies the quantized transform coefficient to the lossless encoding unit 106.

The lossless encoding unit 106 applies lossless encoding, such as variable length coding or arithmetic coding, to the quantized transform coefficient.

The lossless encoding unit 106 acquires information that indicates an intra prediction mode, and the like from the intra prediction unit 114, and acquires information that indicates an inter prediction mode, motion vector information, and the like from the motion parallax prediction/compensation unit 115.

The lossless encoding unit 106 encodes the quantized transform coefficient, and has intra prediction mode information, inter prediction mode information, the motion vector information, and the quantization parameter, as apart of the header information of the encoded data (performs multiplexing). The lossless encoding unit 106 supplies the encoded data obtained by encoding to the accumulation buffer 107, and stores the encoded data therein.

For example, in the lossless encoding unit 106, the lossless encoding processing, such as variable length coding or arithmetic coding, is performed. An example of the variable length coding includes context-adaptive variable length coding (CAVLC). An example of the arithmetic coding includes context-adaptive binary arithmetic coding (CABAC).

The accumulation buffer 107 temporarily stores the encoded data supplied from the lossless encoding unit 106, and outputs the encoded data to an encoding device of a subsequent step, a recording device (not illustrated), a transmission path, and the like, as an encoded image, a predetermined timing.

Further, the transform coefficient quantized in the quantization unit 105 is also supplied to the inverse quantization unit 108. The inverse quantization unit 108 inversely quantizes the quantized transform coefficient by a method corresponding to the quantization by the quantization unit 105. The inverse quantization unit 108 supplies the obtained transform coefficient to the inverse orthogonal transform unit 109.

The inverse orthogonal transform unit 109 inversely orthogonally transforms the supplied transform coefficient by a method corresponding to the orthogonal transform processing by the orthogonal transform unit 104. The inversely orthogonally transformed output (restored difference information) is supplied to the calculation unit 110.

The calculation unit 110 adds the predicted image supplied from the intra prediction unit 114 or the motion parallax prediction/compensation unit 115 through the selecting unit 116 to the result of the inverse orthogonal transform, that is, the restored difference information supplied from the inverse orthogonal transform unit 109, and obtains a locally decoded image (decoded image).

For example, when the difference information corresponds to the image to be subjected to intra encoding, the calculation unit 110 adds the predicted image supplied from the intra prediction unit 114 to the difference information. Further, for example, when the difference information corresponds to the image to be subjected to inter encoding, the calculation unit 110 adds the predicted image supplied from the motion parallax prediction/compensation unit 115 to the difference information.

The result of the addition is supplied to the deblocking filter 111 and the decoded picture buffer 112.

The deblocking filter 111 removes block distortion of the decoded image by appropriately performing deblocking filter processing. The deblocking filter 111 supplies the result of the filter processing to the adaptive offset filter 123.

The adaptive offset filter 123 performs adaptive offset filter (sample adaptive offset (SAO)) processing that mainly removes ringing with respect to the image after the adaptive deblocking filter processing by the deblocking filter 111.

To be specific, the adaptive offset filter 123 determines a type of adaptive offset filter processing for each largest coding unit (LCU) that is the maximum coding unit, and obtains an offset to be used in the adaptive offset filter processing. The adaptive offset filter 123 performs the determined type of adaptive offset filter processing for the image after the adaptive deblocking filter processing using the obtained offset. Then, the adaptive offset filter 123 supplies the image after the adaptive offset filter processing to the adaptive loop filter 124.

Further, the adaptive offset filter 123 includes a buffer where the offset is stored. The adaptive offset filter 123 determines whether the offset used in the adaptive deblocking filter processing has already been stored in the buffer for each LCU.

When having determined that the offset used in the adaptive deblocking filter processing has already been stored in the buffer, the adaptive offset filter 123 sets a storage flag that indicates whether the offset is stored in the buffer to a value (here, 1) that indicates the offset is stored in the buffer.

Then, the adaptive offset filter 123 supplies the storage flag set to 1, an index that indicates a storage position of the offset in the buffer, and type information that indicates the type of the performed adaptive offset filter processing to the lossless encoding unit 106, for each LCU.

Meanwhile, when the offset used in the adaptive deblocking filter processing has not yet been stored in the buffer, the adaptive offset filter 123 stores the offset in the buffer in order. Further, the adaptive offset filter 123 sets the storage flag to a value (here, 0) that indicates that the offset has not yet been stored in the buffer. Then, the adaptive offset filter 123 supplies the storage flag set to 0, the offset, and the type information to the lossless encoding unit 106, for each LCU.

The adaptive loop filter 124 performs adaptive loop filter (ALF) processing for the image after the adaptive offset filter processing supplied from the adaptive offset filter 123, for each LCU, for example. As the adaptive loop filter processing, for example, processing by two dimensional Wiener filter is used. Apparently, a filter other than the Weiner filter may be used.

To be specific, the adaptive loop filter 124 calculates a filter coefficient to be used in the adaptive loop filter processing such that a residual between the original image that is the image output from the syntax processing unit 121 and the image after the adaptive loop filter processing becomes minimized, for each LCU. Then, the adaptive loop filter 124 performs the adaptive loop filter processing for the image after the adaptive offset filter processing using the calculated filter coefficient, for each LCU.

The adaptive loop filter 124 supplies the image after the adaptive loop filter processing to the decoded picture buffer 112. Further, the adaptive loop filter 124 supplies the filter coefficient to the lossless encoding unit 106.

Note that, here, the adaptive loop filter processing is performed for each LCU. However, the processing unit of the adaptive loop filter processing is not limited to the LCU. Note that the processing can be efficiently performed by using the same processing unit in the adaptive offset filter 123 and the adaptive loop filter 124.

The decoded picture buffer 112 outputs an accumulated reference image to the intra prediction unit 114 or the motion parallax prediction/compensation unit 115 through the selecting unit 113, at predetermined timing.

For example, in the case of an image to be subjected to intra encoding, the decoded picture buffer 112 supplies the reference image to the intra prediction unit 114 through the selecting unit 113. Further, for example, in the case of an image to be subjected to inter encoding, the decoded picture buffer 112 supplies the reference image to the motion parallax prediction/compensation unit 115 through the selecting unit 113.

When the reference image supplied from the decoded picture buffer 112 is the image to be subjected to intra encoding, the selecting unit 113 supplies the reference image to the intra prediction unit 114. Further, when the reference image supplied from the decoded picture buffer 112 is the image to be subjected to inter encoding, the selecting unit 113 supplies the reference image to the motion parallax prediction/compensation unit 115.

The intra prediction unit 114 performs intra prediction (in-screen prediction) that generates a predicted image using a pixel value in the screen of the input image supplied from the syntax processing unit 121. The intra prediction unit 114 performs the intra prediction in a plurality of modes (intra prediction modes).

The intra prediction unit 114 generates the predicted image in all of the intra prediction modes, evaluates each predicted image, and selects an optimum mode. When having selected the optimum intra prediction mode, the intra prediction unit 114 supplies the predicted image generated in the optimum mode to the calculation unit 103 and the calculation unit 110 through the selecting unit 116.

Further, as described above, the intra prediction unit 114 appropriately supplies information such as intra prediction mode information that indicates the employed intra prediction mode to the lossless encoding unit 106.

The motion parallax prediction/compensation unit 115 performs motion parallax prediction for the image to be subjected to inter encoding, using the input image supplied from the syntax processing unit 121 and the reference image supplied from the decoded picture buffer 112 through the selecting unit 113. At that time, the motion parallax prediction/compensation unit 115 uses the reference image of a reference image index indicated in the reference list generated by the reference list generating unit 122. The motion parallax prediction/compensation unit 115 performs motion parallax compensation processing according to the detected motion and a parallax vector to generate a predicted image (inter predicted image information).

The motion parallax prediction/compensation unit 115 performs the inter prediction processing of all of candidate inter prediction modes, and generates the predicted image. The motion parallax prediction/compensation unit 115 supplies the generated predicted image to the calculation unit 103 and the calculation unit 110 through the selecting unit 116.

Further, the motion parallax prediction/compensation unit 115 supplies inter prediction mode information that indicates the employed inter prediction mode and the motion vector information that indicates the calculated motion vector to the lossless encoding unit 106.

In the case of an image to be subjected to intra encoding, the selecting unit 116 supplies the output of the intra prediction unit 114 to the calculation unit 103 and the calculation unit 110, and in the case of an image to be subjected to inter encoding, the selecting unit 116 supplies the output of the motion parallax prediction/compensation unit 115 to the calculation unit 103 and the calculation unit 110.

The rate control unit 117 controls a rate of a quantization operation of the quantization unit 105 so as not to cause an overflow or an underflow, based on a compressed image accumulated in the accumulation buffer 107.

The reference list generating unit 122 generates a reference list to be referred by the motion parallax prediction/compensation unit 115 in predicting a current image, using the header information from the syntax processing unit 121 and information (POC information and view information) of the reference image accumulated in the decoded picture buffer 112. The reference list is a list (array) of reference images referable in a temporal direction or reference images of reference images in a view (layer) direction.

Prior to the generation of the reference list, the reference list generating unit 122 generates a temporal list that is a list used in generating the reference list. At that time, the reference list generating unit 122 inserts the reference image referable in the view direction into the temporal list by reference to the SPS or the slice header from the syntax processing unit 121.

Note that the reference image referable in the temporal direction is a reference image referable in different times, and the reference image of reference image in the view (layer) direction is the reference image referable in different views (layers).

Then, the reference list generating unit 122 generates the reference list, based on the generated temporal list.

[Background]

In MV-HEVC, whether a short-term reference image (short-term picture) or a long-term reference image (long-term picture) is added to the temporal list can be controlled with the SPS or the slice header (a reference image flag described in the slice header.

In contrast, reference relationship between inter-views (layers) is defined in the VPS. In other words, the control between the inter-view reference images can be performed only with the VPS. Therefore, an image of the layer (view), reference of which is specified in the VPS, is added to the temporal list, according to the current definition of the VPS.

Figure 3:
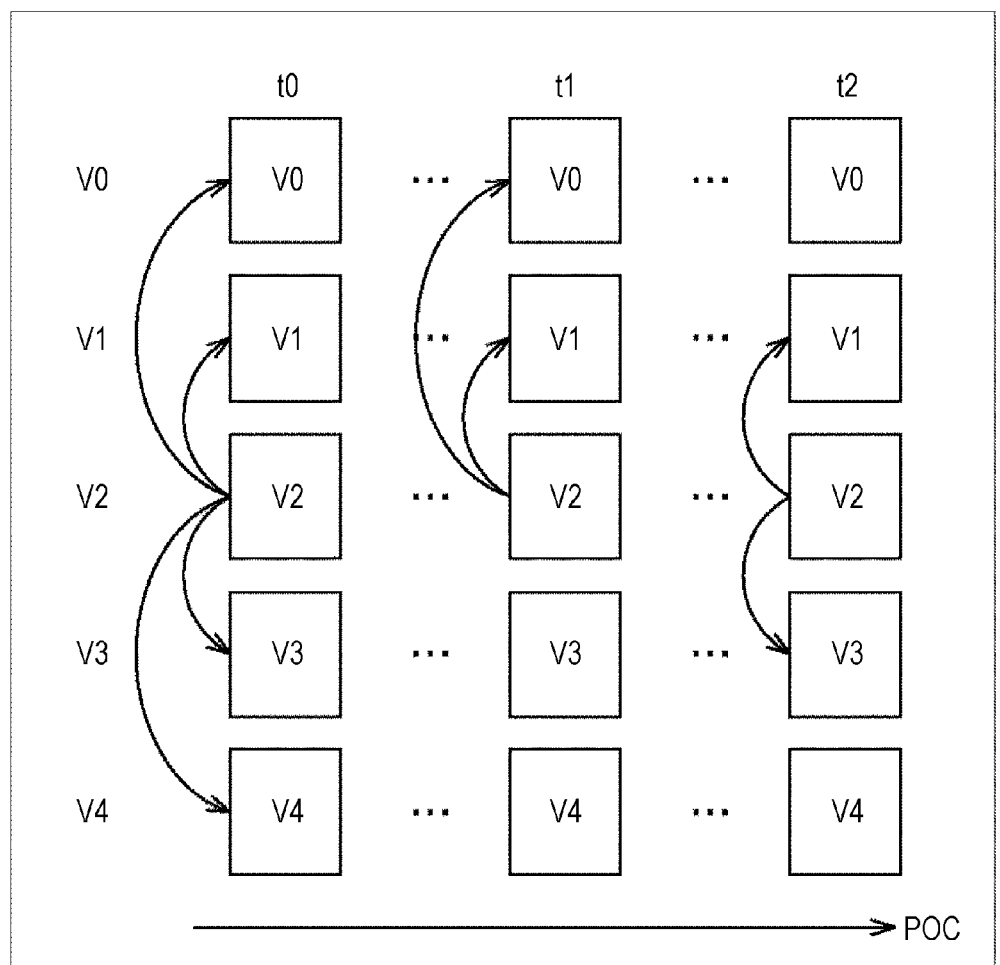
FIG. 3 is a diagram for describing a situation that may occur regarding change of a reference image.

For example, in the example of FIG. 3, images of five views of View_ID=V0, V1, V2, V3, V4 at three times of POC=t0, t1, t2 are illustrated in order from the left. At POC=t0, the image of View_ID=V2 is highly correlated with the images of View_ID=V0, V1, V3, V4, and thus the reference image of any view may be added to a default reference list, in predicting the image of View_ID=V2.

However, at POC=t1, the images of View_ID=V3, V4 are less correlated with the image of View_ID=V2. Therefore, only the images of View_ID=V0, V1 are desirably added to the default reference list. Further, at POC=t2, the images of View_ID=V0, V4 are less correlated with the image of View_ID=V2, and thus only the images of View_ID=V1, V3 are desirably added to the default reference list.

As described above, there may be a situation where it is desired to limit the view (layer) to be added to the default reference list in consideration of scene change or a GOP structure.

[Comparison between Outline of Present Technology and Conventional Technology]

Figure 4:
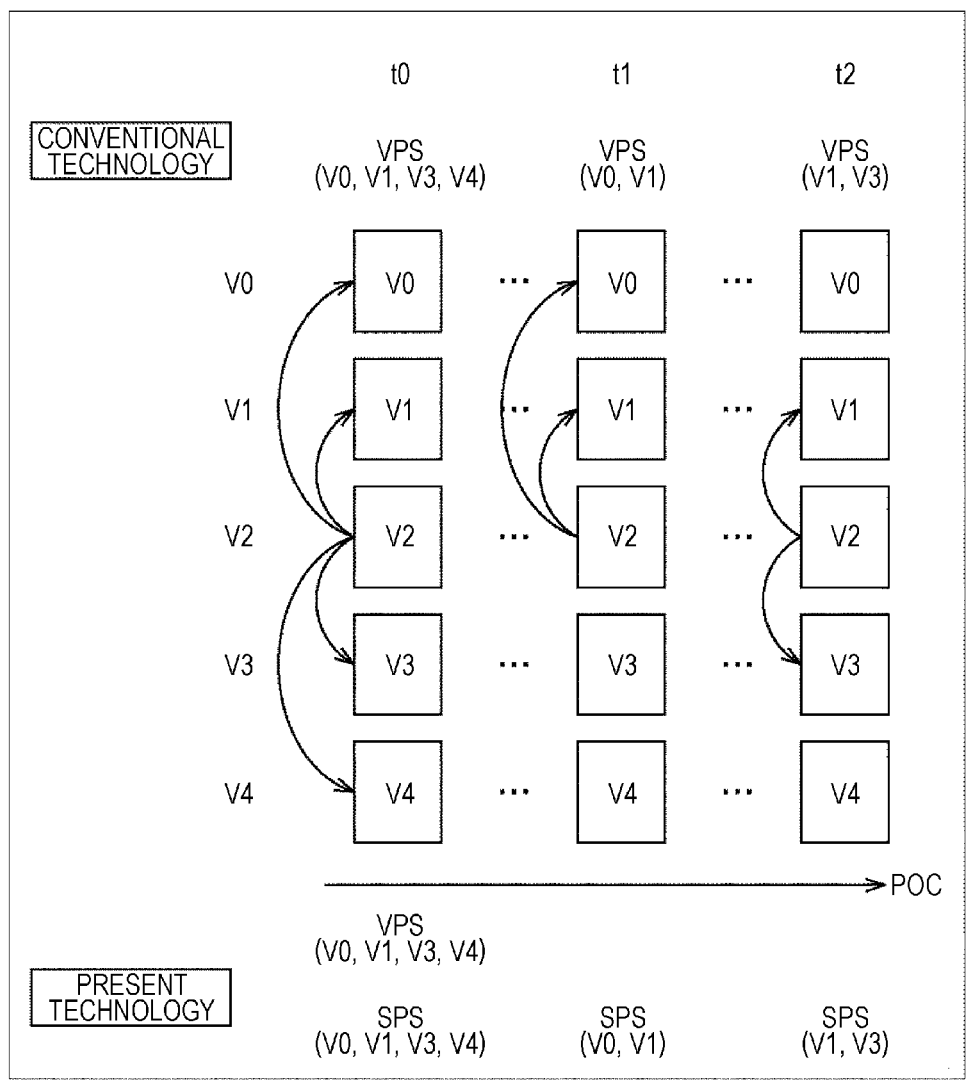
FIG. 4 is a diagram for describing comparison between the present technology and a conventional technology.

FIG. 4 is a diagram for comparison between a method of a conventional technology and the method of the present technology.

In the situation as described in FIG. 3, in a conventional method, at POC=t0, the images of View_ID=V0, V1, V3, V4 are set in the VPS as the reference images and are transmitted, as illustrated in the example of FIG. 4. At POC=t1, the images of View_ID=V0, V1 are set to the VPS as the reference images and are transmitted. Further, at POC=t2, the images of View_ID=V1, V3 are set to the VPS as the reference images and are transmitted. In this way, to change the reference images, it is necessary to re-set and transmit the VPS.

Figure 5:
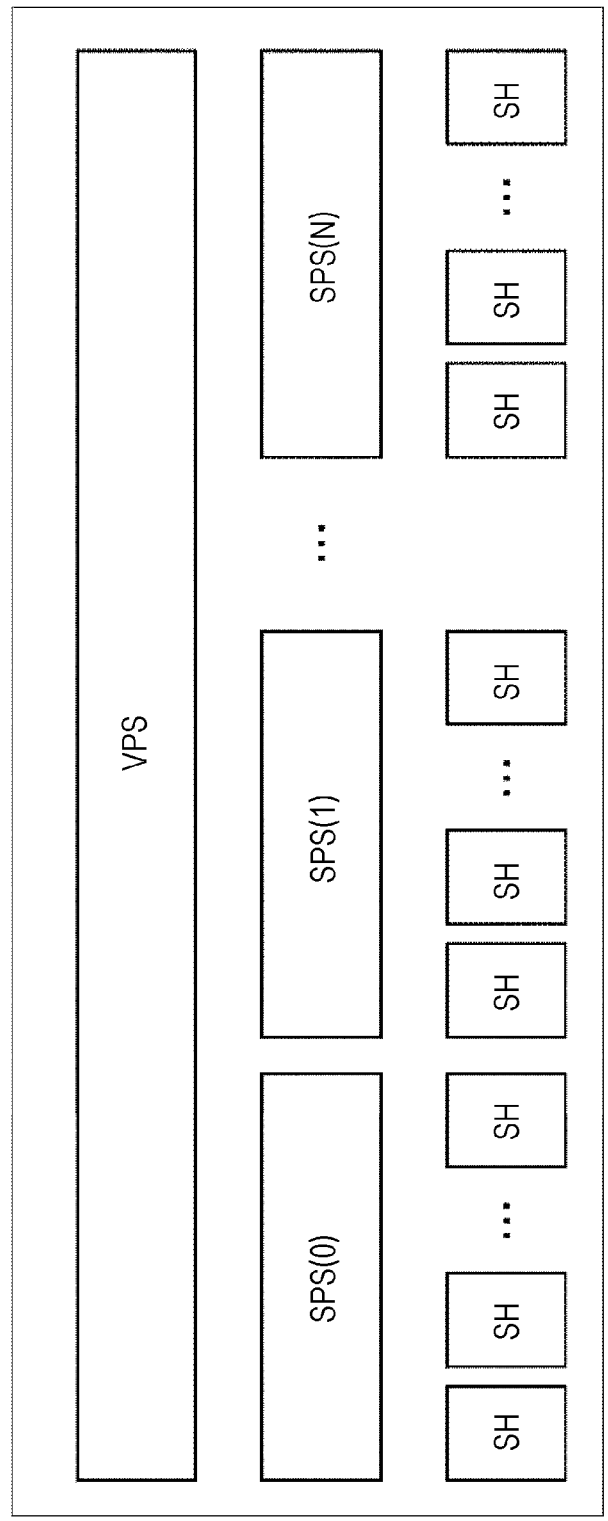
FIG. 5 is a diagram for describing a parameter set.

Here, as illustrated in FIG. 5, the VPS is a parameter set that defines parameters (for example, buffer information or scalability information) that cover a plurality of layers, and is basically transmitted once with the head of a sequence.

The SPS is a parameter set that defines parameters for each layer (view), and is basically transmitted in GOP units or at fixed intervals. The slice header (SH) defines parameters for each layer (view), and is basically transmitted in picture units.

Therefore, the VPS is not expected to be frequently re-sent. Therefore, although the reference relationship of the inter-layers can be changed with the VPS, it is not realistic to re-send the VPS for that purpose only. Further, to change the reference relationship of one view with the VPS, it is necessary to describe the reference relationship of the whole view, and an overhead is large.

In contrast, in the case of the SPS, a reference structure of the inter-layer can be changed in GOP units or throughout a relatively long term. In the case of the slice header, the reference structure of the inter-layer can be unexpectedly changed with respect to one picture.

As described above, in the present technology, a layer that can be referred is defined in the VPS, and actual reference control is performed with the SPS or the slice header. That is, in the present technology, the layer reference image information that controls the reference image referable in the layer direction for each layer is set to the SPS or the slice header.

For example, in the case of the present technology illustrated in FIG. 4, at POC=t0, the images of View_ID=V0, V1, V3, V4 are set as the layers (views) that can be referred and are transmitted in the VPS, and the images of View_ID=V0, V1, V3, V4 are set as the reference images and are transmitted in the SPS. Then, at POC=t1, the images of View_ID=V0, V1 are set as the reference images and are transmitted in the SPS. Further, at POC=t2, the images of View_ID=V1, V3 are set as the reference images and are transmitted in the SPS. In this way, the SPS (or the slice header) is re-set and transmitted.

In doing so, only the reference images of the inter-layers (views) that are highly correlated with the default reference list can be efficiently added without re-sending the VPS. As a result, it is not necessary to transmit syntax that changes the reference list. Therefore, the encoding efficiency is improved.

Note that Non-Patent Document 2 proposes SEI for changing dependency of views. However, it is the SEI, and thus the SEI cannot influence on the generation of the default reference list. Therefore, it is necessary to describe the reference relationship of all views in order to change the reference relationship of a specific view.

In contrast, in the present technology, the reference relationship of views is changed with the SPS or the slice header. Accordingly, the change influences on the generation of the default, and can improve the list generation.

Further, since the SPS is individually transmitted for each view, the change can be applied to the view only, the reference relationship of which is wished to be changed.

[Structure of Reference Image]

Next, a structure of the reference image in the HEVC system will be described with reference to FIG. 6.

Figure 6:
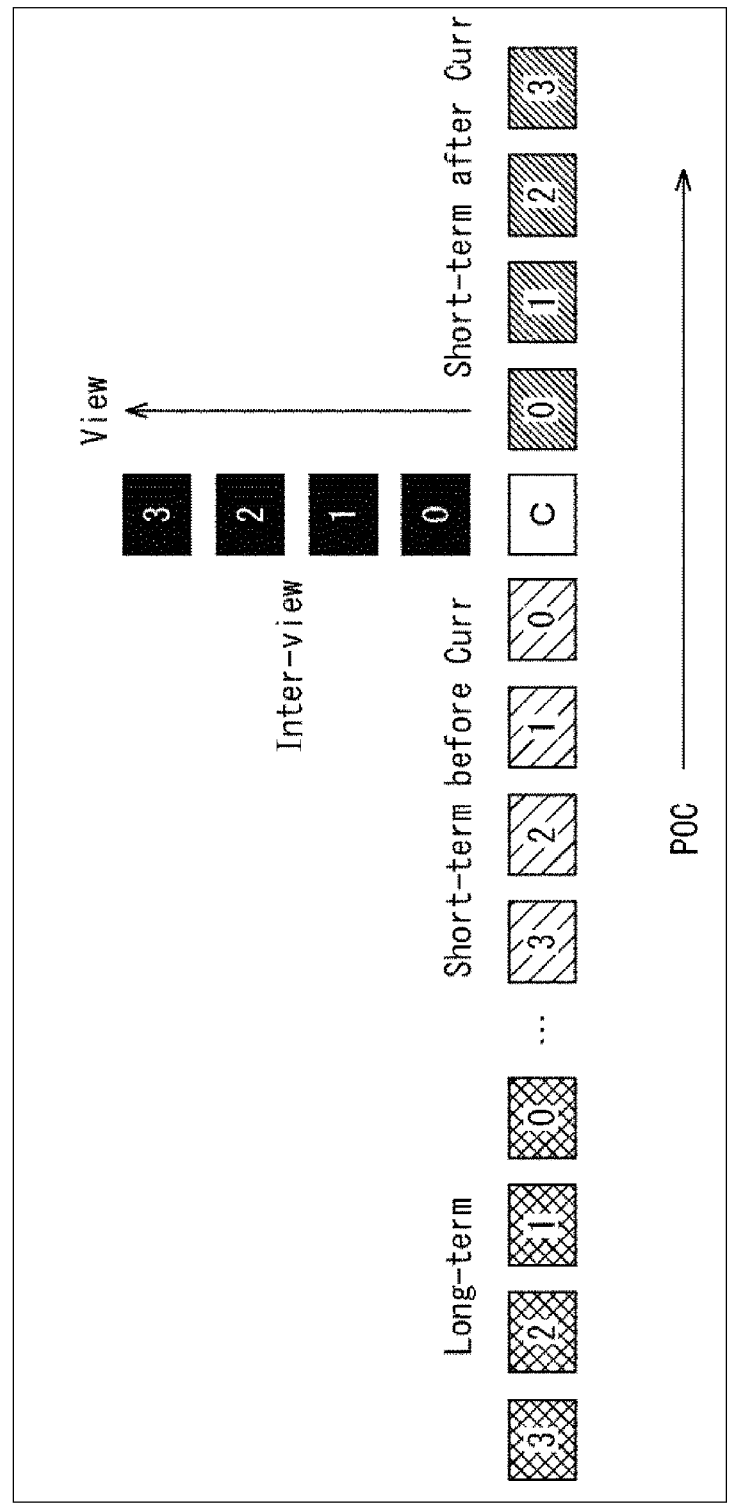
FIG. 6 is a diagram for describing an example of a structure of a reference image.

In the example of FIG. 6, long-term reference images (Long-term: LT), short-term (before) reference images (Short-term before Curr: STbC), a current image indicated by C, and short-term (after) reference images (Short-term after Curr: STaC) are illustrated in an order of POC from the left. Further, the current image indicated by C, and inter-view reference images (Inter-view: IV) are illustrated in an order of a view (parallax) direction from the bottom. Note that the figures illustrated in the respective reference images represent indexes of arrays of the reference images in the decoded picture buffer 112.

In the HEVC system, the four types of images: the long-term reference images, the short-term (before) reference images, the short-term (after) reference images, and the inter-view reference images as illustrated in FIG. 6 can be used as candidates of the reference images in performing inter prediction.

The short-term (before) reference image is a short-term reference image (with smaller POC) temporally positioned before the current image indicated by C in the same view.

The short-term (after) reference image is a short-term reference image (with larger POC) temporally positioned after the current image in the same view. Further, the long-term reference image is a reference image specified for a long term in the same view. The inter-view reference image is a reference image of a different view of the same time.

[Method of Generating Conventional Reference List]

Figure 7:
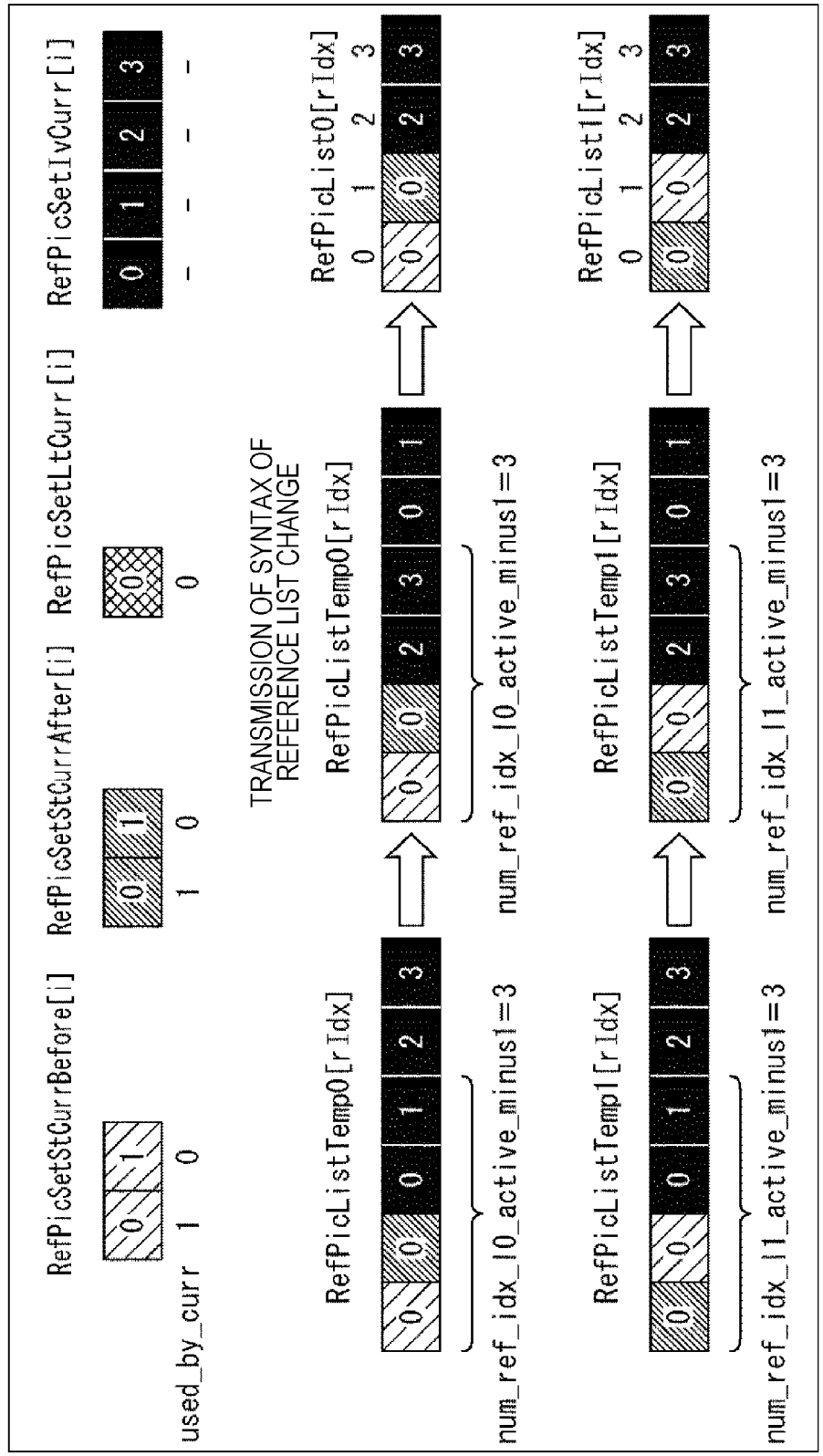
FIG. 7 is a diagram illustrating an example of a conventional method of generating a reference list.

Next, a method of generating the default reference list of the HEVC system will be described with reference to FIG. 7. In the example of FIG. 7, a list (array) (RefPicSetStCurrBefore[i]) of the short-term (before) reference images, a list (RefPicSetStCurrAfter[i]) of the short-term (after) reference images, a list (RefPicLtCurr[i]) of the long-term reference image, and a list (RefPicSetIvCurr[i]) of the inter-view reference images in the decoded picture buffer 112 are illustrated.

In the list of the short-term (before) reference images and the list of the short-term (after) reference images, two reference images are respectively arrayed. In the list of the long-term reference image, one reference image is arrayed. In the list of the inter-view reference images, four reference images are arrayed.

As for the short-term reference images, a used_by_curr flag is set to an image that has a possibility of being referred, in the slice header or syntax of a reference picture set (RPS). The RPS is syntax for clearly indicating a state of the decoded picture buffer for each picture included in the SPS. As for the long-term reference image, the used_by_curr flag is set to an image that has a possibility of being referred, in the slice header or syntax of the SPS. Only the images with the used_by_curr flag of 1 are added to the temporal list to be used in generating the reference list. Hereinafter, the used_by_curr flag is appropriately referred to as reference image flag.

Further, in the example of FIG. 7, a temporal list (RefPicListTemp0[rldx]) of L0 (L0 direction) and a temporal list (RefPicListTemp1[rldx]) of L1 (L1 direction) generated from lists of these reference images are illustrated.

The temporal list (RefPicListTemp0[rldx]) of L0 is generated such that the images with the used_by_curr flag being set to 1 are added in the order of the short-term (before) reference image, the short-term (after) reference image, the long-term reference image, and the inter-view reference images. Note that the used_by_curr flag is not set to the inter-view reference images. Therefore, as for the inter-view reference images, all of the images arrayed in the list of the inter-view reference images are added to the temporal list.

That is, the temporal list (RefPicListTemp0[rldx]) of L0 is generated in the order of the short-term (before) reference image of an index 0, the short-term (after) reference image of an index 0, and the inter-view reference images of indexes 0 to 3.

The temporal list (RefPicListTemp1[rldx]) of L1 is generated such that the images with the used_by_curr flag being set to 1 are added in the order of the short-term (after) reference image, the short-term (before) reference image, the long-term reference image, and the inter-view reference image. That is, the temporal list (RefPicListTemp1[rldx]) of L1 is generated in the order of the short-term (after) reference image of the index 0, the short-term (before) reference image of the index 0, and the inter-view reference images of the indexes 0 to 3.

Here, num_ref_idx_10_active minus1 and num_ref_idx_11_active_minus1 are set in the slice header or the syntax of the SPS, as the number of referable images in the temporal list. The number of the reference images limited by these num_ref_idx_10_active minus1 and num_ref_idx_11_active_minus1 from the heads of the temporal lists of L0/L1 are added to the reference lists and can be used as the reference images.

For example, in a case where num_ref_idx_10_active minus1 is 3, the head (first) to the fourth images in the temporal list of L0 are added to the reference list of L0, and the reference list of L0 is generated. In this case, the reference list of L0 is generated in the order of the short-term (before) reference image of the index 0, the short-term (after) reference image of the index 0, and the inter-view reference image of the indexes 0 and 1.

For example, in a case where num_ref_idx_11_active_minus1 is 3, the head (first) to the fourth images in the temporal list of L1 are added to the reference list of L1, and the reference list of L1 is generated. In this case, the reference list of L1 is generated in the order of the short-term (after) reference image of the index 0, the short-term (before) reference image of the index 0, the inter-view reference images of the indexes 0 and 1.

Here, the inter-view reference images of the indexes 2 and 3 are higher correlated than the inter-view reference images of the indexes 0 and 1 in the list of the inter-view reference images, and it is desired to increase the priority of these inter-view reference images of the indexes 2 and 3 in the temporal list. To realize it, it is necessary to transmit syntax of reference list change.

By transmitting of the syntax of reference list change, as illustrated in the center of the drawing, the priority of the inter-view reference images of the indexes 2 and 3 in the temporal list (RefPicListTemp0[rldx]) of L0 and the temporal list (RefPicListTemp1[rldx]) of L1 can be made higher than that of the indexes 0 and 1.

Accordingly, the reference list (RefPicList0[rldx]) of L0 generated from the temporal list of L0 is generated in the order of the short-term (before) reference image of the index 0, the short-term (after) reference image of the index 0, and the inter-view reference images of the indexes 2 and 3.

Similarly, the reference list (RefPicList1[rldx]) of L1 generated from the temporal list of L1 is generated in the order of the short-term (after) reference image of the index 0, the short-term (before) reference image of the index 0, and the inter-view reference image of the indexes 2 and 3.

As described above, in the HEVC system, to change the order of the inter-view reference image in the reference list, it is necessary to transmit the syntax of reference list change. However, a change command is transmitted with the syntax, an additional bit occurs.

Therefore, in the present technology, a reference image flag (used_by_curr flag) that is information indicating an image having a possibility of being referred, that is, information that controls a reference image referable in the layer (view) direction is set in the SPS or the slice header, with respect to the inter-view reference images.

[Method of Generating Reference List of Present Technology]

Figure 8:
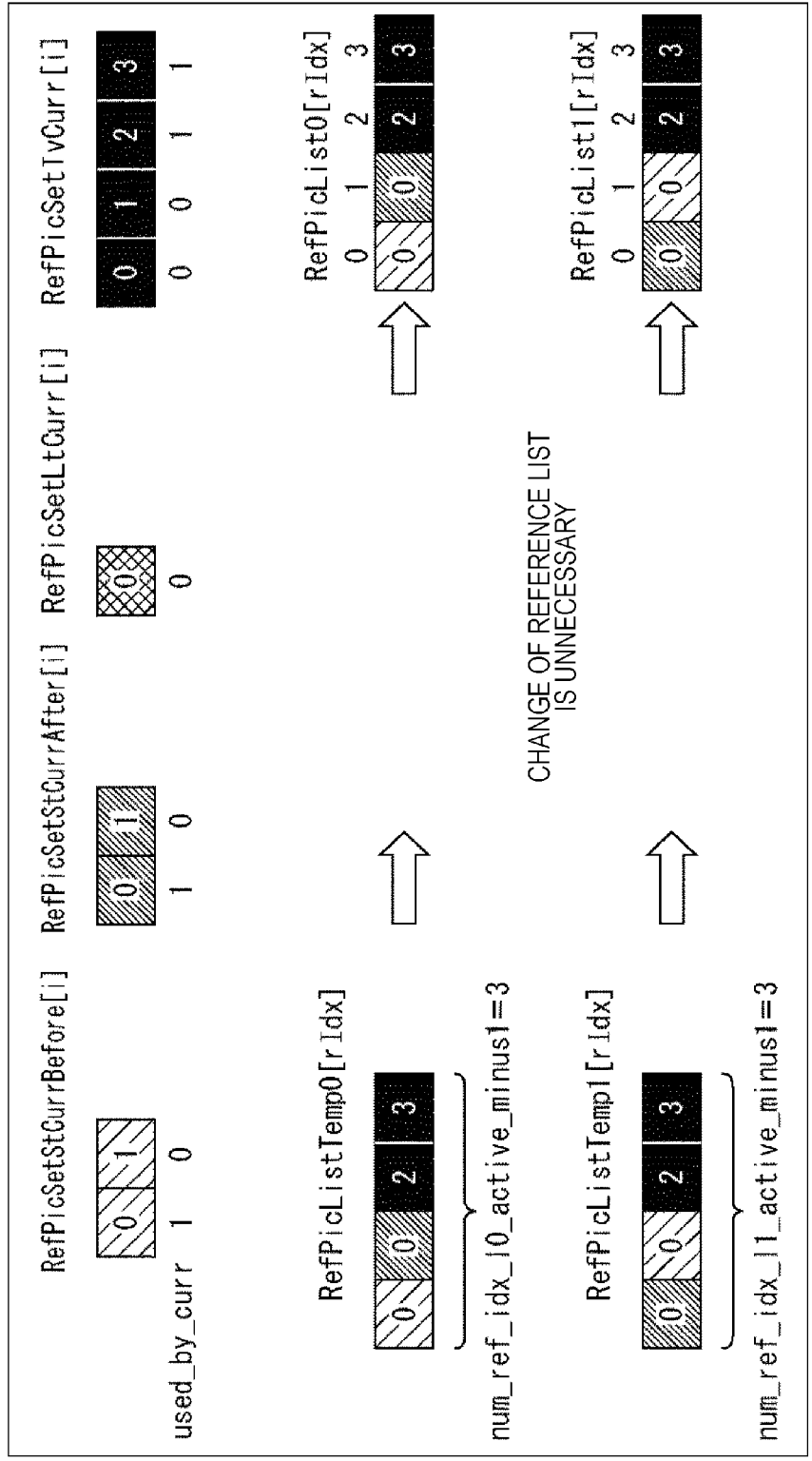
FIG. 8 is a diagram illustrating an example of a method of generating a reference list of the present technology.

Next, a method of generating the default reference list of the present technology will be described with reference to FIG. 8. In the example of FIG. 8, a list (array) (RefPicSetStCurrBefore[i]) of the short-term (before) reference images, a list (RefPicSetStCurrAfter[i]) of the short-term (after) reference images, a list (RefPicLtCurr[i]) of the long-term reference image, and a list (RefPicSetIvCurr[i]) of the inter-view reference images in the decoded picture buffer 112 are illustrated.

In the list of the short-term (before) reference images and the list of the short-term (after) reference images, two reference images are respectively arrayed. In the list of the long-term reference image, one reference image is arrayed. In the list of the inter-view reference images, four reference images are arrayed.

Similarly to the conventional reference list with reference to FIG. 7, as for the short-term reference images, the used_by_curr flag is set to an image having a possibility of being referred, in the slice header or the syntax of the RPS. As for the long-term reference images, the used_by_curr flag is set to an image having a possibility of being referred, in the slice header or the syntax of the SPS. Then, in the present technology, as for the inter-view reference images, the used_by_curr flag is set to an image of being referred, in the slice header or the syntax of the SPS. Only the images with the used_by_curr flag of 1 are added to the temporal list to be used in generating the reference list.

Therefore, a temporal list (RefPicListTemp0[rldx]) of L0 in the example of FIG. 8 is generated in the order of the short-term (before) reference image of the index 0, the short-term (after) reference image of the index 0, and the inter-view reference image of the indexes 2 and 3.

Similarly, a temporal list (RefPicListTemp1[rldx]) of L1 is generated in the order of the short-term (after) reference image of the index 0, the short-term (before) reference image of the index 0, and the inter-view reference images of the indexes 2 and 3.

Then, in this case, according to num_ref_idx_10_active minus1=3, a reference list (RefPicListTemp1[rldx]) of L0 is generated in the order of the short-term (before) reference image of the index 0, the short-term (after) reference image of the index 0, and the inter-view reference images of the indexes 2 and 3. Similarly, according to num_ref_idx_11_active_minus1=3, a reference list (RefPicListTemp1[rldx]) of L1 is generated in the order of the short-term (after) reference image of the index 0, the short-term (before) reference image of the index 0, and the inter-view reference images of the indexes 2 and 3.

As described above, according to the present technology, the inter-view reference images to be added to the default reference list (temporal list) can be set in the reference image list, and thus it is not necessary to send the syntax of reference list change. Therefore, the encoding efficiency can be improved.

[Example of Syntax of VPS]

FIG. 9 is a diagram illustrating an example of syntax of the VPS in the MV-HEVC. The figures in the left end of respective rows are row numbers given for description.

In the example of FIG. 9, view_id[i] is defined in the 10th row. num_direct_ref_layers[i] is defined in the 12th row. In num_direct_ref_layers[i], the number of referable layers is described.

ref_layer_id[i][j] is defined in the 14th row. In ref_layer_id [i][j], referable layer IDs are described by the number described in num_direct_ref_layers[i] of the 12th row.

That is, ref_layer_id[i][j] is substituted for LayerIdInterView[i], and a corresponding inter-view reference image is substituted for the inter-view reference image list RefPicSetIvCurr[i].

[Example of Syntax of SPS Extension]

FIG. 10 is a diagram illustrating an example of syntax of SPS extension of the present technology. The figures in the left end of respective rows are row numbers given for description.

In the example of FIG. 10, ref_layer_modified_sps_flag is defined in the 4th row. When ref_layer_modified_sps_flag is 1, used_by_curr_pic_layer_sps_flag[i] of the 7th row is defined in this SPS extension.

used_by_curr_pic_layer_sps_flag[i] is an inter-view reference image flag that indicates whether ref_layer_id[i][j] of the 14$^{th}$ row of FIG. 9, that is, the inter-view reference image in the inter-view reference image list RefPicSetivCurr[i] has a possibility of being referred. When used_by_curr_pic_layer_sps_flag[i] is 1, the corresponding inter-view reference image is added to the temporal list (that is, the reference list).

[Example of Syntax of Slice Header Extension]

FIG. 11 is a diagram illustrating an example of syntax of slice header extension of the present technology. The figures in the left end of respective rows are row numbers given for description.

In the example of FIG. 11, ref_layer_modified_sps_flag is defined in the 4$^{th}$ row. When ref_layer_modified_sps_flag is 1, used_by_curr_pic_layer_sps_flag[i] of the 7$^{th}$ row is defined in this SPS extension.

used_by_curr_pic_layer_sps_flag[i] is an inter-view reference image flag that indicates whether ref_layer_id[i][j] of the 14$^{th}$ row of FIG. 9 described above, that is, the inter-view reference image in the inter-view reference image list RefPicSetivCurr[i] has a possibility of being referred. When used_by_curr_pic_layer_sps_flag[i] is 1, a corresponding inter-view reference image is added to the temporal list (that is, the reference list).

That is, the inter-view reference image flags illustrated in FIGS. 10 and 11 are the layer reference image information that controls addition of the reference images referable in the layer direction.

The layer reference image information is set to the SPS or the slice header, and transmitted. However, the layer reference image information may be set to another syntax as long as the another syntax is lower than the VPS.

Note that, in the above description, an example has been described, similarly to the conventional reference list, in which the addition orders of the inter-view images to the reference list (temporal list) are the same in L0 and L1. However, the orders can be changed between L0 and L1.

[Arrangement Among Inter-View Images]

Next, an arrangement order among inter-view images in the present technology will be described with reference to FIG. 12.

In a conventional technology, appropriate inter-view reference images are added to the reference list (temporal list) in the order of j=0, 1, 2, . . . based on ref_layer_id[i][j] of the VPS. This processing is completely the same between L0 and L1, and thus the orders of arrangement of the inter-view reference images in the temporal lists L0/L1 are the same.

Therefore, in the present technology, to the temporal list of L0, the inter-view reference images are added in the order of ref_layer_id[i] [j] (j=0, 1, 2, . . . ). Further, to the temporal list of L1, the inter-view reference images are added in the order of ref_layer_id[i] [j] (j= . . . , 2, 1, 0).

Figure 12:
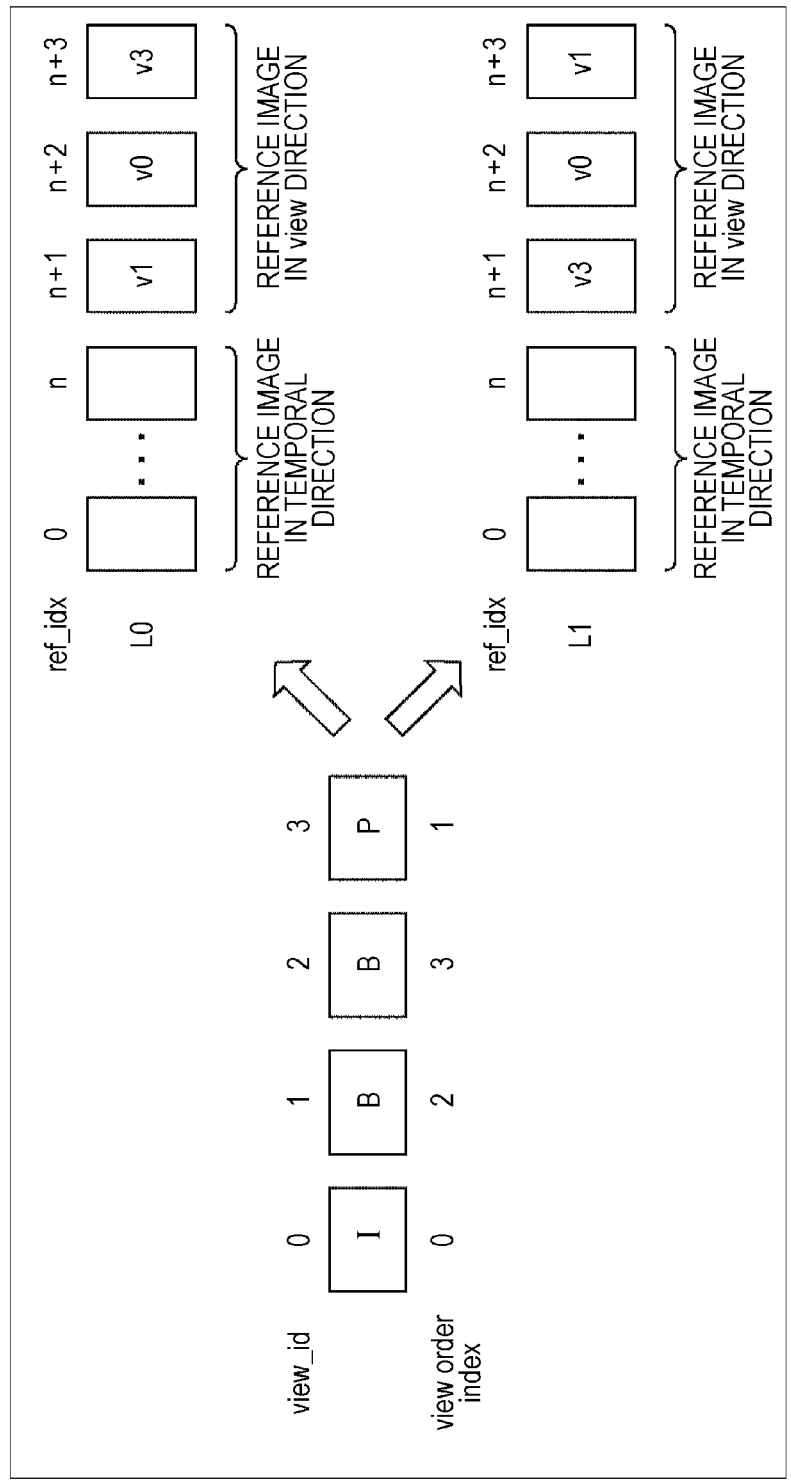
FIG. 12 is a diagram for describing an arrangement order among inter-view images in the present technology.

To be specific, as illustrated on the left side of FIG. 12, assume that the reference relationship is described in the order of view_id=1, 0, 3 in the VPS when the view image of view_id=2 is encoded in the four views of view_id=0, 1, 2, 3.

In this case, in the present technology, as illustrated in the right side of FIG. 12, the inter-view reference images are arranged in the order of view_id=1, 0, 3 described in the VPS in the temporal list of L0. Further, the inter-view reference images are arranged in the order=3, 0, 1, which is a reverse order of view_id described in the VPS, in the temporal list of L1.

In doing so, in the temporal lists of L0/L1, when only the images of ref id=(n+1)th are referred, that is, when only the images of ref id=(n+1)th are added to the reference list, different inter-view reference images can be referred between L0 and L1.

To be specific, in the example of FIG. 12, (N+1)th is v1 of view_id=1 in L0, while (N+1)th is v3 of view_id=3 in L1. Therefore, (n+1)th inter-view reference image can be changed between L0 and L1.

As described above, the different inter-view reference images can be referred between L0/L1. Therefore, there is a high possibility that performance of parallax prediction becomes better than a case of using the same image, and improvement of the encoding efficiency can be expected.

Note that, in the description in Non-Patent Document 1, as illustrated by the solid line of FIG. 13, no change is given to L0. However, as illustrated by the dotted line of FIG. 13, change is given such that the inter-view images are added in the reverse order of L0.

Figure 14:
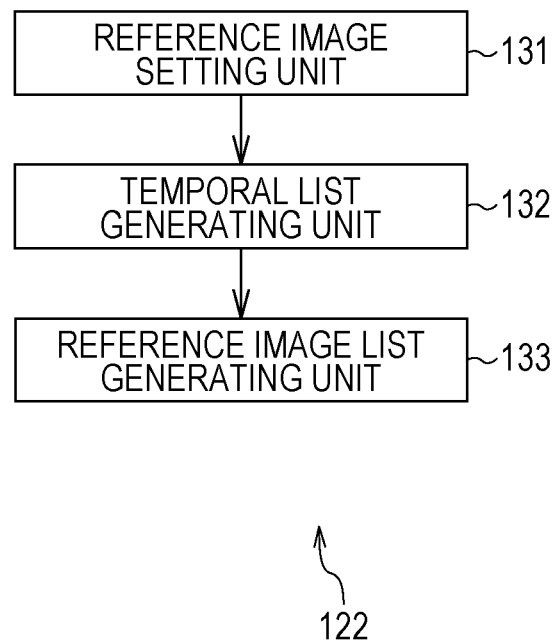
FIG. 14 is a block diagram illustrating a configuration example of a reference list generating unit of FIG. 2.

The reference list generating unit 122 of FIG. 2, which performs the above processing, is configured as illustrated in next FIG. 14.

[Configuration Example of Reference List Generating Unit]

FIG. 14 is a block diagram illustrating a configuration example of a reference list generating unit that performs the above-described processing.

In the example of FIG. 14, the reference list generating unit 122 includes a reference image setting unit 131, a temporal list generating unit 132, and a reference image list generating unit 133.

The reference image setting unit 131 sets the short-term (before) reference images by reference to the time information (that is, the POC information) of the reference images from the decoded picture buffer 112 and the used_by_curr flag of the short-term reference image set to the slice header or the RPS from the syntax processing unit 121, and generates the short-term (before) reference image list (RefPicSetStCurrBefore[i]). The reference image setting unit 131 sets the short-term (after) reference images by reference to the time information of the reference images from the decoded picture buffer 112 and the used_by_curr flag of the short-term reference image set to the slice header or the RPS from the syntax processing unit 121, and generates the short-term (after) reference image list (RefPicSetStCurrAfter[i]).

The reference image setting unit 131 sets the long-term reference image by reference to the time information of the reference image from the decoded picture buffer 112 and the used_by_curr flag of the long-term reference image set to the slice header or the SPS, and generates the long-term reference image list (RefPicLtCurr[i]). The reference image setting unit 131 sets the inter-view reference images (RefPicSetIvCurr[i]) by reference to the view information of the reference images from the decoded picture buffer 112 and the used_by_curr flag of the inter-view reference images set to the slice header or the SPS, and generates the list.

The temporal list generating unit 132 combines the lists set by the reference image setting unit 131 in a predetermined order, and generates the temporal lists (RefPicListTemp0[rIdx] and RefPicListTemp1[rIdx]) of L0 and L1. Note that the lists set by the reference image setting unit 131 are combined in the order of the short-term (before) reference images, the short-term (after) reference images, the long-term reference image, and the inter-view reference images in the case of L0. Further, the lists set by the reference image setting unit 131 are combined in the order of the short-term (after) reference images, the short-term (before) reference images, the long-term reference image, and the inter-view reference images in the case of L1.

The reference image list generating unit 133 refers to num_ref_idx_l0_active_minus1 and num_ref_idx_l1_active_minus1 set in the slice header or the SPS supplied from the syntax processing unit 121. The reference image list generating unit 133 extracts and adds the reference images by the number set in the num_ref_idx_l0_active_minus1 and num_ref_idx_l1_active_minus1, from the temporal lists of L0/L1 generated by the temporal list generating unit 132, to generate the reference lists of L0/L1.

The reference lists of L0/L1 generated by the reference image list generating unit 133 are referred by the motion parallax prediction/compensation unit 115.

[Flow of Processing of Image Encoding Device]

Figure 15:
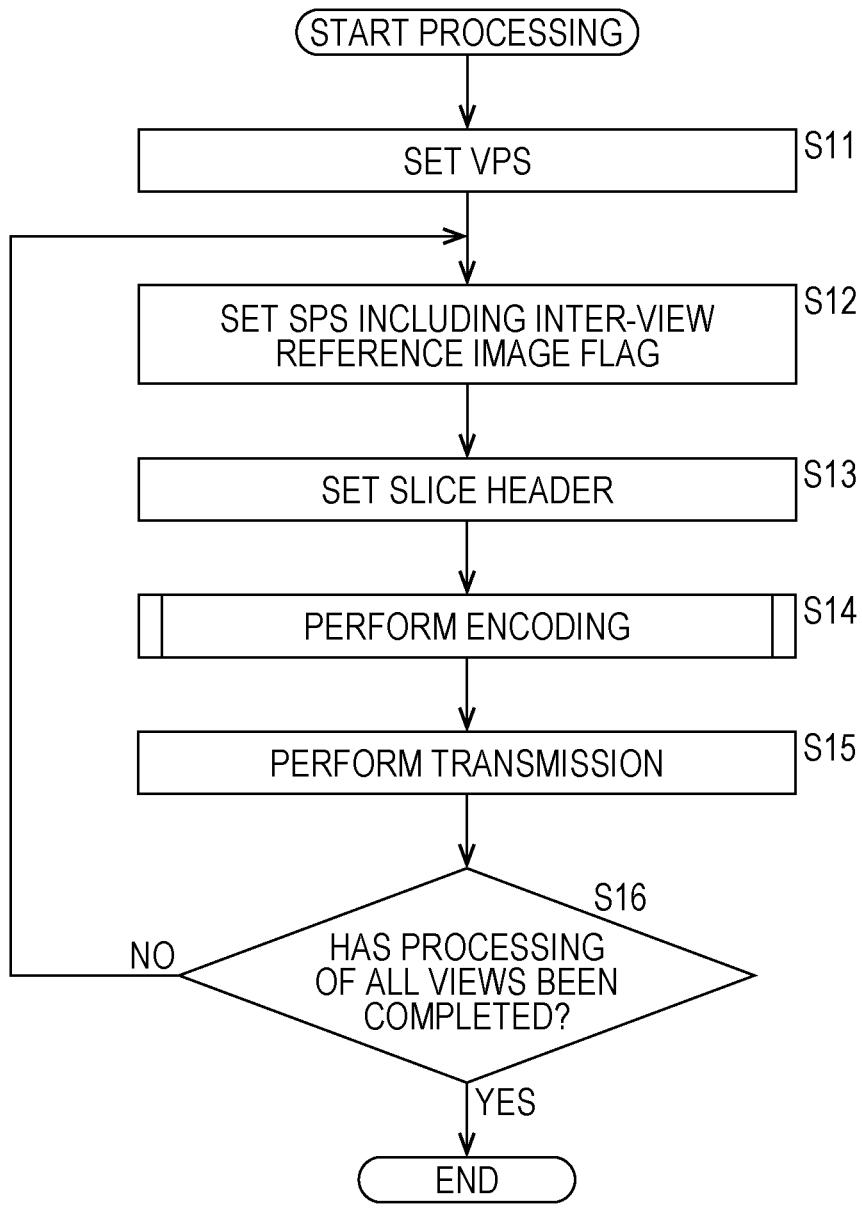
FIG. 15 is a flowchart for describing an example of a flow of processing in the image encoding device of FIG. 1.

Next, a flow of processing executed by the image encoding device 1 of the above will be described with reference to the flowchart of FIG. 15. Note that, in FIG. 15, an example in which the inter-view reference image flag is set to the SPS is illustrated as an example.

The setting information by the user from a preceding step (not illustrated) is input to the VPS setting unit 11 of the image encoding device 1.

At step S11, the VPS setting unit 11 sets the VPS, based on the setting information from the preceding step (not illustrated). The VPS setting unit 11 supplies the set VPS to the SPS setting unit 12 together with the setting information.

At step S12, the SPS setting unit 12 sets the SPS including the inter-view reference image flag, based on the setting information from the VPS setting unit 11. That is, the SPS setting unit 12 sets the SPS, based on the setting information from the VPS setting unit 11. At this time the SPS setting unit 12 sets the inter-view reference image flag in the SPS, as illustrated in FIG. 10.

The SPS setting unit 12 supplies the set SPS to the slice header setting unit 13 together with the VPS and the setting information. Note that the VPS is set to only the head of a sequence. Therefore, the SPS setting unit 12 supplies the set SPS to the slice header setting unit 13 together with the setting information, other than the head of the sequence. The same applies to the following.

At step S13, the slice header setting unit 13 sets the slice header, based on the setting information from the SPS setting unit 12. The slice header setting unit 13 supplies the set slice header to the encoding unit 14 together with the VPS and the SPS.

A multi-view image such as a captured image or the like in frame units is input to the encoding unit 14, as an input signal. At step S14, the encoding unit 14 encodes the input signal in the HEVC system by reference to the header information such as the VPS, the SPS, the slice header, and the like from the slice header setting unit 13. Details of the encoding processing will be described below with reference to FIG. 16.

At step S14, the inter-view reference image flag of the SPS is referred and the reference list is generated, and image prediction is performed based on the reference list. Further, the encoding processing is performed, and an encoded stream is generated from the encoded data obtained as a result of the encoding processing, the VPS, the SPS, the slice header, and the like. The generated encoded stream is supplied to the transmitting unit 15.

At step S15, the transmitting unit 15 transmits the encoded stream supplied from the encoding unit 14 to the image decoding device 151 of FIG. 18 described below.

At step S16, the SPS setting unit 12 determines whether the processing of all of the views (layers) has been completed. When it is determined that the processing of all of the views (layers) has been completed at step S16, the processing of the image encoding device 1 is terminated. When it is determined that the processing of all of the views (layers) has not yet been completed at step S16, the processing is returned to step S12, and the processing of step S12 and the subsequent steps is repeated.

[Flow of Encoding Processing]

Next, an example of a flow of the encoding processing at step S14 of FIG. 15 will be described with reference to the flowchart of FIG. 16.

At step S101, the A/D converter 101 performs A/D conversion of the input image. At step S102, the screen rearrangement buffer 102 stores the image subjected to the A/D conversion, and performs rearrangement of the pictures from the display order to the order of encoding.

At step S103, the syntax processing unit 121 sequentially confirms the data of the image read from the screen rearrangement buffer 102, and inserts the header information such as the VPS, the SPS (including the RPS), and the slice header to the data of the image. The syntax processing unit 121 supplies the image to which the header information and the like are inserted to the calculation unit 103, the intra prediction unit 114, and the motion parallax prediction/compensation unit 115. Further, the syntax processing unit 121 supplies the header information such as the VPS, the SPS (including the RPS), and the slice header to the reference list generating unit 122.

At step S104, the calculation unit 103 calculates a residual between the image supplied from the syntax processing unit 121 and the predicted image. The predicted image is supplied from the motion parallax prediction/compensation unit 115 in the case of inter prediction, and supplied from the intra prediction unit 114 in the case of intra prediction, to the calculation unit 103 through the selecting unit 116.

The amount of data of the difference data is decreased, compared with that of the original image data. Therefore, the amount of data can be compressed, compared with the case of encoding the data as it is.

At step S105, the orthogonal transform unit 104 orthogonally transforms the difference information generated by the processing of step S104. To be specific, the orthogonal transform such as discrete cosine transform or Karhunen Loéve transform is performed, and the transform coefficient is output.

At step S106, the quantization unit 105 quantizes the orthogonal transform coefficient obtained by the processing of step S105.

The difference information quantized by the processing of step S106 is locally decoded as follows. That is, at step S107, the inverse quantization unit 108 inversely orthogonally transforms the orthogonal transform coefficient (may also be referred to as quantized coefficient) quantized and generated by the processing of step S106, according to characteristics corresponding to the characteristics of the quantization unit 105.

At step S108, the inverse orthogonal transform unit 109 inversely orthogonally transforms the orthogonal transform coefficient obtained by the processing of step S107 according to the characteristics corresponding to the characteristics of the orthogonal transform unit 104.

At step S109, the calculation unit 110 adds the predicted image to the locally decoded difference information, and generates a locally decoded image (an image corresponding to the input to the calculation unit 103).

At step S110, the deblocking filter 111 performs filtering of the image supplied from an adding unit 205, and removes block distortion. The deblocking filter 111 supplies the image obtained as a result of the filter processing to the adaptive offset filter 123.

At step S111, the adaptive offset filter 123 performs adaptive offset filter processing for the image supplied from the deblocking filter 111, for each LCU. The adaptive offset filter 123 supplies an image obtained as a result of the filter processing to the adaptive loop filter 124. Further, the adaptive offset filter 123 supplies the storage flag, the index or the offset, and the type information to the lossless encoding unit 106, as offset filter information, for each LCU.

At step S112, the adaptive loop filter 124 performs adaptive loop filter processing for the image supplied from the adaptive offset filter 123, for each LCU. The adaptive loop filter 124 supplies an image obtained as a result of the filter processing to the decoded picture buffer 112. Further, the adaptive loop filter 124 supplies the filter coefficient used in the adaptive loop filter processing to the lossless encoding unit 106.

At step S113, the decoded picture buffer 112 stores the image subjected to the filter processing. Note that an image not subjected to the filter processing is also supplied from the calculation unit 110 to the decoded picture buffer 112 and stored therein. The images accumulated in the decoded picture buffer 112 are supplied to the motion parallax prediction/compensation unit 115 or the intra prediction unit 114 through the selecting unit 213, as the reference images.

At step S114, the intra prediction unit 114 performs intra prediction processing in the intra prediction mode.

At step S115, the reference list generating unit 122 generates the reference list to be referred by the motion parallax prediction/compensation unit 115 in predicting the current image. Details of the processing of generating the reference list will be described below with reference to FIG. 17.

At step S115, the temporal list to be used in generating the reference list is generated based on a view reference image flag of the SPS. Then, the reference list is generated based on the generated temporal list. That is, the reference list is generated based on the view reference image flag.

At step S116, the motion parallax prediction/compensation unit 115 performs inter motion parallax prediction processing that performs motion parallax prediction and motion parallax compensation in the inter prediction mode, using the reference image of a reference image index indicated in the reference list generated by the processing of step S115.

At step S117, the selecting unit 116 determines an optimum prediction mode, based on cost function values output from the intra prediction unit 114 and the motion parallax prediction/compensation unit 115. That is, the selecting unit 116 selects one of the predicted image generated by the intra prediction unit 114, and the predicted image generated by the motion parallax prediction/compensation unit 115.

Further, selection information that indicates which predicted image has been selected is supplied to one of the intra prediction unit 114 and the motion parallax prediction/compensation unit 115, from which the predicted image has been selected. When the predicted image in an optimum intra prediction mode has been selected, the intra prediction unit 114 supplies information (that is, the intra prediction mode information) that indicates the optimum intra prediction mode to the lossless encoding unit 106.

When the predicted image in an optimum inter prediction mode has been selected, the motion parallax prediction/compensation unit 115 outputs information that indicates the optimum inter prediction mode, and information according to the optimum inter prediction mode as needed to the lossless encoding unit 106. Examples of the information according to the optimum inter prediction mode include the motion vector information, parallax vector information, flag information, reference frame information.

At step S118, the lossless encoding unit 106 encodes the transform coefficient quantized by the processing of step S106. That is, lossless encoding such as variable length coding and arithmetic coding is performed for a difference image (a secondary difference image in the case of inter prediction).

Further, the lossless encoding unit 106 adds information related to the prediction mode of the predicted image selected by the processing of step S117 to the encoded data obtained by encoding the difference image. That is, the lossless encoding unit 106 adds the intra prediction mode information supplied from the intra prediction unit 114, or the information according to the optimum inter prediction mode supplied from the motion parallax prediction/compensation unit 115 and the like to the encoded data.

At step S119, the accumulation buffer 107 accumulates the encoded data output from the lossless encoding unit 106. The accumulation buffer 107 generates an encoded stream from the accumulated encoded data, the VPS, the SPS, the slice header, and the like, and supplies the generated encoded stream to the transmitting unit 15 of the FIG. 1.

At step S120, the rate control unit 117 controls the rate of the quantization operation of the quantization unit 105 so that an overflow or an underflow does not occur based on the compressed image accumulated in the accumulation buffer 107 by the processing of step S119.

When the processing of step S120 is completed, the encoding processing is terminated.

[Flow of Reference List Generating Processing]

Next, an example of a flow of reference list generating processing executed at step S115 of FIG. 16 will be described with reference to the flowchart of FIG. 17. Note that this processing is executed only in a case where the decoded image (that is, the current image to be predicted) is a P picture or a B picture.

Figure 16:
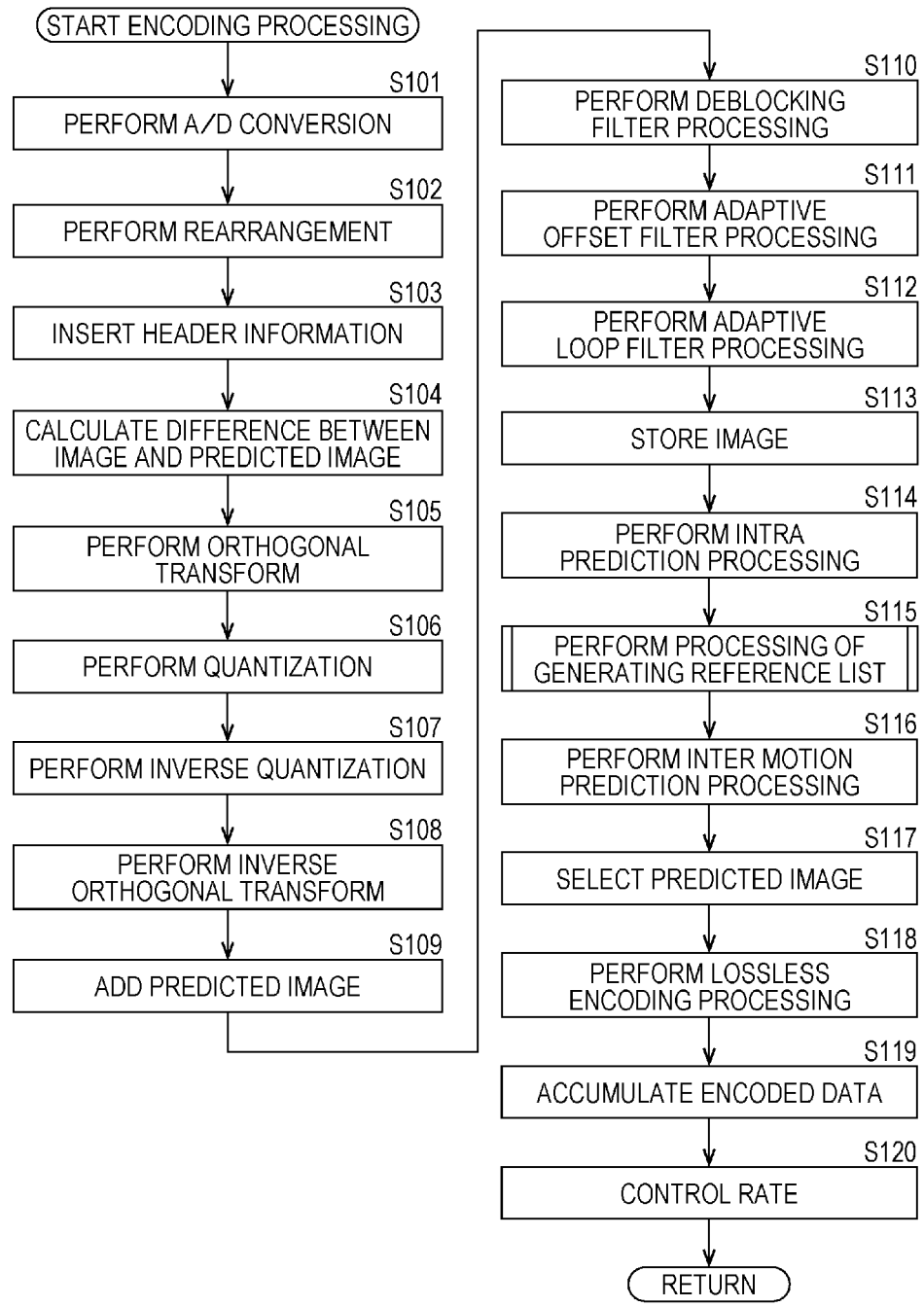
FIG. 16 is a flowchart for describing an example of a flow of encoding processing.
Figure 17:
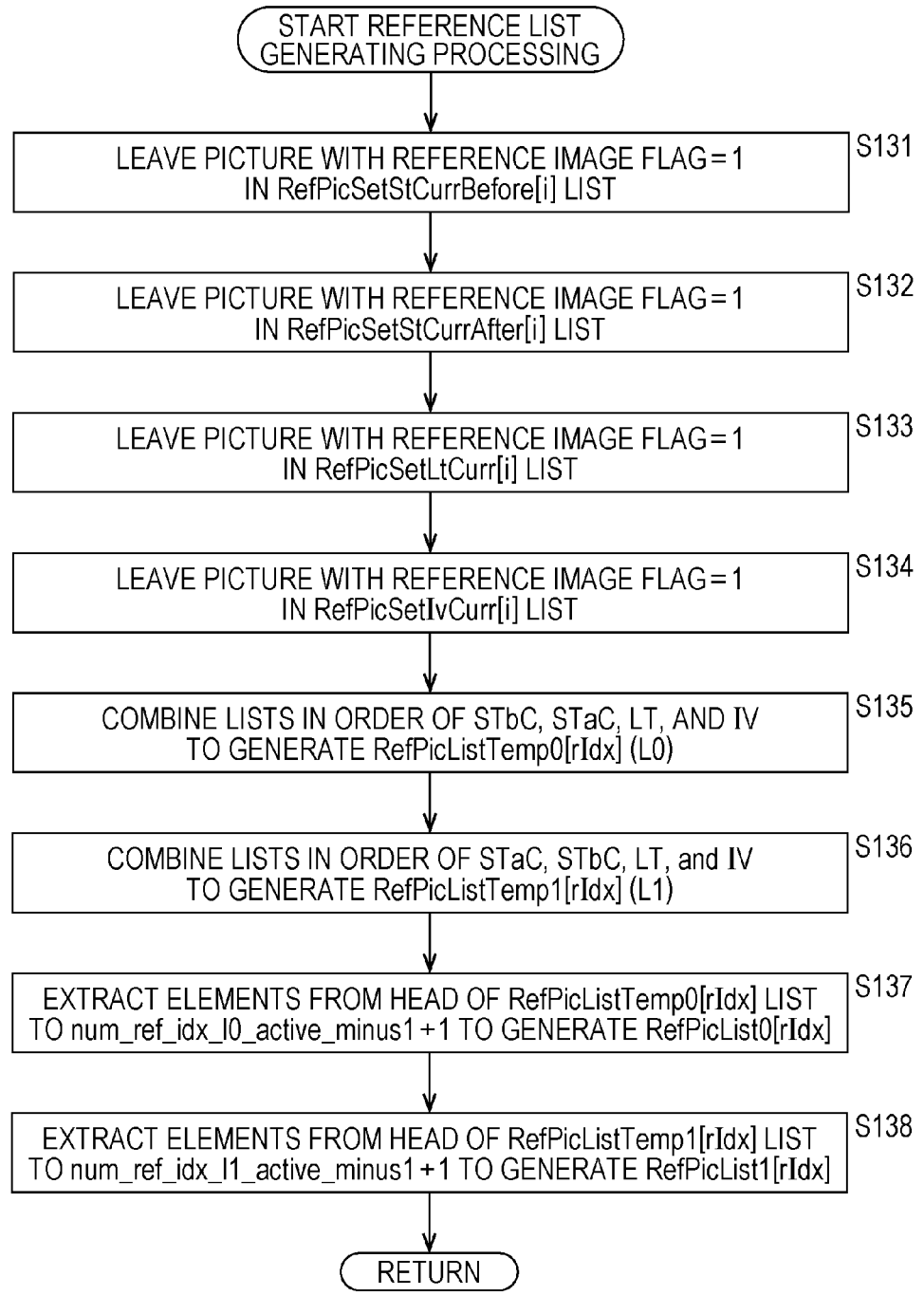
FIG. 17 is a flowchart for describing an example of a flow of reference list generating processing.

At step S103 of FIG. 16 above, the header information such as the VPS of the decoded image, the SPS (including the RPS), and the slice header are supplied from the syntax processing unit 121 to the reference list generating unit 122. The used_by_curr flag of the short-term reference image is set to the slice header or the RPS supplied from the syntax processing unit 121. The used_by_curr flag of the long-term reference image is set to the slice header or the SPS. Further, the used_by_curr flag (inter-view reference image flag) of the inter-view reference image is set to the slice header or the SPS at step S12 of FIG. 15.

The reference image setting unit 131 of the reference list generating unit 122 sets the short-term (before) reference image (STbC) by reference to the time information (that is, the POC information) of the reference image from the decoded picture buffer 112, and the slice header or the RPS, and generates the RefPicSetStCurrBefore[i] list. Then, at step S131, the reference image setting unit 131 leaves, in the RefPicSetStCurrBefore[i] list, the reference image with the reference image flag (used_by_curr flag)=1 of the short-term (before) reference image in the slice header or the RPS.

The reference image setting unit 131 sets the short-term (after) reference image (STaC) by reference to the time information of the reference image, and the slice header or the RPS from the decoded picture buffer 112, and generates the RefPicSetStCurrAfter[i] list. At step S132, the reference image setting unit 131 leaves, in the RefPicSetStCurrAfter

[i] list, the reference image with the reference image flag (used_by_curr flag)=1 of the short-term (after) reference image in the slice header or the RPS.

The reference image setting unit 131 sets the long-term reference image (LT) by reference to the time information of the reference image, and the slice header, and the SPS from the decoded picture buffer 112, and generates the RefPicLtCurr[i] list. At step S133, the reference image setting unit 131 leaves, in the RefPicLtCurr[i] list, the reference image with the reference image flag (used_by_curr flag)=1 of the long-term reference image in the slice header or the SPS.

The reference image setting unit 131 sets the inter-view reference image (IV) by reference to the view information of the reference image, the slice header, the SPS, and the VPS from the decoded picture buffer 112, and generates the aRefPicSetIvCurr[i] list. At step S134, the reference image setting unit 131 leaves, in the RefPicSetIvCurr[i] list, the reference image with the reference image flag (used_by_curr flag)=1 of the inter-view reference image in the slice header or the SPS.

At step S135, the temporal list generating unit 132 combines the above four types of lists set by the reference image setting unit 131 in the order of STbC, STaC, LT, and IV, and generates the temporal list (RefPicListTemp0[rIdx]) of L0.

That is, only the reference images with the used_by_curr flag of 1 in the above four types of lists are combined in the order of STbC, STaC, LT, and IV, and the temporal list of L0 is generated.

At step S136, the temporal list generating unit 132 combines the above four types of lists set by the reference image setting unit 131 in the order of STaC, STbC, LT, and IV, and generates the temporal list (RefPicListTemp1[rIdx]) of L1.

That is, only the reference images with the used_by_curr flag of 1 are combined in the order of STaC, STbC, LT, and IV, and the temporal list of L1 is generated. Note that, at that time, the reference images may be added in the reverse order to the order of the L0 direction, as described with reference to FIG. 12.

num_ref_idx_l0_active minus1 and num_ref_idx_l1_active_minus1 are set to the slice header or the SPS supplied from the syntax processing unit 121.

At step S137, the reference image list generating unit 133 extracts elements from the head of the temporal list (RefPicListTemp0[rIdx]) of L0 to num_ref_idx_l0_active minus1+1, and generates the reference list (RefPicList0[rIdx]) of L0.

At step S138, the reference image list generating unit 133 extracts elements from the head of the temporal list (RefPicListTemp1[rIdx]) of L1 to num_ref_idx_l1_active_minus1+1, and generates the reference list (RefPicList1[rIdx]) of L1.

As described above, the reference image flag (used_by_curr flag) of the inter-view reference image in the slice header or the SPS is referred and the inter-view image is inserted, and the default reference list is generated.

2. Second Embodiment

Image Decoding Device

Figure 18:
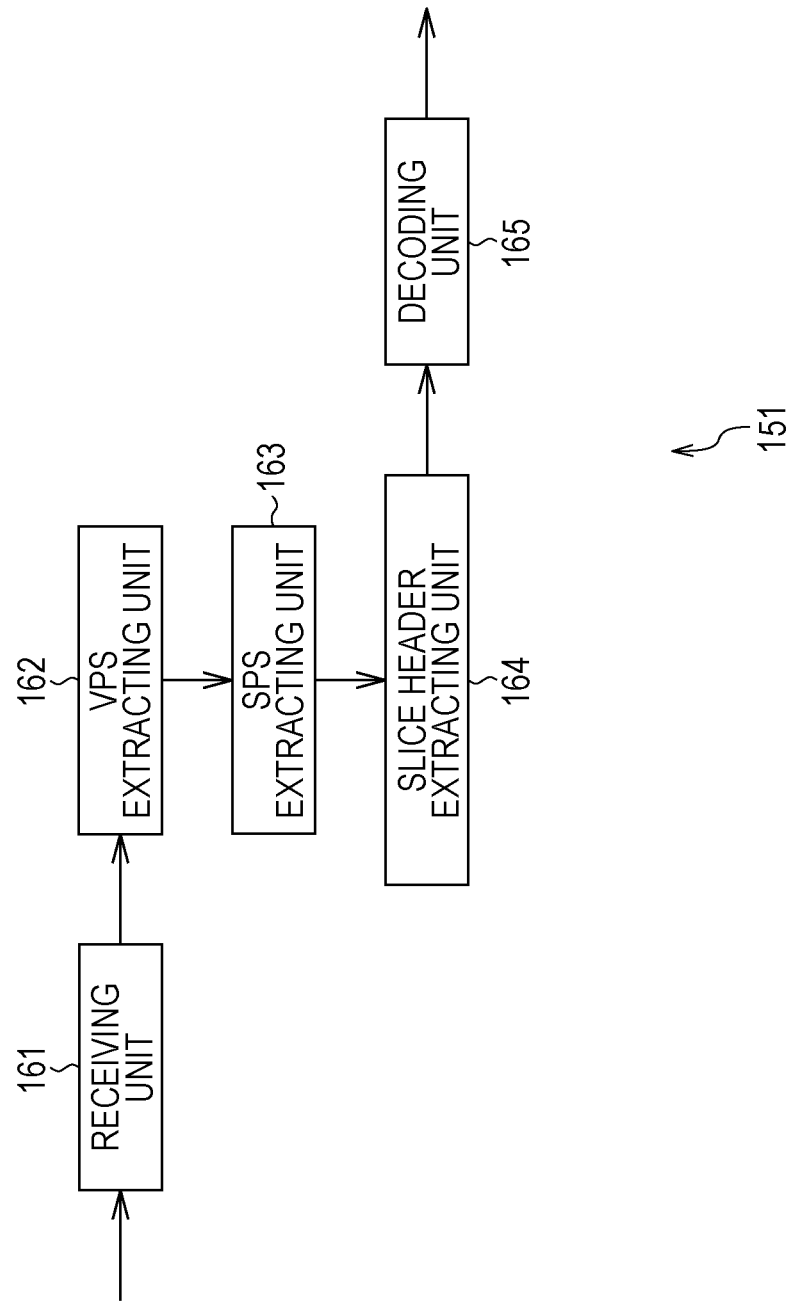
FIG. 18 is a block diagram illustrating a principal configuration example of an image decoding device.

FIG. 18 illustrates an embodiment of an image decoding device as an image processing apparatus to which the present disclosure is applied. An image decoding device 151 illustrated in FIG. 18 is an image decoding device corresponding to an image encoding device 1 of FIG. 1.

An encoded stream encoded by an image encoding device 1 of FIG. 1 is transmitted to the image decoding device 151 corresponding to the image encoding device 1 through a predetermined transmission path, and decoded in an HEVC system, or the like.

The image decoding device 151 of FIG. 18 includes a receiving unit 161, a VPS extracting unit 162, an SPS extracting unit 163, a slice header extracting unit 164, and a decoding unit 165.

The receiving unit 161 of the image decoding device 151 receives an encoded stream transmitted from the image encoding device 1 of FIG. 1, and supplies the encoded stream to the VPS extracting unit 162. The VPS extracting unit 162 extracts a VPS from the encoded stream supplied from the receiving unit 161, and supplies the extracted VPS and the encoded stream to the SPS extracting unit 163.

The SPS extracting unit 163 extracts an SPS from the encoded stream supplied from the VPS extracting unit 162, and supplies the extracted SPS, the VPS, and the encoded stream to the slice header extracting unit 164. The slice header extracting unit 164 extracts a slice header from the encoded stream supplied from the SPS extracting unit 163. Further, the slice header extracting unit 164 extracts encoded data from the encoded stream supplied from the SPS extracting unit 163. The slice header extracting unit 164 supplies the extracted slice header and encoded data, the SPS, and the VPS to the decoding unit 165. Note that the VPS, the SPS, the slice header, and the like may be decoded as needed in the extracting units.

The decoding unit 165 decodes the encoded data supplied from the slice header extracting unit 164 in the HEVC system by reference to the header information such as the VPS, the SPS, and the slice header supplied from the slice header extracting unit 164 as needed. The decoding unit 165 supplies the decoded image obtained as a result of the decoding to a display control unit of a subsequent step (not illustrated), as an output signal.

[Configuration Example of Decoding Unit]

Figure 19:
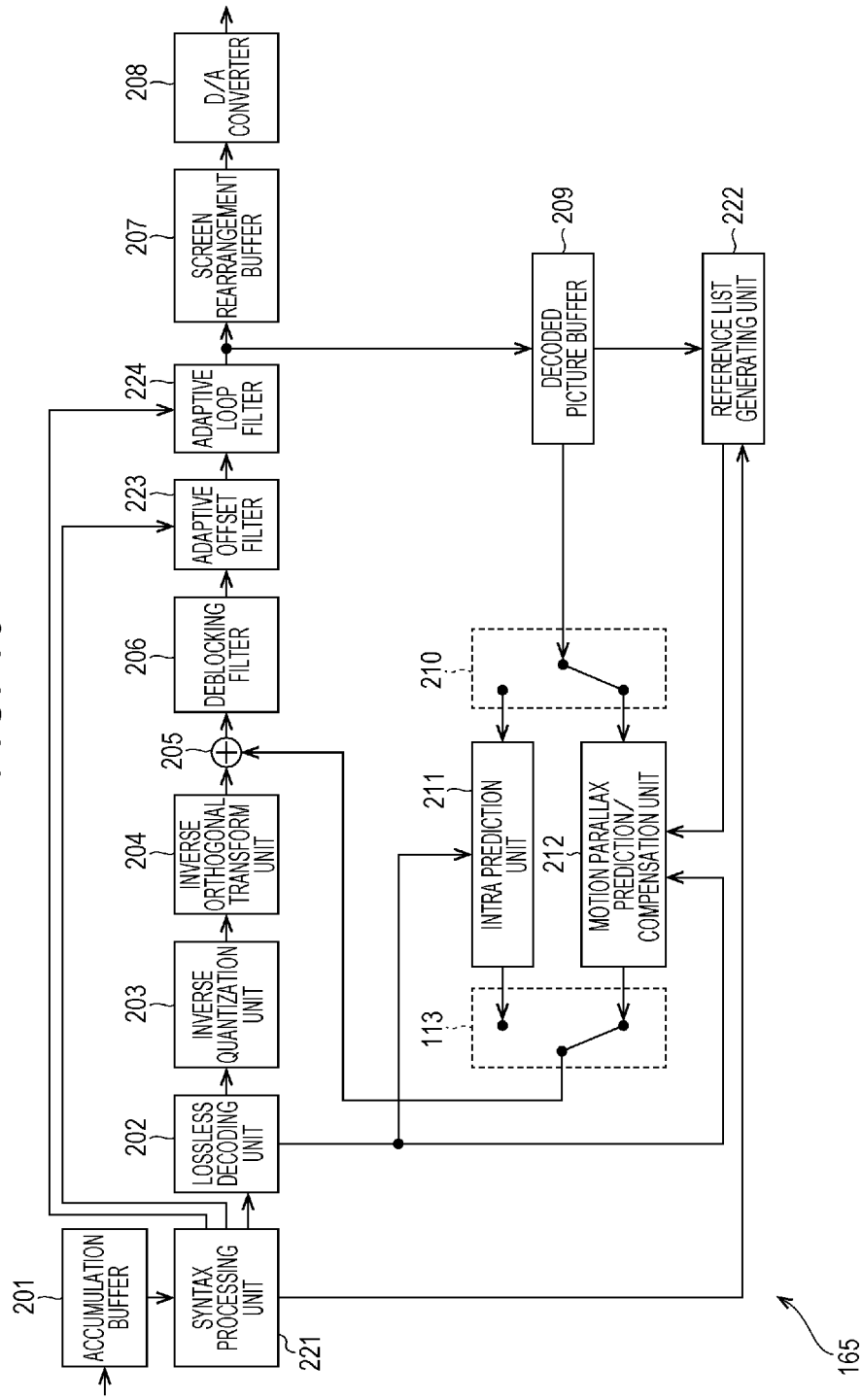
FIG. 19 is a block diagram illustrating a configuration example of a decoding unit.

FIG. 19 is a block diagram illustrating a configuration example of the decoding unit 165 of FIG. 18.

As illustrated in FIG. 19, the decoding unit 165 includes an accumulation buffer 201, a lossless decoding unit 202, an inverse quantization unit 203, an inverse orthogonal transform unit 204, a calculation unit 205, a deblocking filter 206, a screen rearrangement buffer 207, and a D/A converter 208. Further, the decoding unit 165 includes a decoded picture buffer 209, a selecting unit 210, an intra prediction unit 211, a motion parallax prediction/compensation unit 212, and a selecting unit 213.

Further, the decoding unit 165 includes a syntax processing unit 221, a reference list generating unit 222, an adaptive offset filter 223, and an adaptive loop filter 224.

The accumulation buffer 201 accumulates the encoded data from the slice header extracting unit 164. The encoded data is data encoded by the image encoding device 1. The syntax processing unit 221 acquires the encoded data read from the accumulation buffer 201 at predetermined timing, and the header information such as the VPS, the SPS, and the slice header, and supplies the acquired header information to the lossless decoding unit 202 together with the encoded data. Further, the syntax processing unit 221 supplies the acquired header information and the like to the reference list generating unit 222.

The lossless decoding unit 202 decodes the encoded data from the syntax processing unit 221, in a system corresponding to the encoding system of the lossless encoding unit 106 of FIG. 2. The inverse quantization unit 203 inversely quantizes coefficient data (quantization coefficient) decoded and obtained by the lossless decoding unit 202, in a system corresponding to the quantization system of the quantization unit 105 of FIG. 2. That is, the inverse quantization unit 203 inversely quantizes the quantization coefficient by a method similar to the inverse quantization unit 108 of FIG. 2, using the quantization parameter supplied from the image encoding device 1.

The inverse quantization unit 203 supplies the inversely quantized coefficient data, that is, the orthogonal transform coefficient to the inverse orthogonal transform unit 204. The inverse orthogonal transform unit 204 inversely orthogonally transforms the orthogonal transform coefficient in a system corresponding to the orthogonal transform system of the orthogonal transform unit 104 of FIG. 2, and obtains decoded residual data corresponding to residual data of before being subjected to the orthogonal transform in the image encoding device 1.

The decoded residual data obtained through the inverse orthogonal transform is supplied to the calculation unit 205. Further, a predicted image is supplied to the calculation unit 205 from the intra prediction unit 211 or the motion parallax prediction/compensation unit 212 through the selecting unit 213.

The calculation unit 205 adds the decoded residual data and the predicted data, and obtains the decoded image data corresponding to the image data of before the predicted image is subtracted by the calculation unit 103 of the image encoding device 1. The calculation unit 205 supplies the decoded image data to the deblocking filter 206.

The deblocking filter 206 removes block distortion of the decoded image by appropriately performing deblocking filter processing. The deblocking filter 206 supplies the image obtained as a result of the deblocking filter processing to the adaptive offset filter 223.

The adaptive offset filter 223 includes a buffer in which offsets supplied from the lossless decoding unit 202 are stored in order. Further, the adaptive offset filter 223 performs adaptive offset filter processing for the image after the adaptive deblocking filter processing by the deblocking filter 206, based on offset filter information supplied from the lossless decoding unit 202, for each LCU.

To be specific, when a storage flag included in the offset filter information is 0, the adaptive offset filter 223 performs the adaptive offset filter processing of a type indicated by type information, for the image after the deblocking filter processing of each LCU, using the offset included in the offset filter information.

Meanwhile, when the storage flag included in the offset filter information is 1, the adaptive offset filter 223 reads the offset stored in a position indicated by an index included in the offset filter information, for the image after the deblocking filter processing of each LCU. Then, the adaptive offset filter 223 performs the adaptive offset filter processing of the type indicated by type information, using the read offset. The adaptive offset filter 223 supplies the image after the adaptive offset filter processing to the adaptive loop filter 224.

The adaptive loop filter 224 performs adaptive loop filter processing for the image supplied from the adaptive offset filter 223, for each LCU, using the filter coefficient supplied from the lossless decoding unit 202. The adaptive loop filter 224 supplies the image obtained as a result of the filter processing to the screen rearrangement buffer 207.

The screen rearrangement buffer 207 performs rearrangement of images. That is, an order of frames rearranged for an order of encoding by the screen rearrangement buffer 102 of FIG. 2 is rearranged to an original order of display. The D/A converter 208 performs D/A conversion of the image supplied from the screen rearrangement buffer 207, outputs the converted image to a display control unit (not illustrated), and displays the image in the display.

The output of the deblocking filter 206 is further supplied to the decoded picture buffer 209.

The decoded picture buffer 209, the selecting unit 210, the intra prediction unit 211, the motion parallax prediction/compensation unit 212, and the selecting unit 213 respectively correspond to the decoded picture buffer 112, the selecting unit 113, the intra prediction unit 114, the motion parallax prediction/compensation unit 115, and the selecting unit 116 of the image encoding device 1.

The selecting unit 210 reads an image to be subjected to inter processing and an image to be referred, from the decoded picture buffer 209, and supplies the images to the motion parallax prediction/compensation unit 212. Further, the selecting unit 210 reads images to be used in intra prediction, from the decoded picture buffer 209, and supplies the images to the intra prediction unit 211.

Information indicating an intra prediction mode, and the like obtained from the header information are appropriately supplied from the lossless decoding unit 202 to the intra prediction unit 211. The intra prediction unit 211 generates the predicted image from the reference image obtained from the decoded picture buffer 209, based on the information, and supplies the generated predicted image to the selecting unit 213.

Information (prediction mode information, motion vector information, parallax vector information, various types of parameters, and the like) obtained from the header information is supplied from the lossless decoding unit 202 to the motion parallax prediction/compensation unit 212. Further, a reference image index allocated by the reference list generating unit 222 is supplied to the motion parallax prediction/compensation unit 212.

The motion parallax prediction/compensation unit 212 generates the predicted image from the reference image obtained from the decoded picture buffer 209, based on the information supplied from the lossless decoding unit 202 and the reference image index indicated in a reference list generated by the reference list generating unit 222. The motion parallax prediction/compensation unit 212 supplies the generated predicted image to the selecting unit 213.

The selecting unit 213 selects the predicted image generated by the motion parallax prediction/compensation unit 212 or the intra prediction unit 211, and supplies the selected predicted image to the calculation unit 205.

The reference list generating unit 222 is basically similarly configured to the reference list generating unit 122 of the image encoding device 1. The reference list generating unit 222 generates the reference list to be referred by the motion parallax prediction/compensation unit 212 in predicting a current image, using the header information from the syntax processing unit 221 and information (POC information and view information) of the reference image accumulated in the decoded picture buffer 209. The reference list is a list (array) of reference images referable in a temporal direction and reference images of reference images in a view (layer) direction.

Prior to the generation of the reference list, the reference list generating unit 222 generates a temporal list to be used in generating the reference list. At that time, the reference list generating unit 222 inserts the reference image referable in the view direction to the temporal list by reference to the SPS or the slice header from the syntax processing unit 221.

Then, the reference list generating unit 222 generates the reference list, based on the generated temporal list.

[Configuration Example of Reference List Generating Unit]

Figure 20:
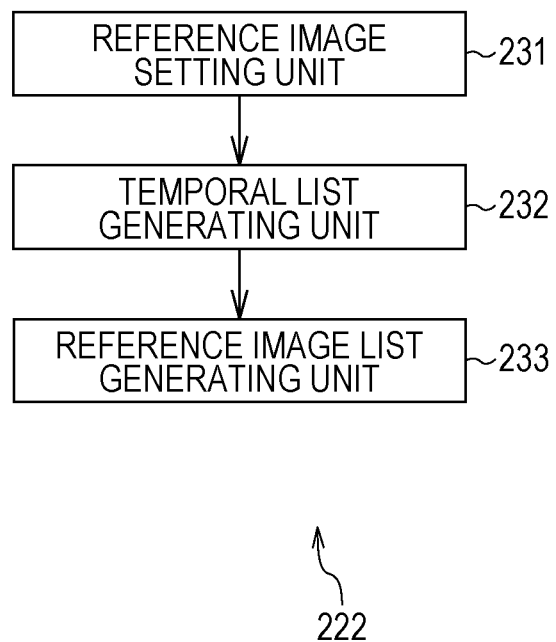
FIG. 20 is a block diagram illustrating a configuration example of a reference list generating unit of FIG. 19.

FIG. 20 is a block diagram illustrating a configuration example of the reference list generating unit of FIG. 19.

In the example of FIG. 20, the reference list generating unit 222 includes a reference image setting unit 231, a temporal list generating unit 232, and a reference image list generating unit 233.

The reference image setting unit 231 sets the short-term (before) reference image by reference to the time information (that is, the POC information) of the reference image from the decoded picture buffer 209 and the used_by_curr flag of the short-term reference image set to the slice header or the RPS from the syntax processing unit 221, and generates the short-term (before) reference image list (RefPicSetStCurrBefore[i]). The reference image setting unit 231 sets the short-term (after) reference image by reference to the time information of the reference image from the decoded picture buffer 209 and the used_by_curr flag of the short-term reference image set to the slice header or the RPS from the syntax processing unit 221, and generate the short-term (after) reference image list (RefPicSetStCurrAfter[i]).

The reference image setting unit 231 sets the long-term reference image by reference to the time information of the reference image from the decoded picture buffer 209 and the used_by_curr flag of the long-term reference image set to the slice header or the SPS, and generates the long-term reference image list (RefPicLtCurr[i]). The reference image setting unit 231 sets the inter-view reference image (RefPicSetIvCurr[i]) by reference to the view information of the reference image from the decoded picture buffer 209 and the used_by_curr flag of the inter-view reference image set to the slice header or the SPS, and generate the list thereof.

The temporal list generating unit 232 combines the lists set by the reference image setting unit 231 in a predetermined order, and generates the temporal lists (RefPicListTemp0[rldx] and RefPicListTemp1[rldx]) of L0 and L1. Note that the list set by the reference image setting unit 231 is combined in the order of the short-term (before) reference image, the short-term (after) reference image, the long-term reference image, and the inter-view reference image in the case of L0. Further, the list set by the reference image setting unit 231 is combined in the order of the short-term (after) reference image, the short-term (before) reference image, the long-term reference image, and the inter-view reference image in the case of L1.

The reference image list generating unit 233 refers to num_ref_idx_l0_active minus1 and num_ref_idx_l1_active_minus1 set to the slice header or the SPS supplied from the syntax processing unit 221. The reference image list generating unit 233 extracts and adds the reference imaged by the number set in the num_ref_idx_l0_active minus1 and num_ref_idx_l1_active_minus1, from the temporal lists of L0/L1 generated by the temporal list generating unit 232, to generate the reference lists of L0/L1.

The reference lists of L0/L1 generated by the reference image list generating unit 233 are referred by the motion parallax prediction/compensation unit 212.

[Flow of Processing of Decoding Device]

Figure 21:
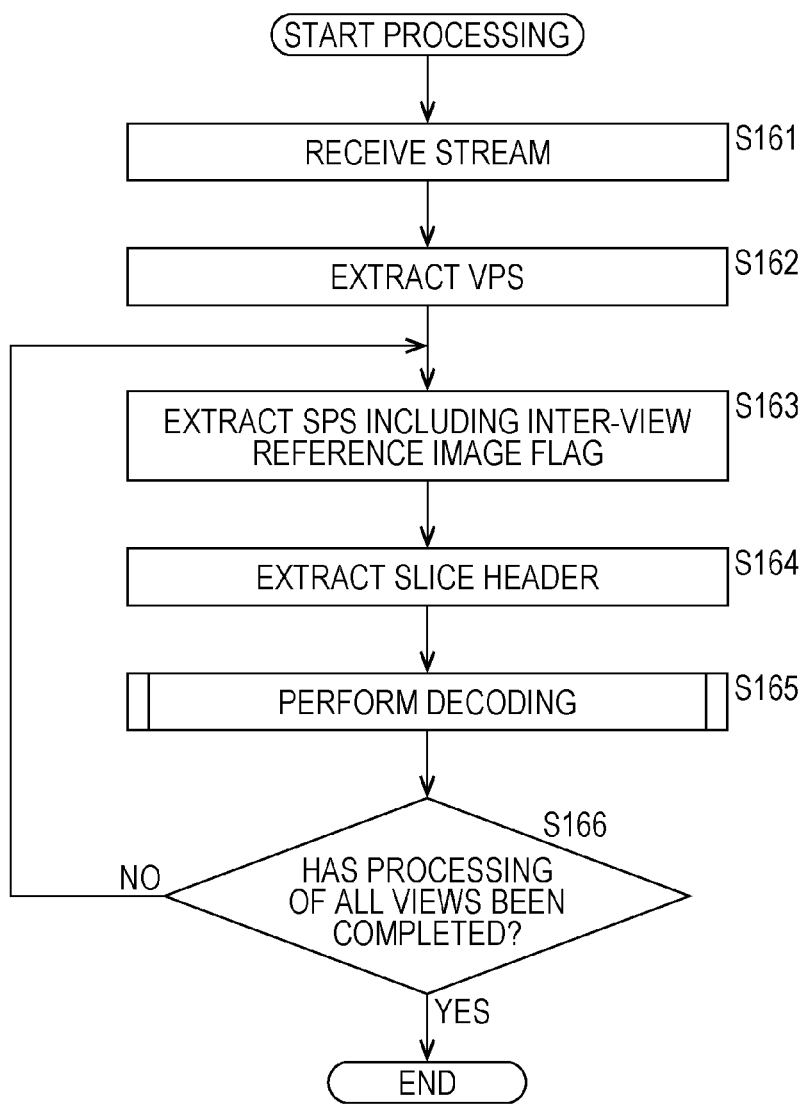
FIG. 21 is a flowchart for describing an example of a flow of processing of the image decoding device of FIG. 18.

Next, a flow of processing executed by the image decoding device 151 as described above will be described with reference to the flowchart of FIG. 21. Note that, in the example of FIG. 21, an example in which an inter-view reference image flag is set to the SPS will be illustrated as an example.

The encoded stream encoded by the image encoding device 1 of FIG. 1 is transmitted to the image decoding device 151 corresponding to the image encoding device 1 through a predetermined transmission path.

At step S161, the receiving unit 161 of the image decoding device 151 receives the encoded stream transmitted from the image encoding device 1 of FIG. 1, and supplies the encoded stream to the VPS extracting unit 162.

At step S162, the VPS extracting unit 162 extracts the VPS from the encoded stream supplied from the receiving unit 161. The VPS extracting unit 162 supplies the extracted VPS and the encoded stream to the SPS extracting unit 163.

At step S163, the SPS extracting unit 163 extracts the SPS including the inter-view reference image flag from the encoded stream supplied from the VPS extracting unit 162. That is, the SPS extracting unit 163 extracts the SPS from the encoded stream supplied from the VPS extracting unit 162. At that time, the SPS extracting unit 163 also extracts the inter-view reference image flag included in the SPS.

The SPS extracting unit 163 supplies the extracted SPS and VPS, and the encoded stream to the slice header extracting unit 164.

At step S164, the slice header extracting unit 164 extracts the slice header from the encoded stream supplied from the SPS extracting unit 163. At that time, the slice header extracting unit 164 extracts the encoded data from the encoded stream supplied from the SPS extracting unit 163. The slice header extracting unit 164 supplies the extracted slice header and encoded data, the SPS, and the VPS to the decoding unit 165.

At step S165, the decoding unit 165 decodes the encoded data supplied from the slice header extracting unit 164 in the HEVC system by reference to the header information such as the VPS, the SPS, and the slice header supplied from the slice header extracting unit 164 as needed. Details of the decoding processing will be described with reference to FIG. 22.

At step S165, the encoded data is decoded and an image is generated, the inter-view reference image flag in the SPS is referred and the reference list is generated, and prediction of the generated image is performed based on the reference list.

The decoding unit 165 supplies the decoded image obtained as a result of the decoding to a display control unit of a subsequent step (not illustrated), as an output signal.

At step S166, the SPS extracting unit 163 determines whether the processing of all of views (layers) has been completed. When it is determined that the processing of all of views (layers) has been completed at step S166, the processing of image decoding device 151 is terminated. When it is determined that the processing of all of views (layers) has not be completed at step S166, the processing is returned to step S163, and the processing of step S163 and the subsequent steps is repeated.

[Flow of Decoding Processing]

Next, an example of a flow of the decoding processing at step S165 of FIG. 21 will be described with reference to the flowchart of FIG. 22.

When the decoding processing is started, at step S201, the accumulation buffer 201 accumulates the transmitted encoded data. At step S202, the syntax processing unit 221 acquires the encoded data read from the accumulation buffer 201 at predetermined timing and the header information. The syntax processing unit 221 supplies the acquired header information to the lossless decoding unit 202 together with the encoded data. Further, the syntax processing unit 221 supplies the acquired header information (the VPS, the SPS (including the RPS), and the slice header) to the reference list generating unit 222.

At step S203, the lossless decoding unit 202 decodes the encoded data supplied from the syntax processing unit 221. That is, an I picture, a P picture, and a B picture encoded by the lossless encoding unit 106 of FIG. 2 are decoded.

At this time, from the header information, the motion vector information, the parallax vector information, the reference frame information, the prediction mode information (the intra prediction mode or the inter prediction mode), and information of a flag and a quantization parameter are acquired.

When the prediction mode information is the intra prediction mode information, the prediction mode information is supplied to the intra prediction unit 211. When the prediction mode information is the inter prediction mode information, the motion vector information corresponding to the prediction mode information is supplied to the motion parallax prediction/compensation unit 212.

At step S204, the inverse quantization unit 203 inversely quantizes the quantized orthogonal transform coefficient decoded and obtained by the lossless decoding unit 202. At step S205, the inverse orthogonal transform unit 204 inversely orthogonally transforms the orthogonal transform coefficient inversely quantized and obtained by the inverse quantization unit 203 by a method corresponding to the orthogonal transform unit 104 of FIG. 2. Accordingly, the difference information corresponding to the input of the orthogonal transform unit 104 of FIG. 2 (the output of the calculation unit 103) has been decoded.

At step S206, the calculation unit 205 adds the predicted image to the difference information obtained by the processing of step S205. Accordingly, the original image data is decoded.

At step S207, the deblocking filter 206 appropriately filters the decoded image obtained by the processing of step S206. Accordingly, only the block distortion is appropriately removed from the decoded image. The deblocking filter 206 supplies the image obtained as a result of the filtering to the adaptive offset filter 223.

At step S208, the adaptive offset filter 223 performs the adaptive offset filter processing for the image after the deblocking filter processing by the deblocking filter 206, for each LCU, based on the offset filter information supplied from the lossless decoding unit 202. The adaptive offset filter 223 supplies the image after the adaptive offset filter processing to the adaptive loop filter 224.

At step S209, the adaptive loop filter 224 performs the adaptive loop filter processing for the image supplied from the adaptive offset filter 223, for each LCU, using the filter coefficient supplied from the lossless decoding unit 202. The adaptive loop filter 224 supplies the image obtained as a result of the filter processing to the decoded picture buffer 209 and the screen rearrangement buffer 207.

At step S210, the decoded picture buffer 209 stores the filtered decoded image.

At step S211, the reference list generating unit 222 generates the reference list to be referred by the motion parallax prediction/compensation unit 212 in predicting the current image. Details of the processing of generating the reference list will be described below with reference to FIG. 23.

At step S211, the temporal list to be used in generating the reference list is generated based on a view reference image flag of the SPS. Then, the reference list is generated based on the generated temporal list. That is, the reference list is generated based on the view reference image flag.

At step S212, the intra prediction unit 211 or the motion parallax prediction/compensation unit 212 performs prediction processing of each image, corresponding to the prediction mode information supplied from the lossless decoding unit 202.

That is, when the intra prediction mode information is supplied from the lossless decoding unit 202, the intra prediction unit 211 performs the intra prediction processing in the intra prediction mode. Further, when the inter prediction mode information is supplied from the lossless decoding unit 202, the motion parallax prediction/compensation unit 212 performs motion parallax prediction compensation processing in the inter prediction mode using the reference image of the reference image index indicated in the reference list generated by the processing of step S211.

At step S213, the selecting unit 213 selects the predicted image. That is, the predicted image generated by the intra prediction unit 211 or the predicted image generated by the motion parallax prediction/compensation unit 212 is supplied to the selecting unit 213. The selecting unit 213 selects the side from which the predicted image has been supplied, and supplies the predicted image to the calculation unit 205. This predicted image is added to the difference information by the processing of step S206.

At step S214, the screen rearrangement buffer 207 performs rearrangement of frames of the decoded image data. That is, the order of frames of the decoded image data rearranged for the encoding by the screen rearrangement buffer 102 (FIG. 2) of the image encoding device 1 is rearranged to the original order of display.

At step S215, the D/A converter 208 performs D/A conversion of the decoded image data, the frames of which have been rearranged in the screen rearrangement buffer 207. The decoded image data is output to the display through the display control unit (not illustrated), and the image is displayed. When the processing of step S215 is completed, the decoding processing is terminated.

[Flow of Reference List Generating Processing]

Next, a flow of reference list generating processing executed at step S211 of FIG. 22 will be described with reference to the flowchart of FIG. 23. Note that this processing is executed only in a case where the decoded image (that is, the current image to be predicted) is a P picture or a B picture.

Figure 22:
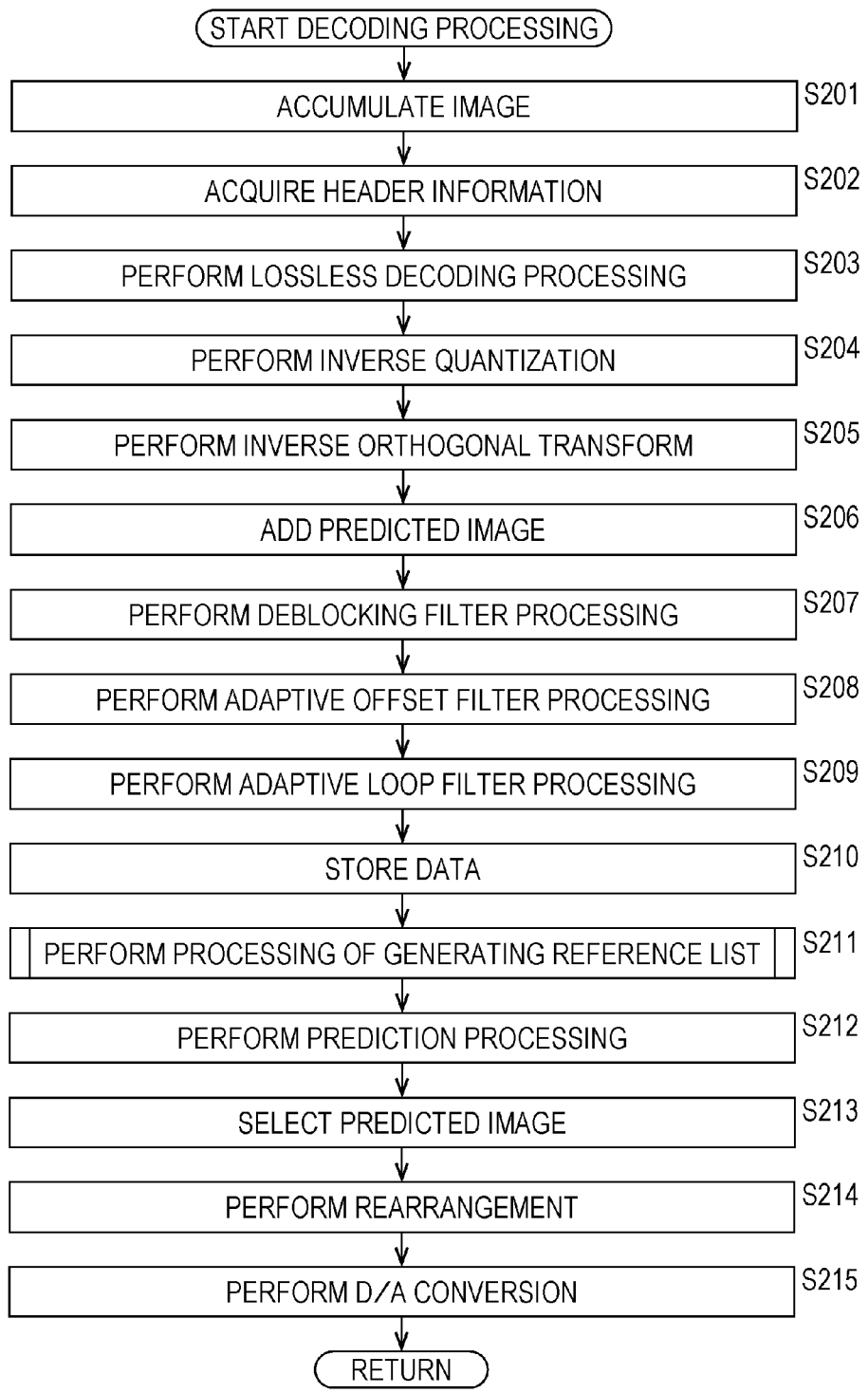
FIG. 22 is a flowchart for describing an example of a flow of decoding processing.
Figure 23:
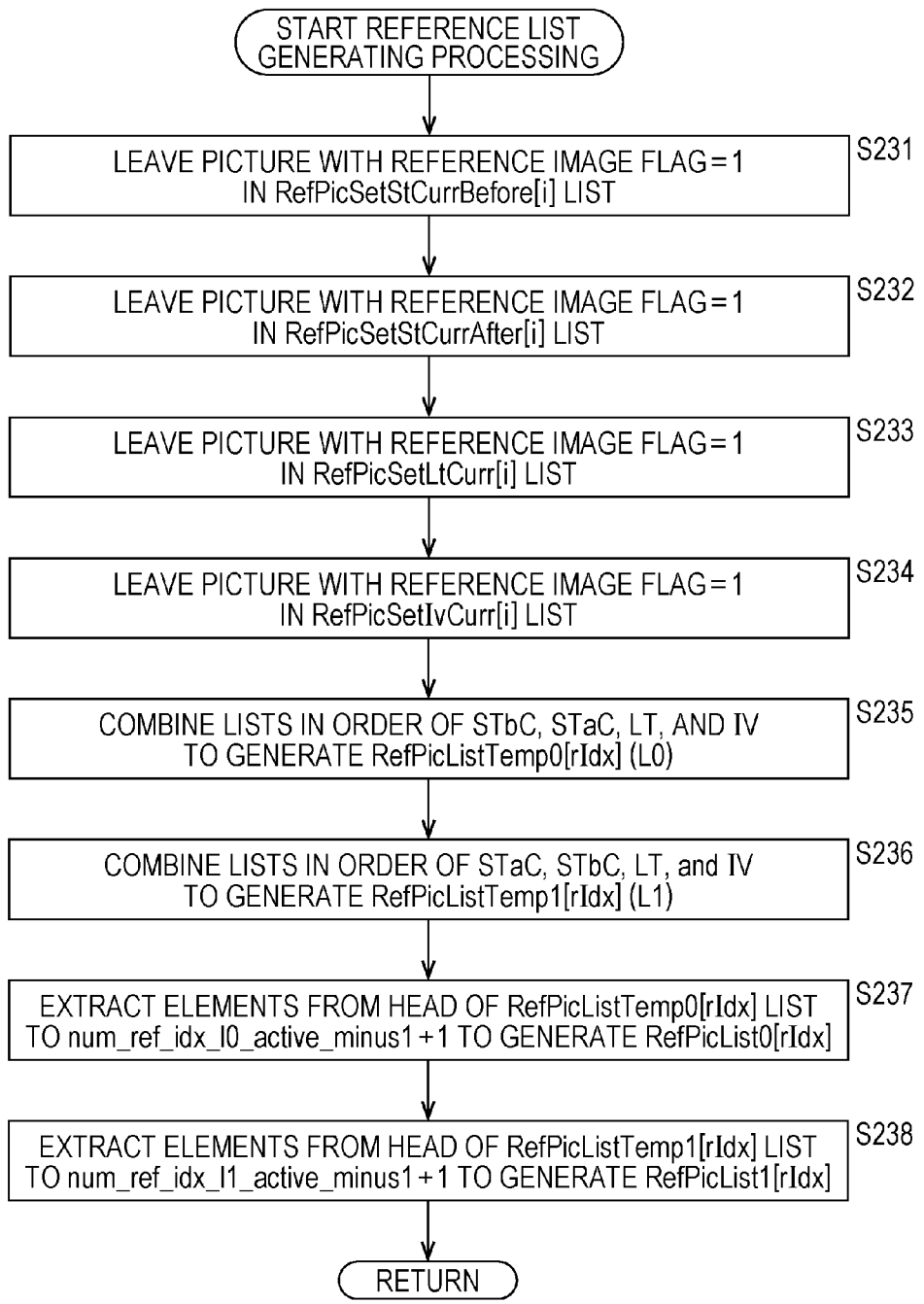
FIG. 23 is a flowchart for describing an example of a flow of reference list generating processing.

At step S203 of FIG. 22 described above, the header information such as the VPS, the SPS (including the RPS), and the slice header of the decoded image is supplied from the syntax processing unit 221 to the reference list generating unit 222. The used_by_curr flag of the short-term reference image is set to the slice header or the RPS supplied from the syntax processing unit 221. The used_by_curr flag of the long-term reference image is set to the slice header or the SPS. Further, the used_by_curr flag (inter-view reference image flag) of the inter-view reference image is set to the slice header or the SPS at step S12 of FIG. 15.

The reference image setting unit 231 of the reference list generating unit 222 sets the short-term (before) reference image (STbC) by reference to the time information (that is, the POC information) from the decoded picture buffer 209, and the slice header or the RPS, and generates the RefPicSetStCurrBefore[i] list. Then, at step S231, the reference image setting unit 231 leaves, in the RefPicSetStCurrBefore[i] list, the reference image with the reference image flag (used_by_curr flag)=1 of the short-term (before) reference image in the slice header or the RPS.

The reference image setting unit 231 sets the short-term (after) reference image (STaC) by reference to the time information of the reference image from the decoded picture buffer 209, and the slice header or the RPS, and generates the RefPicSetStCurrAfter[i] list. Then, at step S232, the reference image setting unit 231 leaves, in the RefPicSetStCurrAfter[i] list, the reference image with the reference image flag (used_by_curr flag)=1 of the short-term (after) reference image in the slice header or the RPS.

The reference image setting unit 231 sets the long-term reference image (LT) by reference to the time information of the reference image from the decoded picture buffer 209, and the slice header or the SPS, and generates the RefPicLtCurr[i] list. At step S233, the reference image setting unit 231 leaves, in the RefPicLtCurr[i] list, the reference image with the reference image flag (used_by_curr flag)=1 of the long-term reference image in the slice header or the SPS.

The reference image setting unit 231 sets the inter-view reference image (IV) by reference to the view information, the slice header, the SPS, and the VPS of the reference image from the decoded picture buffer 209, and generates the RefPicSetIvCurr[i]. At step S234, the reference image setting unit 231 leaves, in the RefPicSetIvCurr[i], the reference image with the reference image flag (used_by_curr flag)=1 of the inter-view reference image in the slice header or the SPS.

At step S235, the temporal list generating unit 232 combines the above four types of lists set by the reference image setting unit 131 in the order of STbC, STaC, LT, and IV, and generates the temporal list (RefPicListTemp0[rIdx]) of L0.

That is, only the reference images with the used_by_curr flag of 1 in the above four types of lists are combined in the order of STbC, STaC, LT, and IV, and the temporal list of L0 is generated.

At step S136, the temporal list generating unit 132 combines the four types of lists set by the reference image setting unit 131 in the order of STaC, STbC, LT, and IV, and generates the temporal list (RefPicListTemp1[rIdx]) of L1.

That is, only the reference images with the used_by_curr flag of 1 are combined in the order of STaC, STbC, LT, and IV, and the temporal list of L1 is generated. Note that, at that time, the reference images are added in the reverse order to the order of the L0 direction, as described with reference to FIG. 12.

num_ref_idx_l0_active minus1 and num_ref_idx_l1_active_minus1 are set to the slice header or the SPS supplied from the syntax processing unit 221.

At step S237, the reference image list generating unit 233 extracts elements from the head of the temporal list (RefPicListTemp0[rIdx]) of L0 to num_ref_idx_l0_active minus1+1, and generates the reference list (RefPicList0 [rIdx]) of L0.

At step S238, the reference image list generating unit 233 extracts elements from the head of the temporal list (RefPicListTemp1[rIdx]) of L1 to num_ref_idx_l1_active_minus1+1, and generates the reference list (RefPicList1[rIdx]) of L1.

As described above, the inter-view reference image is inserted based on the reference image flag of the inter-view reference image in the slice header or the SPS, and the default reference list is generated.

Further, while the HEVC system has been used as a base encoding system in the above description, the present technology is a technology in performing display, and does not stick to the encoding system. Therefore, not only the HEVC system but also other encoding system/decoding system can be applied to the present technology. For example, the present technology can be applied to a device that performs encoding/decoding processing based on an AVC system described below.

3. Third Embodiment

[Another Configuration Example of Encoding Unit]

Figure 24:
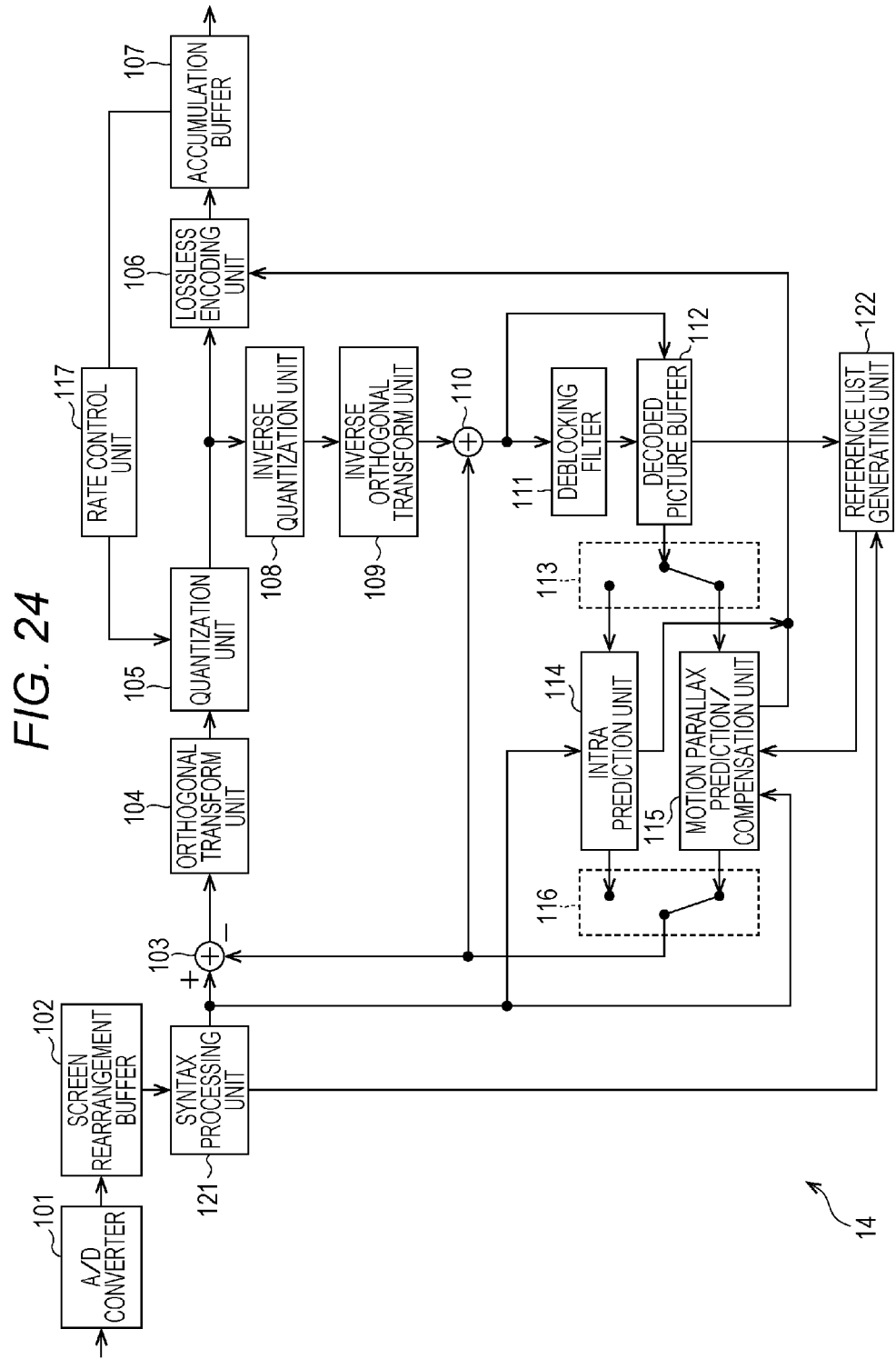
FIG. 24 is a block diagram illustrating another configuration example of the encoding unit.
Figure 25:
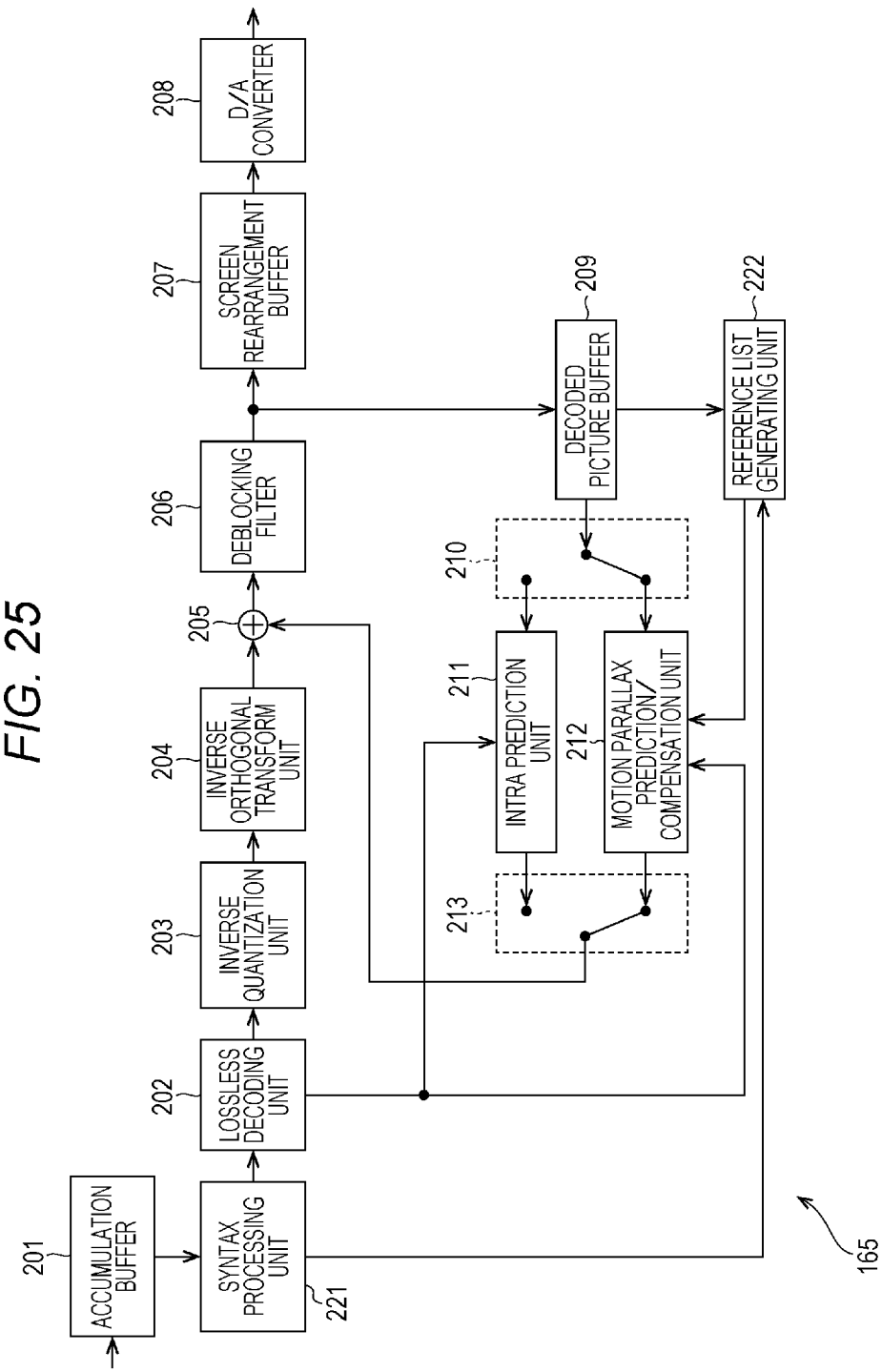
FIG. 25 is a block diagram illustrating another configuration example of the decoding unit.

FIG. 24 is a block diagram illustrating another configuration example of the encoding unit 14 of FIG. 1. An encoding unit 14 of FIG. 24 is different from the encoding unit 14 of FIG. 2 in that encoding processing in an AVC system is performed.

The same configuration as that of FIG. 2 is denoted with the same reference sign, of configurations illustrated in FIG. 24. Overlapping description is appropriately omitted.

The encoding unit 14 of FIG. 24 includes an A/D converter 101, a screen rearrangement buffer 102, a calculation unit 103, an orthogonal transform unit 104, a quantization unit 105, a lossless encoding unit 106, and an accumulation buffer 107. Further, an image encoding device 1 includes an inverse quantization unit 108, an inverse orthogonal transform unit 109, a calculation unit 110, a deblocking filter 111, a decoded picture buffer 112, a selecting unit 113, an intra prediction unit 114, a motion parallax prediction/compensation unit 115, a selecting unit 116, and a rate control unit 117.

The encoding unit 14 further includes a syntax processing unit 121 and a reference list generating unit 122.

That is, the configuration of the encoding unit 14 of FIG. 24 is different from the configuration of the encoding unit 14 of FIG. 2 only in that the adaptive offset filter 123 and the adaptive loop filter 124 are removed, and the lossless encoding unit 106 performs encoding in the AVC system instead of the HEVC system. Therefore, in the encoding unit 14, the encoding processing is performed in block units instead of the CU units.

An object of the encoding processing of the lossless encoding unit 106 is basically similar to that of the case of the lossless encoding unit 106 of FIG. 2 except for parameters of an adaptive offset filter and an adaptive loop filter. That is, the lossless encoding unit 106 acquires intra prediction mode information from the intra prediction unit 114, similarly to the lossless encoding unit 106 of FIG. 2. Further, the lossless encoding unit 106 acquires inter prediction mode information, motion vector, information for identifying a reference image, and the like from the motion parallax prediction/compensation unit 115.

The lossless encoding unit 106 performs lossless encoding such as variable length coding (CAVLC, for example) or arithmetic coding (CABAC, for example) for a quantized coefficient supplied from the quantization unit 105, similarly to the lossless encoding unit 106 of FIG. 2.

Further, the lossless encoding unit 106 encodes the quantized transform coefficient, and has the intra prediction mode information, the inter prediction mode information, the motion vector information, and a quantization parameter, as a part of header information of encoded data (performs multiplexing), similarly to the lossless encoding unit 106 of FIG. 2. The lossless encoding unit 106 supplies the encoded data obtained by encoding to the accumulation buffer 107 and accumulates the encoded data therein.

The deblocking filter 111 removes block distortion by filtering a locally decoded image supplied from the adding unit 110. The deblocking filter 111 supplies the image obtained as a result of the filtering to the decoded picture buffer 112, and accumulates the image therein.

The image accumulated in the decoded picture buffer 112 is output to the intra prediction unit 114 or the motion parallax prediction/compensation unit 115 through the selecting unit 213, as a reference image.

The present technology can be applied to the image encoding device in the AVC system.

[Another Configuration Example of Decoding Unit]

FIG. 24 is a block diagram illustrating another configuration example of the decoding unit 165 of FIG. 18. A decoding unit 165 illustrated in FIG. 24 is a decoding device corresponding to the decoding unit 165 of FIG. 19. The decoding unit 165 of FIG. 24 is different from the decoding unit 165 of FIG. 19 only in that decoding processing in an AVC system is performed.

The same configuration as that of FIG. 19 is denoted with the same reference sign, of configurations illustrated in FIG. 24. Overlapping description is appropriately omitted.

The decoding unit 165 of FIG. 24 includes an accumulation buffer 201, a lossless decoding unit 202, an inverse quantization unit 203, an inverse orthogonal transform unit 204, an adding unit 205, a deblocking filter 206, a screen rearrangement buffer 207, a D/A converter 208, a decoded picture buffer 209, a selecting unit 210, an intra prediction unit 211, a motion parallax prediction/compensation unit 212, and a selecting unit 213.

The configurations of the decoding unit 165 of FIG. 24 is different from those of the decoding unit 165 of FIG. 19 only in that the adaptive offset filter 223 and the adaptive loop filter 224 are removed, and the lossless decoding unit 202 performs decoding by the AVC system instead of the HEVC system. Therefore, in the decoding unit 165, the decoding processing is performed in block units instead of CU units.

An object of the decoding processing of the lossless decoding unit 202 is basically similar to the case of the lossless decoding unit 202 of FIG. 19 except for parameters of an adaptive offset filter and an adaptive loop filter. That is, the accumulation buffer 201 accumulates transmitted encoded data. The encoded data is data encoded by the encoding unit 14 of FIG. 24.

The syntax processing unit 221 acquires a sequence parameter set, a picture parameter set, a slice header, and the like from the encoded data read from the accumulation buffer 201 at predetermined timing, and supplies the acquired header information to the lossless decoding unit 202 together with the encoded data, similarly to the syntax processing unit 221 of FIG. 19. Further, the syntax processing unit 221 supplies the acquired header information to the reference list generating unit 222.

Further, the lossless decoding unit 202 obtains a quantized coefficient by applying lossless decoding such as variable length decoding or arithmetic decoding to the encoded data from the syntax processing unit 221, similarly to the lossless decoding unit 202 of FIG. 19 The lossless decoding unit 202 supplies the quantized coefficient to the inverse quantization unit 203.

The deblocking filter 206 removes block distortion by filtering the image supplied from the adding unit 205. The deblocking filter 206 supplies the image obtained as a result of the filtering to the decoded picture buffer 209 and the screen rearrangement buffer 207.

The present technology can be applied to the image decoding device in the AVC system.

Note that the present disclosure can be applied to image encoding devices and image decoding devices used when image information (bit stream) compressed by orthogonal transform such as discrete cosine transform and motion compensation is received through a network medium such as satellite broadcasting, a cable television, the Internet, or a mobile phone device, like MPEG, H.26x, for example. Further, the present disclosure can be applied to image encoding devices and image decoding devices used in performing processing on a storage medium such as an optical disk, a magnetic disk, or flash memory. Further, the present disclosure can be applied to motion prediction/compensation devices included in the image encoding devices and the image decoding devices.

4. Fourth Embodiment

[Computer]

The above-described series of processing can be executed by hardware, or by software. When the series of processing is executed by software, a program that configures the software is installed to a computer. Here, examples of the computer include a computer incorporated in special hardware, and a general personal computer that can execute various functions by being installed various programs.

Figure 26:
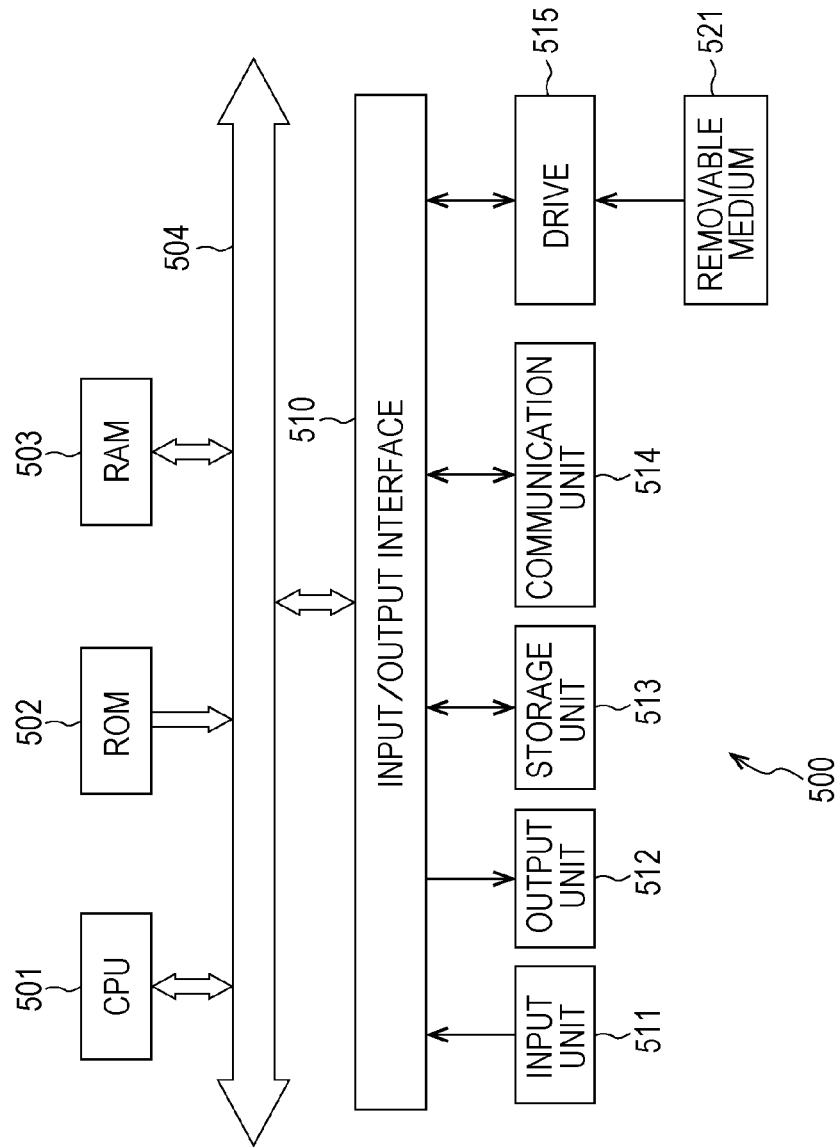
FIG. 26 is a block diagram illustrating a principal configuration example of a computer.

FIG. 26 is a block diagram illustrating a configuration example of hardware of a computer that executes the series of processing by a program.

In a computer 500, a central processing unit (CPU) 501, read only memory (ROM) 502, and random access memory (RAM) 503 are mutually connected through a bus 504.

An input/output interface 505 is connected to the bus 504. An input unit 506, an output unit 507, a storage unit 508, a communication unit 509, and a drive 510 are connected to the input/output interface 505.

The input unit 506 is made of a keyboard, a mouse, a microphone, and the like. The output unit 507 is made of a display, a speaker, and the like. The storage unit 508 is made of a hard disk, a non-volatile memory, and the like. The communication unit 509 is made of a network interface, and the like. The drive 510 drives a removable medium 511 such as a magnetic disk, an optical disk, a magneto-optical disk, or a semiconductor memory.

In the computer configured as described above, the CPU 501 loads the program stored in the storage unit 508 to the RAM 503 through the input/output interface 505 and the bus 504, and executes the program, so that the above-described series of processing is performed.

The program executed by the computer 500 (CPU 501) can be recorded on and provided with the removable medium 511 as a package medium. Further, the program can be provided through a wireless or wired transmission medium such as a local area network, the Internet, or digital satellite broadcasting.

In the computer, the removable medium 511 is mounted to the drive 510, so that the program can be installed to the storage unit 508 through the input/output interface 505. Further, the program can be received by the communication unit 509 through a wired or wireless transmission medium, and installed to the storage unit 508. Other than the above method, the program can be installed to the ROM 502 or the storage unit 508 in advance.

Note that the program executed by the computer may be a program processed in time series along the order described in the present specification, or may be a program processed in parallel or at necessary timing such as being called.

Further, in the present specification, a step to describe the program recorded in a recording medium includes not only processing performed in a time series manner along the described order, but also processing executed in parallel or in an individual manner, which is not necessarily processed in a time series manner.

Further, in the present specification, a system represents the entire apparatus configured from a plurality of devices.

Further, in the above description, the configuration described as one device (or one processing unit) may be divided and configured from a plurality of devices (or processing units). Contrary to that, the configuration described as a plurality of devices (or processing units) may be integrated and configured as one device (or one processing unit). Further, other configurations may be added to the configuration of each device (or each processing unit). Further, apart of a certain device (or a processing unit) may be included in a configuration of another device (or another processing unit) as long as the configuration or the operation as the entire system is substantially the same. That is, the present technology is not limited to the above-described embodiments, and various modifications can be made without departing from the gist of the present technology.

The image encoding devices and the image decoding devices according to the above-described embodiments can be applied to various electronic devices such as a transmitting device or a receiving device in satellite broadcasting, wired broadcasting such as a cable TV, distribution on the Internet, or distribution to a terminal by cellular communication, a recording device that records an image to a medium such as an optical disk, a magnetic disk, or flash memory, or a reproducing device that reproduces an image from the storage medium. Hereinafter, four application examples will be described.

5. Application Examples

[First Application Example: Television Receiver]

Figure 27:
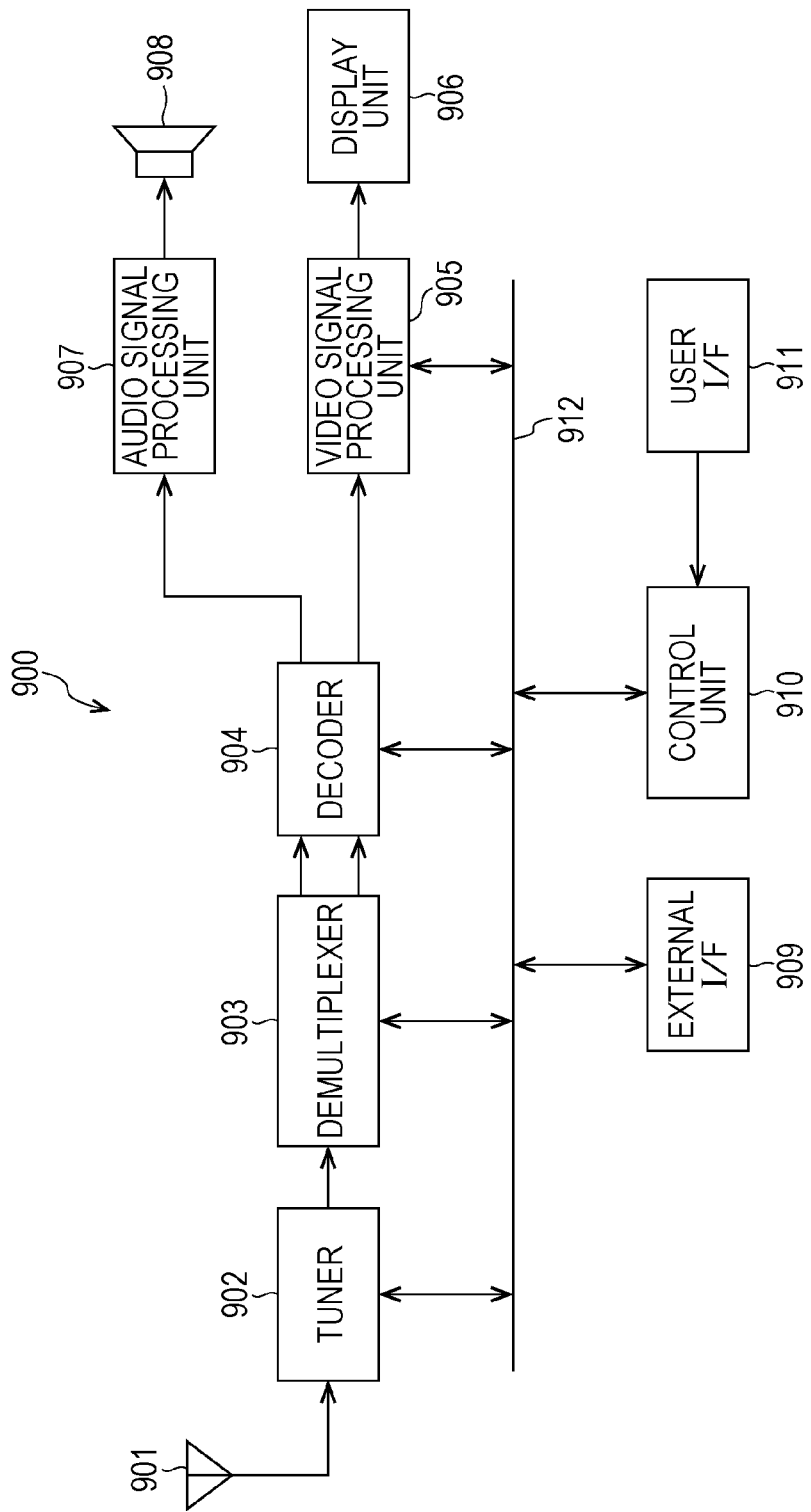
FIG. 27 is a block diagram illustrating an example of a schematic configuration of a television device.

FIG. 27 illustrates an example of a schematic configuration of a television device to which the above embodiments are applied. A television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received through the antenna 901, and demodulates the extracted signal. The tuner 902 then outputs the encoded bit stream obtained by the demodulation to the demultiplexer 903. That is, the tuner 902 serves as transmission means that receives an encoded stream in which an image is encoded, in the television device 900.

The demultiplexer 903 separates a video stream and an audio stream of a current program to be viewed from the encoded bit stream, and outputs the separated streams to the decoder 904. Further, the demultiplexer 903 extracts auxiliary data such as electronic program guide (EPG) from the encoded bit stream, and supplies the extracted data to the control unit 910. Note that the demultiplexer 903 may perform descramble when the encoded bit stream is scrambled.

The decoder 904 decodes the video stream and the audio stream input from the demultiplexer 903. The decoder 904 then outputs video data generate by decoding processing to the video signal processing unit 905. Further, the decoder 904 outputs audio data generated by the decoding processing to the audio signal processing unit 907.

The video signal processing unit 905 reproduces the video data input from the decoder 904 to display the video in the display unit 906. Further, the video signal processing unit 905 may display an application screen supplied through the network, in the display unit 906. Further, the video signal processing unit 905 may perform additional processing such as noise reduction, for the video data according to setting. Further, the video signal processing unit 905 may generate an image of a graphical user interface (GUI) such as a menu, a button, or a cursor, and superimpose the generated image on an output image.

The display unit 906 is driven by a drive signal supplied from the video signal processing unit 905, and displays a video or an image on a video screen of a display device (for example, a liquid crystal display, a plasma display, an organic electroluminescence display (GELD) (an organic EL display), or the like.

The audio signal processing unit 907 performs reproducing processing such as D/A conversion and amplification, for the audio data input from the decoder 904, and outputs an audio through the speaker 908. Further, the audio signal processing unit 907 may perform additional processing such as noise reduction, for the audio data.

The external interface 909 is an interface for connecting the television device 900, and an external device or a network. For example, the video stream or the audio stream received through the external interface 909 may be decoded by the decoder 904. That is, the external interface 909 also serves as a transmission means that receives the encoded stream in which an image is encoded, in the television device 900.

The control unit 910 includes a processor such as a CPU, and memories such as RAM and ROM. The memory stores the program executed by the CPU, program data, EPG data, data acquired through the network, and the like. The program stored in the memory is read and executed by the CPU at start of the television device 900, for example. The CPU controls an operation of the television device 900 by executing the program according to a control signal input from the user interface 911.

The user interface 911 is connected with the control unit 910. The user interface 911 includes, for example, a button and switch for operating the television device 900 by a user, and a receiving unit of a remote control signal. The user interface 911 detects an operation by the user through the configuration elements to generate an operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

In the television device 900 configured as described above, the decoder 904 has a function of an image decoding device according to the embodiments. Accordingly, reference relationship of views can be efficiently changed in decoding an image in the television device 900. Further, encoding efficiency in multi-view coding can be improved.

[Second Application Example: Mobile Phone Device]

Figure 28:
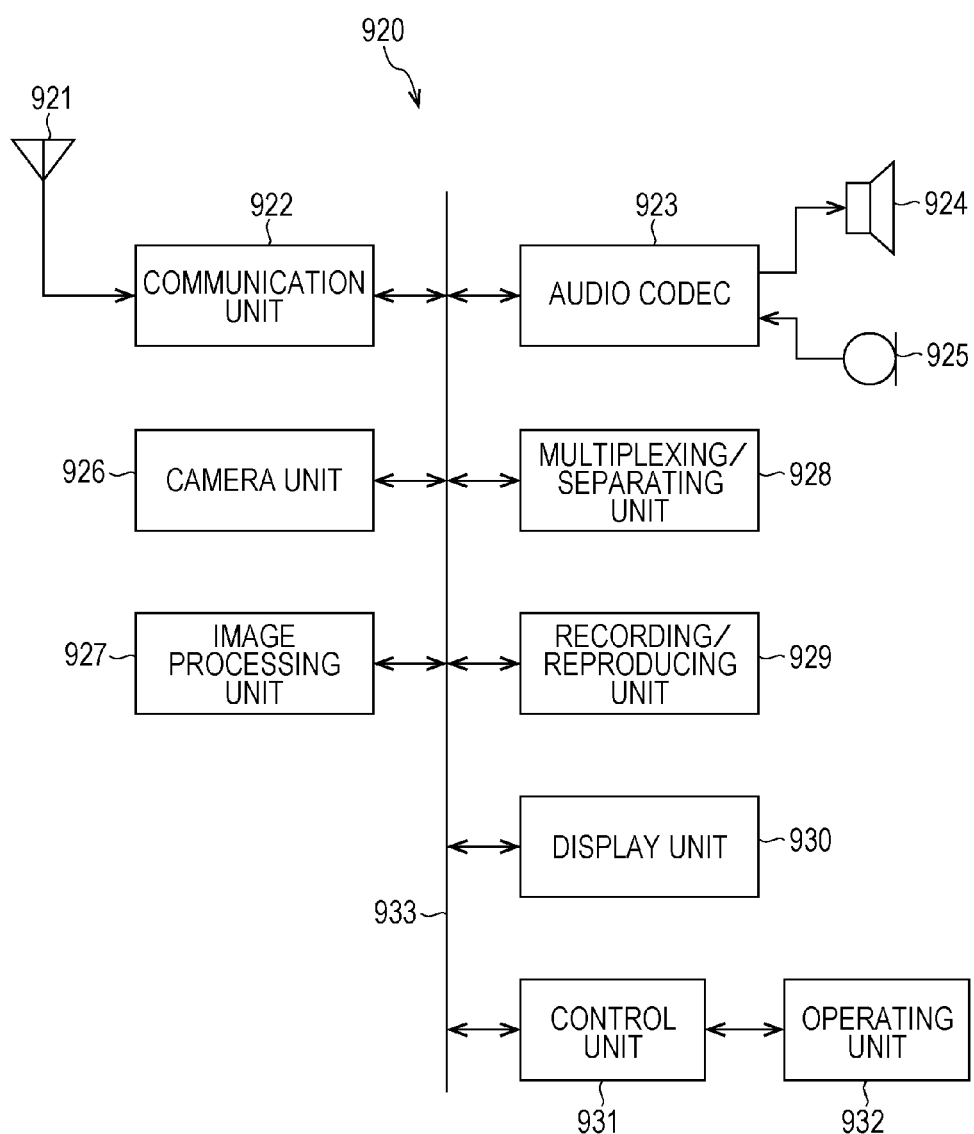
FIG. 28 is a block diagram illustrating an example of a schematic configuration of a mobile phone device.

FIG. 28 illustrates an example of a schematic configuration of a mobile phone device to which the embodiments are applied. A mobile phone device 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operating unit 932, and a bus 933.

The antenna 921 is connected to the communication unit 922. The speaker 924 and the microphone 925 are connected to the audio codec 923. The operating unit 932 is connected to the control unit 931. The bus 933 mutually connects the communication unit 922, the audio codec 923, the camera unit 926, the image processing unit 927, the multiplexing/separating unit 928, the recording/reproducing unit 929, the display unit 930, and the control unit 931.

The mobile phone device 920 performs operations such as transmission/reception of an audio signal, transmission/reception of an electronic mail or image data, imaging of an image, and recording of data, in various operation modes including a voice call mode, a data communication mode, a capturing mode, and a television telephone mode.

In the voice call mode, an analog audio signal generated by the microphone 925 is supplied to the audio codec 923. The audio codec 923 converts the analog audio signal into audio data, and performs A/D conversion of the converted audio data and compresses the audio data. The audio codec 923 then outputs the compressed audio data to the communication unit 922. The communication unit 922 encodes and modulates the audio data to generate a transmission signal. The communication unit 922 then transmits the generated transmission signal to a base station (not illustrated) through the antenna 921. Further, the communication unit 922 amplifies and performs frequency conversion of a radio signal received through the antenna 921 to acquire a reception signal. The communication unit 922 then demodulates and decodes the reception signal to generate audio data, and outputs the generated audio data to the audio codec 923. The audio codec 923 expands and performs D/A conversion of the audio data to generate an analog audio signal. The audio codec 923 then supplies the generated audio signal to the speaker 924 and outputs an audio therethrough.

Further, in the data communication mode, for example, the control unit 931 generates character data that configures the electronic mail according to an operation by the user through the operating unit 932. Further, the control unit 931 displays characters in the display unit 930. Further, the control unit 931 generates electronic mail data according to a transmission instruction from the user through the operating unit 932, and outputs the generated electronic mail data to the communication unit 922. The communication unit 922 encodes and modulates the electronic mail data to generate a transmission signal. The communication unit 922 then transmits the generated transmission signal to the base station (not illustrated) through the antenna 921. Further, the communication unit 922 amplifies and performs frequency conversion of a radio signal received through the antenna 921 to acquire a reception signal. Then, the communication unit 922 demodulates and decodes the reception signal to restore the electronic mail data, and outputs the restored electronic mail data to the control unit 931. The control unit 931 displays contents of the electronic mail in the display unit 930, and stores the electronic mail data in a storage medium of the recording/reproducing unit 929.

The recording/reproducing unit 929 includes an arbitrary readable/writable storage medium. For example, the storage medium may be a built-in-type storage medium such as RAM or flash memory, or may be an externally mounted-type storage medium such as a hard disk, a magnetic disk, a magneto-optical disk, an optical disk, a universal serial bus (USB) memory, or a memory card.

Further, in the capturing mode, for example, the camera unit 926 images an object to generate image data, and outputs the generated image data to the image processing unit 927. The image processing unit 927 encodes the image data input from the camera unit 926, and stores the encoded stream in the storage medium of the storing/reproducing unit 929.

Further, in the television telephone mode, for example, the multiplexing/separating unit 928 multiplexes the video stream encoded by the image processing unit 927 and the audio stream input from the audio codec 923, and outputs the multiplexed stream to the communication unit 922. The communication unit 922 encodes and modulates the stream to generate a transmission signal. The communication unit 922 then transmits the generated transmission signal to the base station (not illustrated) through the antenna 921. Further, the communication unit 922 amplifies and performs frequency conversion of a radio signal received through the antenna 921 to acquire a reception signal. An encoded bit stream can be included in the transmission signal and the reception signal. The communication unit 922 then demodulates and decodes the reception signal to restore the stream, and outputs the restored stream to the multiplexing/separating unit 928. The multiplexing/separating unit 928 separates the video stream and the audio stream from the input stream, and outputs the video stream to the image processing unit 927, and the audio stream to the audio codec 923. The image processing unit 927 decodes the video stream to generate video data. The video data is supplied to the display unit 930, and a series of images is displayed by the display unit 930. The audio codec 923 expands and performs D/A conversion of the audio stream to generate an analog audio signal. The audio codec 923 then supplies the generated audio signal to the speaker 924, and outputs the audio therethrough.

In the mobile phone device 920 configured as described above, the image processing unit 927 has functions of an image encoding device and an image decoding device according to the embodiments. Accordingly, reference relationship of views can be efficiently changed in multi-view coding, in encoding and decoding an image in the mobile phone device 920. Further, encoding efficiency in the multi-view coding can be improved.

[Third Application Example: Recording/Reproducing Device]

Figure 29:
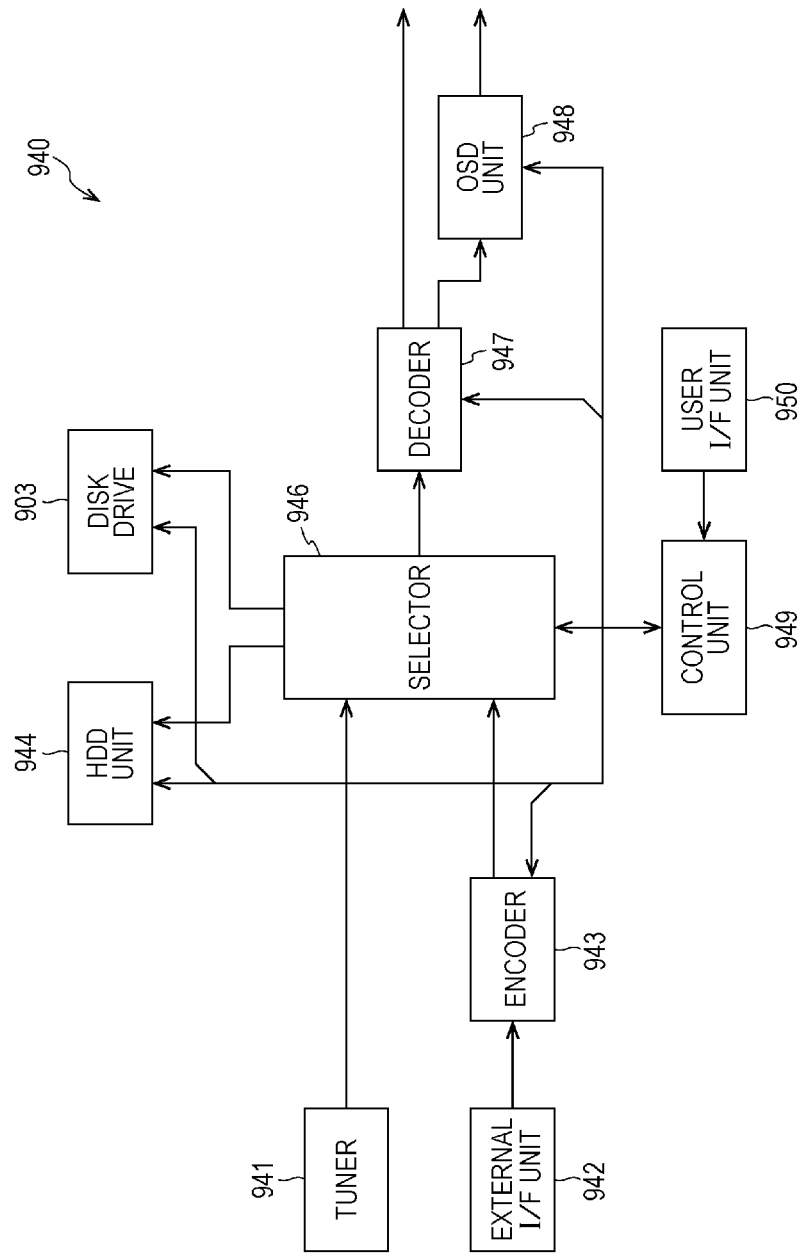
FIG. 29 is a block diagram illustrating an example of a schematic configuration of a recording/reproducing device.

FIG. 29 illustrates an example of a schematic configuration of a recording/reproducing device to which the embodiments are applied. A recording/reproducing device 940 encodes audio data and video data of a received broadcasting program, and records the encoded data in a recording medium, for example. Further, the recording/reproducing device 940 may encode audio data and video data acquired from another device, and record the encoded data in the recording medium, for example. Further, the recording/reproducing device 940 reproduces the data recorded in the recording medium on a monitor or a speaker according to an instruction of a user, for example. At this time, the recording/reproducing device 940 decodes the audio data and the video data.

The recording/reproducing device 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcasting signal received through an antenna (not illustrated), and demodulates the extracted signal. Then, the tuner 941 outputs an encoded bit stream obtained by the demodulation to the selector 946. That is, the tuner 941 serves as transmission means in the recording/reproducing device 940.

The external interface 942 is an interface for connecting the recording/reproducing device 940, and an external device or a network. The external interface 942 may be, for example, an IEEE1394 interface, a network interface, a USB interface, or a flash memory interface. For example, video data and audio data received through the external interface 942 are input to the encoder 943. That is, the external interface 942 serves as transmission means in the recording/reproducing device 940.

The encoder 943 encodes the video data and the audio data when the video data and the audio data input from the external interface 942 are not encoded. The encoder 943 then outputs the encoded bit stream to the selector 946.

The HDD 944 records the encoded bit stream in which content data such as a video or an audio is compressed, various program, and other data, in an internal hard disk. Further, the HDD 944 reads the data from the hard disk at the reproduction of the video and the audio.

The disk drive 945 performs recording and reading of data to/from a mounted recording medium. The recording medium mounted to the disk drive 945 may be, for example, a DVD disk (DVD-Video, DVD-RAM, DVD-R, DVD-RW, DVD+R, DVD+RW, or the like) or a Blu-ray (registered trademark) disk.

The selector 946 selects the encoded bit stream input from the tuner 941 or the encoder 943, and outputs the selected encoded bit stream to the HDD 944 or the disk drive 945 at recording of the video and the audio. Further, the selector 946 outputs the encoded bit stream input from the HDD 944 or the disk drive 945 to the decoder 947 at reproduction of the video and the audio.

The decoder 947 decodes the encoded bit stream to generate the video data and the audio data. The decoder 947 then outputs the generated video data to the OSD 948. Further, the decoder 904 outputs the generated audio data to an external speaker.

The OSD 948 reproduces the video data input from the decoder 947 to display the video. Further, the OSD 948 may superimpose an image of a GUI such as a menu, a button, or a cursor on the video to be displayed.

The control unit 949 includes a processor such as a CPU, and memories such as RAM and ROM. The memory stores a program executed by the CPU, program data, and the like. The program stored in the memory is read and executed by the CPU at start of the recording/reproducing device 940, for example. The CPU controls an operation of the recording/reproducing device 940 by executing the program, according to an operation signal input from the user interface 950, for example.

The user interface 950 is connected with the control unit 949. The user interface 950 includes, for example, a button and a switch for operating the recording/reproducing device 940 by the user, a receiving unit of a remote control signal, and the like. The user interface 950 detects the operation by the user through the configuration elements to generate an operation signal, and outputs the generated operation signal to the control unit 949.

In the recording/reproducing device 940 configured as described above, the encoder 943 has a function of an image encoding device according to the embodiments. Further, the decoder 947 has a function of an image decoding device according to the embodiments. Accordingly, reference relationship of views can be efficiently changed in multi-view coding, in encoding and decoding an image in the recording/reproducing device 940. Further, encoding efficiency in the multi-view coding can be improved.

[Fourth Application Example: Imaging Device]

Figure 30:
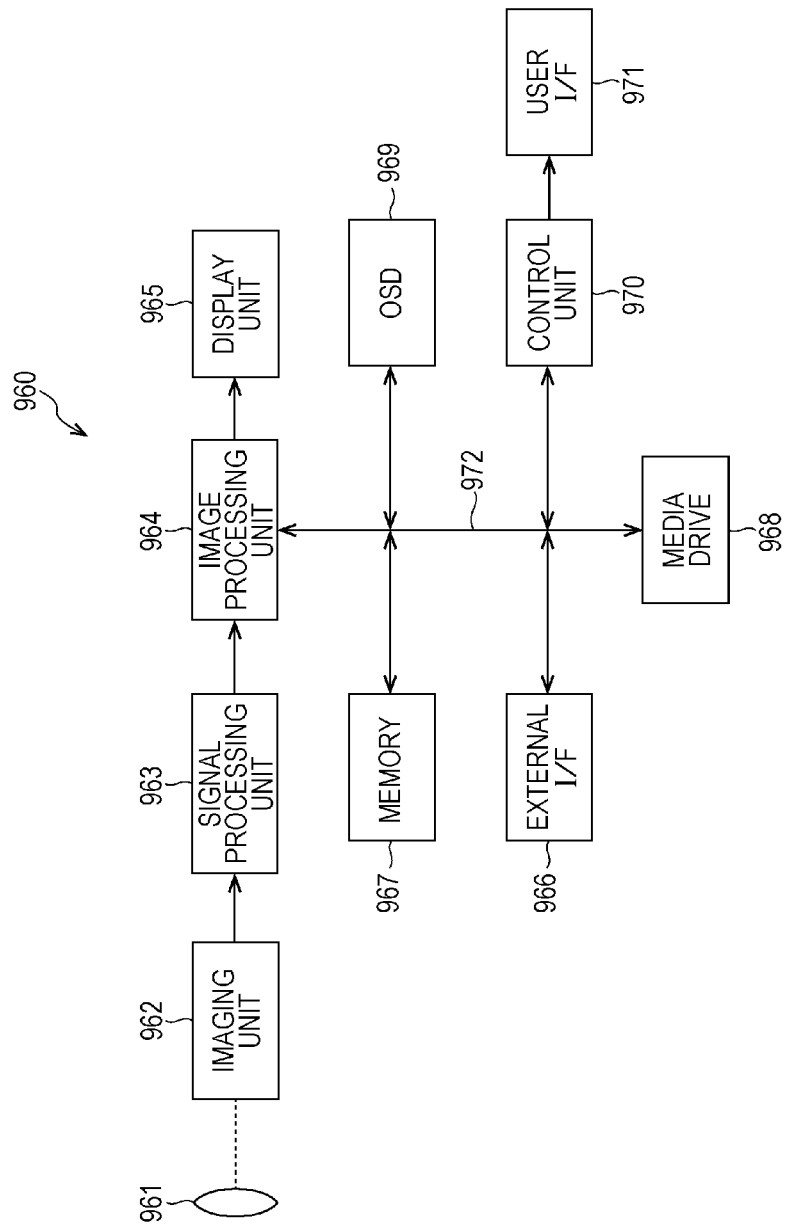
FIG. 30 is a block diagram illustrating an example of a schematic configuration of an imaging device.

FIG. 30 illustrates an example of a schematic configuration of an imaging device to which the embodiments are applied. An imaging device 960 images an object, generates an image, encodes image data, and records the image data in a recording medium.

The imaging device 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens, a diaphragm mechanism, and the like. The optical block 961 focuses an optical image of the object on an imaging surface of the imaging unit 962. The imaging unit 962 includes an image sensor such as a charge coupled device (CCD) or a complementary metal oxide semiconductor (CMOS), and converts the optical image focused on the imaging surface into an image signal as an electric signal by means of photoelectric conversion. The imaging unit 962 then outputs the image signal to the signal processing unit 963.

The signal processing unit 963 performs various camera signal processing such as knee correction, gamma correction, and color correction, for the image signal input from the imaging unit 962. The signal processing unit 963 outputs image data after the camera signal processing to the image processing unit 964.

The image processing unit 964 encodes the image data input from the signal processing unit 963 to generate encoded data. The image processing unit 964 then outputs the generated encoded data to the external interface 966 or the media drive 968. Further, the image processing unit 964 decodes the encoded data input from the external interface 966 or the media drive 968 to generate image data. The image processing unit 964 then outputs the generated image data to the display unit 965. Further, the image processing unit 964 may output the image data input from the signal processing unit 963 to the display unit 965, and display the image data therein. Further, the image processing unit 964 may superimpose display data acquired from the OSD 969 on the image to be output to the display unit 965.

The OSD 969 generates an image of a GUI such as a menu, a button, or a cursor, and outputs the generated image to the image processing unit 964.

The external interface 966 is configured as a USB input/output terminal, for example. The external interface 966 connects the imaging device 960 and a printer at printing of an image, for example. Further, a drive is connected to the external interface 966 as needed. A removable medium such as a magnetic disk or an optical disk is mounted to the drive, for example, and a program read from the removable medium can be installed to the imaging device 960. Further, the external interface 966 may be configured as a network interface to be connected to a network such as a LAN or the Internet. That is, the external interface 966 serves as a transmission means in the imaging device 960.

The recording medium mounted to the media drive 968 may be, for example, an arbitrary readable/writable removable medium such as a magnetic disk, a magneto-optical disk, an optical disk, or a semiconductor memory. Further, the recording medium is mounted to the media drive 968 in a fixed manner, and a non-portable storage unit such as a built-in-type hard disk drive or a solid state drive (SSD) may be configured.

The control unit 970 includes a processor such as a CPU, and memories such as RAM and ROM. The memory stores a program executed by the CPU, program data, and the like. The program stored in the memory is read and executed by the CPU at start of the imaging device 960, for example. The CPU controls an operation of the imaging device 960 by executing the program, according to an operation signal input from the user interface 971, for example.

The user interface 971 is connected with the control unit 970. The user interface 971 includes, for example, a button and a switch for operating the imaging device 960 by a user. The user interface 971 detects an operation by the user through the configuration elements to generate an operation signal, and outputs the generated operation signal to the control unit 970.

In the imaging device 960 configured as described above, the image processing unit 964 has functions of an image encoding device and an image decoding device according to the embodiments. Accordingly, reference relationship of views can be efficiently changed in multi-view coding, in encoding and decoding an image in the imaging device 960. Further, encoding efficiency in the multi-view coding can be improved.

6. Fifth Embodiment

[Other Examples of Implementation]

Examples of the devices and systems to which the present technology is applied have been described. However, the present technology is not limited thereto, and can be implemented as any configuration incorporated in such a device or a device that configures the systems, such as a processor as system large scale integration (LSI), a module using a plurality of processors, a unit using a plurality of modules, a set in which other functions are added to the unit, or the like (that is, a part of the configuration of the device).

[Video Set]

Figure 31:
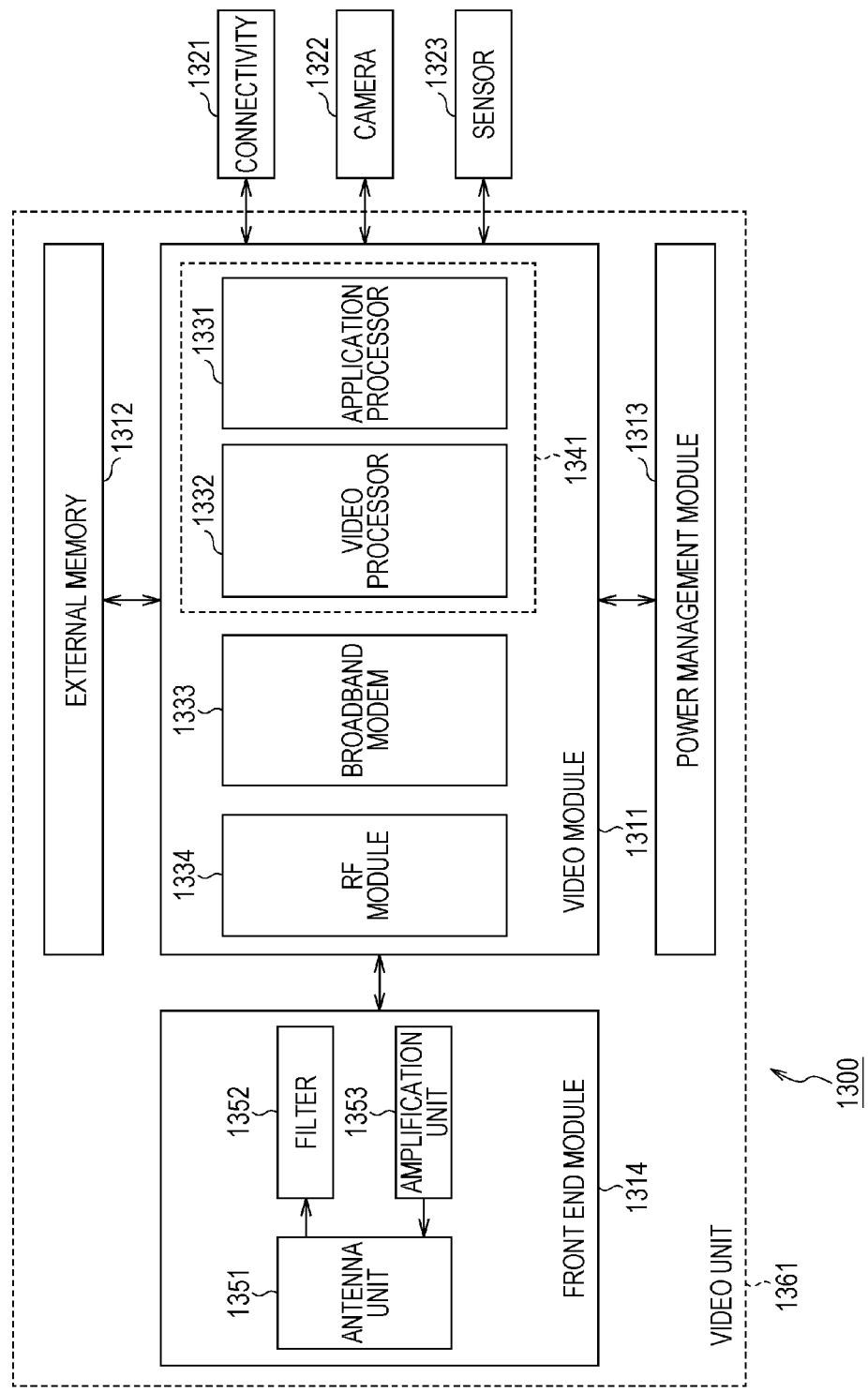
FIG. 31 is a block diagram illustrating an example of a schematic configuration of a video set.

An example of a case where the present technology is implemented as a set will be described with reference to FIG. 31. FIG. 31 illustrates an example of a schematic configuration of a video set to which the present technology is applied.

In recent years, multi-functionalization of electronic devices is in progress. When a part of a configuration is implemented for sale or distribution in developing or manufacturing the electronic devices, not only a case of implementing the configuration as a configuration with one function, but also a case of combining a plurality of configurations having related functions, and implementing the configurations as one set with a plurality of functions have been common.

A video set 1300 illustrated in FIG. 31 is a multi-functionalized configuration, and is a combination of a device having functions related to encoding and decoding (may be both of them, or one of them) of an image, and a device having another function related to the functions.

As illustrated in FIG. 31, the video set 1300 includes module groups such as a video module 1311, an external memory 1312, and a power management module 1313, and divides having related functions such as a front end module 1314, a connectivity 1321, a camera 1322, and a sensor 1323.

A module is a part having cohesive functions in which several part functions, which are mutually related, are put together. While a specific physical configuration is arbitrary, a module in which a plurality of processors having respective functions, electronic circuit elements such as a resistance and a capacitor, and other devices are arranged and integrated on a circuit board can be considered, for example. Further, another module, a processor, and the like are combined with the module to make a new module can be considered.

In the example of FIG. 31, the video module 1311 is a combination of configurations having functions related to image processing, and includes an application processor, a video processor, a broadband modem 1333, and an RF module 1334.

The processors are ones in which configurations having predetermined functions are integrated on a semiconductor chip by system on a chip (SoC), and are, for example, called system large scale integration (LSI). The configurations having predetermined functions may be logic circuits (hardware configurations), may be a CPU, ROM, RAM, and programs (software configurations) executed using thereof, or may be a combination of the CPU, the ROM, the RAM, and the programs. For example, the processors may include the logic circuits, the CPU, the ROM, the RAM, and the like, and a part of the functions may be realized by the logic circuits (hardware configurations), and other functions may be realized by the programs (software configurations) executed in the CPU.

The application processor 1331 of FIG. 31 is a processor that executes an application related to the image processing. The application executed in the application processor 1331 not only performs calculation processing, but also can control the configurations inside and outside the video module 1311 such as the video processor 1332, as needed, in order to realize a predetermined function.

The video processor 1332 is a processor having the functions related to encoding/decoding (both of them, or one of them) of an image.

The broadband modem 1333 is a processor (or a module) that performs processing related to wired or wireless (or both of them) broadband communication, which is performed through a broadband line such as the Internet or a public telephone network. For example, the broadband modem 1333 modulates and converts data (digital signal) to be transmitted into an analog signal, and demodulates and converts a received analog signal into data (digital signal). For example, the broadband modem 1333 can perform digital modulation/demodulation of any information such as image data processed by the video processor 1332, a stream that is encoded image data, an application program, or setting data.

The RF module 1334 is a module that performs frequency conversion, modulation/demodulation, amplification, filter processing, and the like, for a radio frequency (RF) signal transmitted/received through an antenna. For example, the RF module 1334 performs the frequency conversion and the like, for a baseband signal generated by the broadband modem 1333 to generate the RF signal. Further, for example, the RF module 1334 performs the frequency conversion and the like, for the RF signal received through the front end module 1314 to generate the baseband signal.

Note that, as illustrated by the dotted line 1341 in FIG. 31, the application processor 1331 and the video processor 1332 may be integrated and configured as one processor.

The external memory 1312 is a module provided outside the video module 1311, and includes a storage device used by the video module 1311. While the storage device of the external memory 1312 may be realized by any physical configuration, it is desirable to realize the storage device with a relatively cheap, large-capacity semiconductor memory, such as dynamic random access memory (DRAM), because the storage device is typically often used to store large-volume data such as image data in frame units.

The power management module 1313 manages and controls power supply to the video module 1311 (each configuration in the video module 1311).

The front end module 1314 is a module that provides a front end function (a transmission/reception terminal circuit at the antenna side) to the RF module 1334. As illustrated in FIG. 31, the front end module 1314 includes, for example, an antenna unit 1351, a filter 1352, and an amplification unit 1353.

The antenna unit 1351 includes an antenna that transmits/ receives a radio signal, and its peripheral configurations. The antenna unit 1351 transmits a signal supplied from the amplification unit 1353, as a radio signal, and supplies the received radio signal to the filter 1352, as an electrical signal (RF signal). The filter 1352 performs filter processing and the like, for the RF signal received through the antenna unit 1351, and supplies the processed RF signal to the RF module 1334. The amplification unit 1353 amplifies the RF signal supplied from the RF module 1334, and supplies the amplified signal to the antenna unit 1351.

The connectivity 1321 is a module having a function related to connection with an outside. A physical configuration of the connectivity 1321 is arbitrary. For example, the connectivity 1321 includes a configuration having a communication function other than a communication standard supported by the broadband modem 1333, an external input/ output terminal, and the like.

For example, the connectivity 1321 may include a module having a communication function conforming to a wireless communication standard such as Bluetooth (registered trademark), IEEE 802.11 (for example, Wi-Fi (wireless fidelity, registered trademark)), near field communication (NFC), or infrared data association (IrDA), and an antenna that transmits/receives a signal conforming to the standard. Further, for example, the connectivity 1321 may include a module having a communication function conforming to a wired communication standard such as a universal serial bus (USB), or a high-definition multimedia interface (HDMI (registered trademark)), and a terminal conforming to the standard. Further, for example, the connectivity 1321 may have a function to transmit other data (signals) such as an analog input/output terminal.

Note that the connectivity 1321 may include a device of a transmission destination of data (signal). For example, the connectivity 1321 may include a drive that performs reading and writing of data from/to a recording medium such as a magnetic disk, an optical disk, a magneto-optical disk, or a semiconductor memory (including not only the drive for the removable medium, but also a hard disk, a solid state drive (SSD)), a network attached storage (NAS), or the like). Further, the connectivity 1321 may include an output device (a monitor or a speaker) of an image or an audio.

The camera 1322 is a module having a function to image an object to obtain image data of the object. The image data obtained by imaging of the camera 1322 is supplied to the video processor 1332 and encoded.

The sensor 1323 is a module having an arbitrary sensor function such as an audio sensor, a ultrasonic sensor, an optical sensor, an illuminance sensor, an infrared sensor, an image sensor, a rotation sensor, an angle sensor, an angle speed sensor, a speed sensor, an acceleration sensor, a tilt sensor, a magnetic identification sensor, an impact sensor, or a temperature sensor. Data detected by the sensor 1323 is supplied to the application processor 1331, and used by an application and the like.

The configurations described as the modules may be realized as processors. Contrary to that, the configurations described as the processors may be realized as modules.

In the video set 1300 having the above configuration, the present technology can be applied to the video processor 1332 described below. Therefore, the video set 1300 can be implemented as a set to which the present technology is applied.

[Configuration Example of Video Processor]

Figure 32:
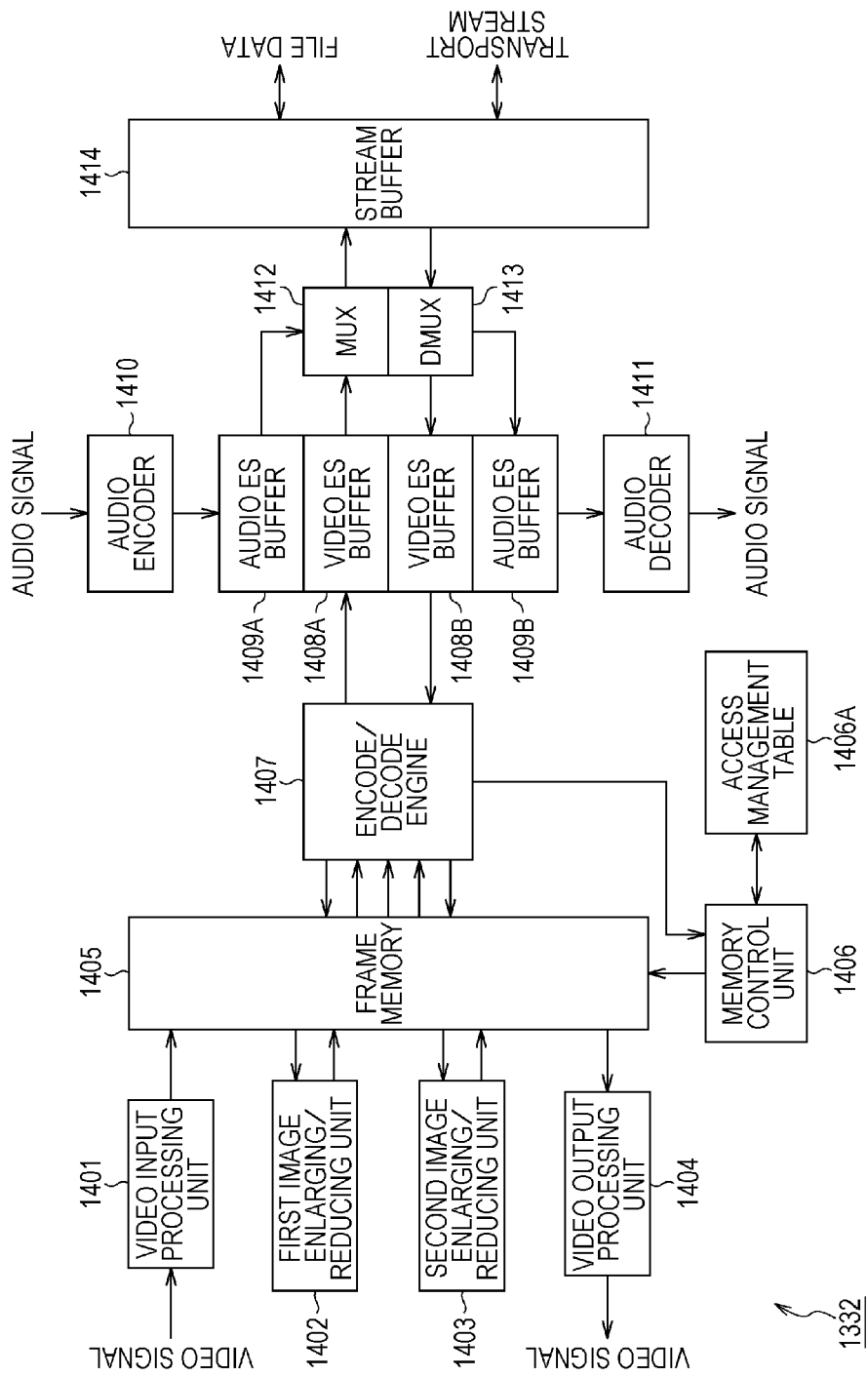
FIG. 32 is a block diagram illustrating an example of a schematic configuration of a video processor.

FIG. 32 illustrates an example of a schematic configuration of the video processor 1332 (FIG. 31) to which the present technology is applied.

In the example of FIG. 32, the video processor 1332 has a function to receive inputs of a video signal and an audio signal and to encode the signals in a predetermined system, and a function to decode encoded video data and audio data, and to reproduce and output the video signal and the audio signal.

As illustrated in FIG. 32, the video processor 1332 includes a video input processing unit 1401, a first image enlarging/reducing unit 1402, a second image enlarging/ reducing unit 1403, a video output processing unit 1404, a frame memory 1405, and a memory control unit 1406. Further, the video processor 1332 includes an encode/ decode engine 1407, video elementary stream (ES) buffers 1408A and 1408B, and audio ES buffers 1409A and 1409B. Further, the video processor 1332 includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 31) or the like, and converts the video signal into digital image data. The first image enlarging/reducing unit 1402 performs format conversion and enlarging/reducing processing of an image, for image data. The second image enlarging/reducing unit 1403 performs enlarging/reducing processing of an image according to a format of an output destination through the video output processing unit 1404, for the image data, and performs format conversion and enlarging/reducing processing of an image similar to the first image enlarging/reducing unit 1402. The video output processing unit 1404 performs format conversion and conversion into an analog signal, for the image data, and outputs the converted signal to the connectivity 1321 (FIG. 31) or the like, as a reproduced video signal.

The frame memory 1405 is an image data memory commonly used by the video input processing unit 1401, the first image enlarging/reducing unit 1402, the second image enlarging/reducing unit 1403, the video output processing unit 1404, and the encode/decode engine 1407. The frame memory 1405 is realized as a semiconductor memory such as DRAM.

The memory control unit 1406 receives a synchronization signal from the encode/decode engine 1407, and controls an access of writing/reading to/from the frame memory 1405 according to an access schedule to the frame memory 1405 written in an access management table 1406A. The access management table 1406A is updated by the memory control unit 1406 according to processing executed in the encode/ decode engine 1407, the first image enlarging/reducing unit 1402, the second image enlarging/reducing unit 1403, or the like.

The encode/decode engine 1407 performs encoding processing of image data, and decoding processing of a video stream that is encoded image data. For example, the encode/ decode engine 1407 encodes the image data read from the frame memory 1405, and sequentially writes the encoded image data in the video ES buffer 1408A, as a video stream. Further, for example, the encode/decode engine 1407 sequentially reads the video stream from the video ES buffer 1408B and decodes the video stream, and sequentially writes the decoded data to the frame memory 1405, as image data. The encode/decode engine 1407 uses the frame memory 1405 as a work area in the encoding and decoding. Further, the encode/decode engine 1407 outputs a synchronization signal to the memory control unit 1406 at timing when processing of each macroblock is started.

The video ES buffer 1408A buffers the video stream generated by the encode/decode engine 1407, and supplies the video stream to the multiplexer (MUX) 1412. The video ES buffer 1408B buffers the video stream supplied from the demultiplexer (DMUX) 1413, and supplies the video stream to the encode/decode engine 1407.

The audio ES buffer 1409A buffers the audio stream generated by the audio encoder 1410, and supplies the audio stream to the multiplexer (MUX) 1412. The audio ES buffer 1409B buffers the audio stream supplied from the demultiplexer (DMUX) 1413, and supplies the audio stream to the audio decoder 1411

The audio encoder 1410 digitally converts the audio signal input from the connectivity 1321 (FIG. 31) or the like, and encodes the converted data in a predetermined system such as a MPEG audio system or audio code number 3 (AC3) system. The audio encoder 1410 sequentially writes the audio stream that is data of encoded audio signal to the audio ES buffer 1409A. The audio decoder 1411 decodes the audio stream supplied from the audio ES buffer 1409B, performs conversion to an analog signal, and supplies the analog signal to the connectivity 1321 (FIG. 31) or the like, as a reproduced audio signal.

The multiplexer (MUX) 1412 multiplexes the video stream and the audio stream. A method of the multiplexing (that is, a format of a bit stream generated by the multiplexing) is arbitrary. Further, the multiplexer (MUX) 1412 can add predetermined header information and the like to the bit stream in the multiplexing. That is, the multiplexer (MUX) 1412 can convert the format of the stream by the multiplexing. For example, the multiplexer (MUX) 1412 converts the video stream and the audio stream into a transport stream that is a bit stream in a transmission format, by multiplexing the video stream and the audio stream. Further, for example, the multiplexer (MUX) 1412 converts the video stream and the audio stream into data (file data) in a recording format, by multiplexing the video stream and the audio stream.

The demultiplexer (DMUX) 1413 demultiplexes the bit stream that is the multiplexed video stream and audio stream, by a method corresponding to the multiplexing by the multiplexer (MUX) 1412. That is, the demultiplexer (DMUX) 1413 extracts the video stream and the audio stream from the bit stream read from the stream buffer 1414 (separates the video stream and the audio stream). That is, the demultiplexer (DMUX) 1413 can convert the format of the stream by the demultiplexing (demultiplexing of the conversion by the multiplexer (MUX) 1412). For example, the demultiplexer (DMUX) 1413 acquires the transport stream supplied from the connectivity 1321, the broadband modem 1333 (both are in FIG. 31), or the like through the stream buffer 1414, and demultiplexes the transport stream, thereby to convert the transport stream into the video stream and the audio stream. Further, for example, the demultiplexer (DMUX) 1413 acquires the file data read from various recording media by the connectivity 1321 (FIG. 31), through the stream buffer 1414, and demultiplexes the file data, thereby to convert the file data into the video stream and the audio stream.

The stream buffer 1414 buffers the bit stream. For example, the stream buffer 1414 buffers the transport stream supplied from the multiplexer (MUX) 1412, and supplies the transport stream to the connectivity 1321, the broadband modem 1333 (both are in FIG. 31), or the like, for example, at predetermined timing or based on a request from an outside, or the like.

Further, for example, the stream buffer 1414 buffers the file data supplied from the multiplexer (MUX) 1412, supplies the file data to the connectivity 1321 (FIG. 31) and the like, at predetermined timing or based on a request from an outside, or the like, and records the file data in various recording media.

Further, the stream buffer 1414 buffers the transport stream acquired through the connectivity 1321, the broadband modem 1333 (both are in FIG. 31), or the like, and supplies the transport stream to the demultiplexer (DMUX) 1413, at predetermined timing or based on a request from an outside, or the like.

Further, the stream buffer 1414 buffers the file data read from the various recording media in the connectivity 1321 (FIG. 31) or the like, and supplies the file data to the demultiplexer (DMUX) 1413, at predetermined timing or based on a request from an outside, or the like.

Next, an example of an operation of the video processor 1332 with such a configuration will be described. For example, the video signal input from the connectivity 1321 (FIG. 31) or the like to the video processor 1332 is converted into digital image data in the video input processing unit 1401, in a predetermined system such as a 4:2:2 Y/Cb/Cr system, and sequentially written in the frame memory 1405. The digital image data is read to the first image enlarging/reducing unit 1402 or the second image enlarging/reducing unit 1403, the format conversion into a predetermined format such as a 4:2:0 Y/Cb/Cr format and the enlarging/reducing processing are performed, and the converted image data is written in the frame memory 1405 again. This image data is encoded by the encode/decode engine 1407, and written in the video ES buffer 1408A, as a video stream.

Further, the audio signal input from the connectivity 1321 (FIG. 31) or the like to the video processor 1332 is encoded by the audio encoder 1410, and written in the audio ES buffer 1409A, as an audio stream.

The video stream in the video ES buffer 1408A and the audio stream in the audio ES buffer 1409A are read to the multiplexer (MUX) 1412 and multiplexed, and are converted into a transport stream, file data or the like. The transport stream generated by the multiplexer (MUX) 1412 is buffered in the stream buffer 1414, and then output to an external network through the connectivity 1321, the broadband modem 1333 (both are in FIG. 31), or the like. Further, the file data generated by the multiplexer (MUX) 1412 is buffered by the stream buffer 1414, then output to the connectivity 1321 (FIG. 31), or the like, and recorded in various recording media.

Further, for example, the transport stream input to the video processor 1332 from an external network through the connectivity 1321, the broadband modem 1333 (both are in FIG. 31), or the like is buffered in the stream buffer 1414, and then demultiplexed by the demultiplexer (DMUX) 1413. Further, for example, the file data read from the various recording media in the connectivity 1321 (FIG. 31) or the like and input to the video processor 1332 is buffered in the stream buffer 1414, and then demultiplexed by the demultiplexer (DMUX) 1413. That is, the transport stream or the file data input to the video processor 1332 is separated into the video stream and the audio stream by the demultiplexer (DMUX) 1413.

The audio stream is supplied to the audio decoder 1411 through the audio ES buffer 1409B and decoded, and an audio signal is reproduced. Further, the video stream is written in the video ES buffer 1408B, then sequentially read and decoded by the encode/decode engine 1407, and written in the frame memory 1405. The decoded image data is subjected to the enlarging/reproducing processing by the second image enlarging/reducing unit 1403, and written in the frame memory 1405. Then, the decoded image data is read by the video output processing unit 1404, converted into a predetermined format such as a 4:2:2 Y/Cb/Cr system, and converted into an analog signal, and a video signal is reproduced and output.

When the present technology is applied to the video processor 1332 configured as described above, the present technology according to the above-described embodiments may just be applied to the encode/decode engine 1407. That is, for example, the encode/decode engine 1407 may just have the configurations of the image encoding device 1 (FIG. 1) according to the first embodiment and the image decoding device 151 (FIG. 18) according to the second embodiment. In doing so, the video processor 1332 can obtain a similar effect to the effect described with reference to FIGS. 1 to 23.

Note that the present technology (that is, the functions of the image encoding device and the image decoding device according to the embodiments) may be realized by hardware such as a logic circuit, may be realized by software such as an incorporated program, or may be realized by both of them, in the encode/decode engine 1407.

[Another Configuration Example of Video Processor]

Figure 33:
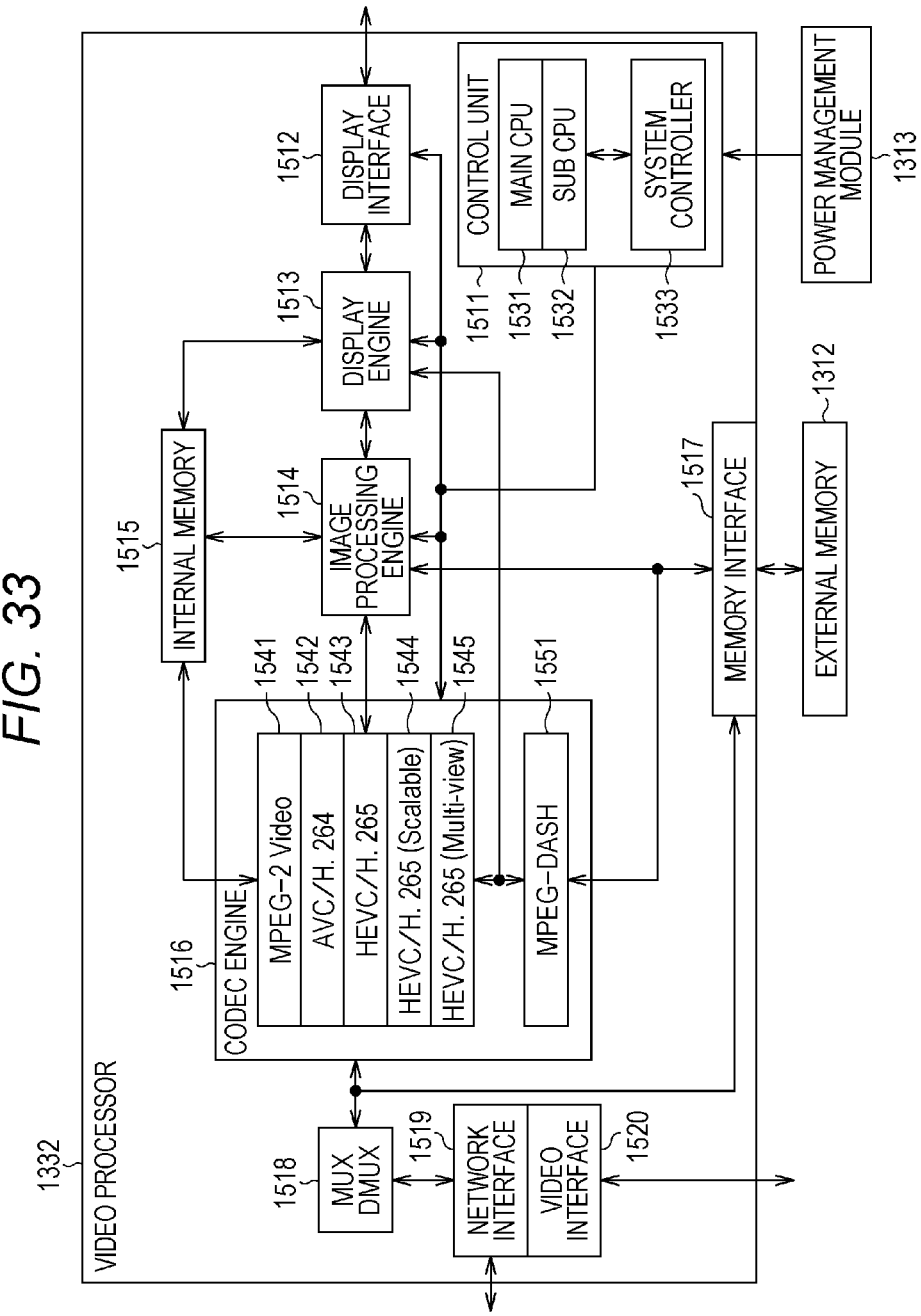
FIG. 33 is a block diagram illustrating another example of a schematic configuration of the video processor.

FIG. 33 illustrates another example of a schematic configuration of the video processor 1332 (FIG. 31) to which the present technology is applied. In the example of FIG. 33, the video processor 1332 has functions to encode/decode video data in a predetermined system.

To be specific, as illustrated in FIG. 33, the video processor 1332 includes a control unit 1511, a display interface 1512, a display engine 1513, an image processing engine 1514, and an internal memory 1515. Further, the video processor 1332 includes a codec engine 1516, a memory interface 1517, a multiplexer/demultiplexer (MUX DMUX) 1518, a network interface 1519, and a video interface 1520.

The control unit 1511 controls operations of respective processing units in the video processor 1332, such as the display interface 1512, the display engine 1513, the image processing engine 1514, and the codec engine 1516.

As illustrated in FIG. 33, the control unit 1511 includes, for example, a main CPU 1531, a sub CPU 1532, and a system controller 1533. The main CPU 1531 executes a program and the like for controlling operations of processing units in the video processor 1332. The main CPU 1531 generates control signals according to the program and the like, and supplies the control signals to the respective processing units (that is, operates the operations of the respective processing units). The sub CPU 1532 plays an auxiliary role of the main CPU 1531. For example, the sub CPU 1532 executes a child process of the program executed by the main CPU 1531, a sub routine, and the like. The system controller 1533 controls operations of the main CPU 1531 and the sub CPU 1532, such as specifying the programs executed by the main CPU 1531 and the sub CPU 1532.

The display interface 1512 outputs image data to the connectivity 1321 (FIG. 31) or the like, under control of the control unit 1511. The display interface 1512 converts the image data of digital data into an analog signal, and outputs the image data to a monitor device of the connectivity 1321 (FIG. 31) or the like, as a reproduced video signal, or the image data of digital data as it is.

The display engine 1513 performs various types of conversion processing such as format conversion, size conversion, and color gamut conversion, for the image data, to cause the image data to confirm to a hardware specification of the monitor device on which the image is displayed, under the control of the control unit 1511.

The image processing engine 1514 applies predetermined image processing such as filter processing to the image data, for improvement of image quality, under the control of the control unit 1511.

The internal memory 1515 is a memory provided inside the video processor 1332, commonly used by the display engine 1513, the image processing engine 1514, and the codec engine 1516. The internal memory 1515 is used for exchange of data performed among the display engine 1513, the image processing engine 1514, and the codec engine 1516, for example. The internal memory 1515 stores data supplied from the display engine 1513, the image processing engine 1514, or the codec engine 1516, for example, and supplies the data to the display engine 1513, the image processing engine 1514, or the codec engine 1516, as needed (for example, according to a request). The internal memory 1515 may be realized by any storage device. However, the internal memory 1515 is desirably realized by a semiconductor memory with a high response speed although with a relatively smaller capacity (than the external memory 1312, for example) such as static random access memory (SRAM), because the internal memory 1515 is typically often used to store small-capacity data such as image data in block units or parameters.

The codec engine 1516 performs processing related to encoding and decoding of image data. A system of encoding/decoding supported by the codec engine 1516 is arbitrary, and one or a plurality of systems may be employed. For example, the codec engine 1516 may include codec functions of a plurality of encoding/decoding systems, and may perform encoding of the image data or decoding of encoded data in a system selected from among the plurality of systems.

In the example illustrated in FIG. 33, the codec engine 1516 includes, for example, MPEG-2 video 1541, AVC/H.264 1542, HEVC/H.265 1543, HEVC/H.265 (scalable) 1544, HEVC/H.265 (multi-view) 1545, and MPEG-DASH 1551, as function blocks of processing related to codec.

The MPEG-2 video 1541 is a function block that encodes/decodes the image data in the MPEG-2 system. AVC/H.264 1542 is a function block that encodes/decodes the image data in the AVC system. HEVC/H.265 1543 is a function block that encodes/decodes the image data in the HEVC system. HEVC/H.265 (scalable) 1544 is a function block that performs scalable coding/scalable decoding of the image data in the HEVC system. HEVC/H.265 (multi-view) 1545 is a function block that performs multi-view coding/multi-view decoding of the image data in the HEVC system.

MPEG-DASH 1551 is a function block that transmits/receives the image data in the MPEG-DASH (MPEG-dynamic adaptive streaming over HTTP) system. MPEG-DASH is a technology to perform streaming of a video using a hypertext transfer protocol (HTTP), and has a characteristic of selecting and transmitting appropriate encoded data from a plurality of encoded data having mutually different resolution and the like prepared in advance, in segment units. MPEG-DASH 1551 performs generation of a stream conforming to the standard and transmission control of the stream, and uses MPEG-2 video 1541 to HEVC/H.265 (multi-view) 1545 for the encoding/decoding of the image data.

The memory interface 1517 is an interface for the external memory 1312. Data supplied from the image processing engine 1514 or the codec engine 1516 is supplied to the external memory 1312 through the memory interface 1517. Further, data read from the external memory 1312 is supplied to the video processor 1332 (the image processing engine 1514 or the codec engine 1516) through the memory interface 1517.

The multiplexer/demultiplexer (MUX DMUX) 1518 multiplexes/demultiplexes various types of data related to an image, such as a bit stream of encoded data, image data, a video signal, and the like. A method of the multiplexing/demultiplexing is arbitrary. For example, not only does the multiplexer/demultiplexer (MUX DMUX) 1518 put a plurality of data together, but also can add predetermined header information to the data, in multiplexing. Further, not only does the multiplexer/demultiplexer (MUX DMUX) 1518 divide one data into a plurality of data, but also can add predetermined header information to each divided data, in demultiplexing. That is, the multiplexer/demultiplexer (MUX DMUX) 1518 can convert a format of data by multiplexing/demultiplexing. For example, the multiplexer/demultiplexer (MUX DMUX) 1518 can convert the bit stream into a transport stream that is a bit stream in a transmission format, or data (file data) in a recording file format, by multiplexing the bit stream. Apparently, it is possible to perform inverse conversion by the demultiplexing.

The network interface 1519 is an interface for the broadband modem 1333, the connectivity 1321 (both are in FIG. 31), and the like, for example. The video interface 1520 is an interface for the connectivity 1321, the camera 1322 (both are in FIG. 31), and the like, for example.

Next, an example of an operation of the video processor 1332 will be described. For example, when a transport stream is received from an external network through the connectivity 1321, the broadband modem 1333 (both are in FIG. 31), or the like, the transport stream is supplied to the multiplexer/demultiplexer (MUX DMUX) 1518 through the network interface 1519 and demultiplexed, and decoded by the codec engine 1516. The image data obtained by the decoding of the codec engine 1516 is subjected to predetermined image processing by the image processing engine 1514, subjected to predetermined conversion by the display engine 1513, and supplied to the connectivity 1321 (FIG. 31) or the like through the display interface 1512, and the image thereof is displayed on the monitor, for example. Further, for example, the image data obtained by the decoding of the codec engine 1516 is encoded by the codec engine 1516 again, multiplexed by the multiplexer/demultiplexer (MUX DMUX) 1518 and converted into file data, output to the connectivity 1321 (FIG. 31) or the like through the video interface 1520, and recorded in various recording medium.

Further, for example, the file data of encoded data that is encoded image data read from a recording medium (not illustrated) by the connectivity 1321 (FIG. 31) or the like is supplied to the multiplexer/demultiplexer (MUX DMUX) 1518 through the video interface 1520 and demultiplexed, and decoded by the codec engine 1516. The image data obtained by the decoding of the codec engine 1516 is subjected to predetermined image processing by the image processing engine 1514, subjected to predetermined conversion by the display engine 1513, and supplied to the connectivity 1321 (FIG. 31), or the like through the display interface 1512, and an image thereof is displayed on the monitor. Further, for example, the image data obtained by the decoding of the codec engine 1516 is encoded by the codec engine 1516 again, multiplexed by the multiplexer/demultiplexer (MUX DMUX) 1518, converted into the transport stream, supplied to the connectivity 1321 or the broadband modem 1333 (both are in FIG. 31), or the like through the network interface 1519, and transmitted to another device (not illustrated).

Note that exchange of image data and other data among the processing units in the video processor 1332 is performed using the internal memory 1515 and the external memory 1312, for example. Further, the power management module 1313 controls power supply to the control unit 1511, for example.

When the present technology is applied to the video processor 1332 configured as described above, the present technology according to the embodiments may just be applied to the codec engine 1516. That is, for example, the codec engine 1516 may just have the function blocks that realize the image encoding device 1 (FIG. 1) according to the first embodiment and the image decoding device 151 (FIG. 18) according to the second embodiment. In doing so, the video processor 1332 can obtain an effect similar to the effect described with reference to FIGS. 1 to 23.

Note that the present technology (that is, the functions of the image encoding device and the image decoding device according to the embodiments) may be realized by hardware such as a logic circuit, may be realized by software such as an incorporated program, or may be realized by both of them, in the codec engine 1516.

Two examples of the configuration of the video processor 1332 have been described. However, the configuration of the video processor 1332 is arbitrary, and may be one other than the above-described two examples. Further, the video processor 1332 may be configured from one semiconductor chip, or may be configured from a plurality of semiconductor chips. For example, the video processor 1332 may be a three-dimensional stacked LSI in which a plurality of semiconductors is stacked. Further, the video processor 1332 may be realized by a plurality of LSIs.

[Application Example to Devices]

The video set 1300 can be incorporated in various devices that process image data. For example, the video set 1300 can be incorporated into the television device 900 (FIG. 27), the mobile phone device 920 (FIG. 28), the recording/reproducing device 940 (FIG. 29), the imaging device 960 (FIG. 30), and the like. By implementation of the video set 1300, the device can obtain an effect similar to the effect described with reference to FIGS. 1 to 23.

Note that, even a part of the configurations of the video set 1300 can be implemented as a configuration to which the present technology is applied as long as the configuration includes the video processor 1332. For example, only the video processor 1332 can be implemented as a video processor to which the present technology is applied. Further, for example, the processors illustrated by the dotted line 1341, the video module 1311, or the like can be implemented as processors, a module, or the like to which the present technology is applied. Further, for example, the video module 1311, the external memory 1312, the power management module 1313, and the front end module 1314 are combined, and can be implemented as a video unit 1361 to which the present technology is applied. In any case, an effect similar to the effect described with reference to FIGS. 1 to 23 can be obtained.

That is, any configuration can be incorporated into various devices that process image data, similarly to the case of the video set 1300, as long as the configuration includes the video processor 1332. For example, the video processor 1332, the processors illustrated by the dotted line 1341, the video module 1311, or the video unit 1361 can be incorporated into the television device 900 (FIG. 27), the mobile phone device 920 (FIG. 28), the recording/reproducing device 940 (FIG. 29), the imaging device 960 (FIG. 30), and the like. Then, by incorporation of any of the configurations to which the present technology is applied, the device can obtain an effect similar to the effect described by reference to FIGS. 1 to 23, similarly to the case of the video set 1300.

Note that, in the present specification, an example in which various types of information such as the reference image flag, the VPS, the SPS, and the slice header are multiplexed to an encoded stream, and transmitted from the encoding side to the decoding side has been described. However, the technique to transmit these types of information is not limited to the example. For example, these types of information may be transmitted and recorded as individual data associated with the encoded bit stream without being multiplexed to the encoded bit stream. Here, the term "association" means enabling an image (or may be a part of the image such as a slice or a block) included in the bit stream, and information corresponding to the image to be linked at decoding. That is, the information may be transmitted on a transmission path different from the image (or the bit stream). Further, the information may be recorded in a recording medium (or a different recording area of the same recording medium) different from the image (or the bit stream). Further, the information and the image (or the bit stream) may be associated with each other in an arbitrary unit such as a plurality of frames, one frame, or a part in a frame.

As described above, favorable embodiments of the present disclosure have been described in detail with reference to the appended drawings. However, the present disclosure is not limited to these embodiments. It is apparent that a person with ordinary skill in the art to which the present disclosure pertains can arrive at various modified examples and revised examples within the scope of the technical idea described in claims. It is understood that these modified examples and revised examples naturally belong to the technical scope of the present disclosure.

Note that the present technology can also employ following configurations.

(1) An image processing apparatus including:
a decoding unit configured to decode a bit stream to generate an image; and
a prediction unit configured to predict the image generated by the decoding unit, by reference to a list of reference images generated based on layer reference image information that controls reference images for each layer, the reference images being referable in a layer direction and referred in predicting the image that is the bit stream subjected to decoding processing.

(2) The image processing apparatus according to (1), wherein the layer reference image information is transmitted at fixed intervals or in picture units.

(3) The image processing apparatus according to (1) or (2), wherein the layer reference image information is set to a sequence parameter set or a slice header of the bit stream.

(4) The image processing apparatus according to any of (1) to (3), further including:
a reference list generating unit configured to generate the list of reference images, based on the layer reference image information.

(5) The image processing apparatus according to (4), wherein, when inserting the reference images referable in a layer direction into the list of reference images, with respect to an L1 direction, the reference list generating unit reverses an order of the reference images referable in the layer direction to a case of an L0 direction, and inserts the reference images.

(6) The image processing apparatus according to (4), wherein the reference list generating unit adds a reference image in which the layer reference image information indicates 1, of the reference images referable in a layer direction, to generate the list of reference images.

(7) The image processing apparatus according to (4), wherein the reference list generating unit adds a reference image in which the layer reference image information indicates 1, of the reference images referable in a layer direction, and combines reference images in an order of a reference image positioned temporally before the image, a reference image positioned temporally after the image, a long-term reference image, and the reference images referable in the layer direction, to generate the list of reference images, with respect to an L0 direction.

(8) The image processing apparatus according to (4), wherein the reference list generating unit adds a reference image in which the layer reference image information indicates 1, of the reference images referable in a layer direction, and combines reference images in an order of a reference image positioned temporally after the image, a reference image positioned temporally before the image, a long-term reference image, and the reference images referable in the layer direction, to generate the list of reference images, with respect to an L1 direction.

(9) The image processing apparatus according to any of (1) to (7), wherein the layer is a view.

(10) An image processing method including:
by an image processing apparatus,
decoding a bit stream to generate an image; and
predicting the generated image, by reference to a list of reference images generated based on layer reference image information that controls reference images for each layer, the reference images being referable in a layer direction and referred in predicting the image that is the bit stream subjected to decoding processing.

(11) An image processing apparatus including:
a setting unit configured to set layer reference image information that controls reference images referable in a layer direction and referred in predicting an image;
a prediction unit configured to generate a predicted image, by reference to a list of reference images generated based on the layer reference image information set by the setting unit;
an encoding unit configured to encode the image using the predicted image generated by the prediction unit to generate a bit stream; and
a transmitting unit configured to transmit the bit stream generated by the encoding unit, and the layer reference image information set by the setting unit.

(12) The image processing apparatus according to (11), wherein the transmitting unit transmits the layer reference image information set by the setting unit, at fixed intervals or in picture units.

(13) The image processing apparatus according to (11) or (12), wherein the setting unit sets the layer reference image information to a sequence parameter set or a slice header of the bit stream.

(14) The image processing apparatus according to any of (11) to (13), further including:
a reference list generating unit configured to generate the list of reference images, based on the layer reference image information set by the setting unit.

(15) The image processing apparatus according to (14), wherein, when inserting the reference images referable in a layer direction into the list of reference images, with respect to an L1 direction, the reference list generating unit reverses an order of the reference images referable in the layer direction to a case of an L0 direction, and inserts the reference images.

(16) The image processing apparatus according to (14), wherein the reference list generating unit adds a reference image in which the layer reference image information indicates 1, of the reference images referable in a layer direction, to generate the list of reference images.

(17) The image processing apparatus according to (14), wherein the reference list generating unit adds a reference image in which the layer reference image information indicates 1, of the reference images referable in a layer direction, and combines reference images in an order of a reference image positioned temporally before the image, a reference image positioned temporally after the image, a long-term reference image, and the reference images referable in the layer direction, to generate the list of reference images, with respect to an L0 direction.

(18) The image processing apparatus according to (14), wherein the reference list generating unit adds a reference image in which the layer reference image information indicates 1, of the reference images referable in a layer direction, and combines reference images in an order of a reference image positioned temporally after the image, a reference image positioned temporally before the image, a long-term reference image, and the reference images referable in the layer direction, to generate the list of reference images, with respect to an L1 direction.

(19) The image processing apparatus according to any of (11) to (18), the layer is a view.

(20) An image processing method including:
by an image processing apparatus,
setting layer reference image information that controls reference images referable in a layer direction and referred in predicting an image;
generating a predicted image, by reference to a list of reference images generated based on the set layer reference image information;
encoding the image using the generated predicted image to generate a bit stream; and
transmitting the generated bit stream, and the set layer reference image information.

REFERENCE SIGNS LIST

1 Encoding device
11 VPS Setting unit
12 SPS Setting unit
13 Slice header setting unit
14 Encoding unit
15 Transmitting unit
106 Lossless encoding unit
115 Motion parallax prediction/compensation unit
121 Syntax processing unit
122 Reference list generating unit
131 Reference image setting unit
132 Temporal list generating unit
133 Reference image list generating unit
151 Decoding device
161 Receiving unit
162 VPS extracting unit
163 SPS extracting unit
164 Slice header extracting unit
165 Decoding unit
202 Lossless decoding unit
212 Motion parallax prediction/compensation unit
221 Syntax processing unit
222 Reference list generating unit
231 Reference image setting unit
232 Temporal list generating unit
233 Reference image list generating unit

The invention claimed is:

1. An image processing apparatus, comprising:
a processor configured to:
decode a bit stream to generate a decoded image; and
generate, by prediction, a predicted image, wherein the prediction is based on a list of reference images,
wherein the list of reference images is generated based on layer reference image information that controls reference images for each layer, and
wherein the reference images are referable in a layer direction and are referred to predict the predicted image:
reverse an order of the reference images referable in an L0 direction; and
insert the reverse ordered reference images into the list of reference images associated with an L1 direction.

2. The image processing apparatus according to claim 1, wherein the layer reference image information is transmitted at one of fixed intervals or in picture units.

3. The image processing apparatus according to claim 2, wherein the layer reference image information is set to one of a sequence parameter set or a slice header of the bit stream.

4. The image processing apparatus according to claim 1, wherein the processor is further configured to generate the list of the reference images, based on the layer reference image information.

5. The image processing apparatus according to claim 1, wherein the processor is further configured to add a reference image in which the layer reference image information indicates 1, of the reference images referable in the layer direction, to generate the list of reference images.

6. The image processing apparatus according to claim 1,
wherein the processor is further configured to add a reference image in which the layer reference image information indicates 1, of the reference images referable in the layer direction, to generate the list of reference images corresponding to the L0 direction, and
wherein the generation of the list of reference images is based on combination of images in an order of a reference image positioned temporally before the decoded image, a reference image positioned temporally after the decoded image, a long-term reference image, and the reference images referable in the layer direction.

7. The image processing apparatus according to claim 1, wherein the processor is further configured to add a reference image in which the layer reference image information indicates 1, of the reference images referable in the layer direction, and to generate the list of reference images corresponding to the L1 direction, and wherein the generation of the list of reference images is based on combination of images in an order of a reference image positioned temporally after the decoded image, a reference image positioned temporally before the decoded image, a long-term reference image, and the reference images referable in the layer direction.

8. The image processing apparatus according to claim 1, wherein the layer is a view.

9. An image processing method, comprising:

in an image processing apparatus:

decoding a bit stream to generate a decoded image; and generating, by prediction, a predicted image, wherein the prediction is based on a list of reference images, wherein the list of reference images is generated based on layer reference image information that controls reference images for each layer, and wherein the reference images being referable in a layer direction and referred in predicting the predicted image;

reversing an order of the reference images referable in an L0 direction; and inserting the reverse ordered reference images into the list of reference images associated with an L1 direction.

10. An image processing apparatus, comprising:

a processor configured to:

set layer reference image information that controls reference images referable in a layer direction;

generate, by prediction, a predicted image, wherein the prediction is based on a list of reference images;

reverse an order of the reference images referable in an L0 direction;

insert the reverse ordered reference images into the list of reference images associated with an L1 direction, wherein the list of reference images is generated based on the set layer reference image information encode an image based on the predicted image to generate a bit stream; and transmit the generated bit stream and the set layer reference image information.

11. The image processing apparatus according to claim 10, wherein the processor is further configured to transmit the set layer reference image information at one of fixed intervals or in picture units.

12. The image processing apparatus according to claim 11, wherein the processor is further configured to set the layer reference image information to one of a sequence parameter set or a slice header of the bit stream.

13. The image processing apparatus according to claim 10, wherein the processor is further configured to generate the list of reference images, based on the set layer reference image information.

14. The image processing apparatus according to claim 10, wherein the processor is further configured to add a reference image in which the layer reference image information indicates 1, of the reference images referable in the layer direction, to generate the list of reference images.

15. The image processing apparatus according to claim 10, wherein the processor is further configured to add a reference image in which the layer reference image information indicates 1, of the reference images referable in the layer direction, corresponding to the L0 direction, and wherein the generation of the list of reference images is based on combination of images in an order of a reference image positioned temporally before the image, a reference image positioned temporally after the image, a long-term reference image, and the reference images referable in the layer direction.

16. The image processing apparatus according to claim 10, wherein the processor is further configured to add a reference image in which the layer reference image information indicates 1, of the reference images referable in the layer direction, to generate the list of reference images, with corresponding to the L1 direction, and wherein the generation of the list of reference images is based on combination of images in an order of a reference image positioned temporally after the image, a reference image positioned temporally before the image, a long-term reference image, and the reference images referable in the layer direction.

17. The image processing apparatus according to claim 10, wherein the layer is a view.

18. An image processing method, comprising:

in an image processing apparatus:

setting layer reference image information that controls reference images referable in a layer direction;

generating, by prediction, a predicted image, wherein the prediction is based on a list of reference images;

reversing an order of the reference images referable in an L0 direction;

inserting the reverse ordered reference images into the list of reference images associated with an L1 direction, wherein the list of reference images is generated based on the set layer reference image information;

encoding an image based on the predicted image to generate a bit stream; and transmitting the generated bit stream and the set layer reference image information.

* * * * *